(12) United States Patent
Hoshi et al.

(10) Patent No.: US 11,167,672 B2
(45) Date of Patent: Nov. 9, 2021

(54) VEHICLE SEAT

(71) Applicant: TS TECH CO., LTD., Asaka (JP)

(72) Inventors: Yuichiro Hoshi, Tochigi (JP); Kazuki Kobayashi, Tochigi (JP); Tatsumi Konno, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/635,449

(22) PCT Filed: Jul. 20, 2018

(86) PCT No.: PCT/JP2018/027341
§ 371 (c)(1),
(2) Date: Jan. 30, 2020

(87) PCT Pub. No.: WO2019/026650
PCT Pub. Date: Feb. 7, 2019

(65) Prior Publication Data
US 2021/0101509 A1   Apr. 8, 2021

(30) Foreign Application Priority Data

Jul. 31, 2017 (JP) .............................. JP2017-148029
Jul. 31, 2017 (JP) .............................. JP2017-148033
(Continued)

(51) Int. Cl.
*B60N 2/56* (2006.01)
*B60H 1/00* (2006.01)

(52) U.S. Cl.
CPC ......... *B60N 2/5628* (2013.01); *B60N 2/5657* (2013.01); *B60H 1/00285* (2013.01)

(58) Field of Classification Search
CPC .. B60N 2/5628; B60N 2/5657; B60N 2/5621; B60N 2/56; B60N 2/565; B60H 1/00285
(Continued)

(56) References Cited

U.S. PATENT DOCUMENTS 5,450,894 A  *  9/1995  Inoue ................. B60H 1/00664
                                                                165/43
6,179,706 B1 *  1/2001  Yoshinori ............ B60N 2/5635
                                                                297/180.14
(Continued)

FOREIGN PATENT DOCUMENTS

JP       S4827771       8/1973
JP       S60142660 U    9/1985
(Continued)

OTHER PUBLICATIONS

International Search Report and Written Opinion issued for International Patent Application No. PCT/JP2018/027341, dated Sep. 18, 2018, 19 pages including English translation.
(Continued)

*Primary Examiner* — Mark R Wendell
(74) *Attorney, Agent, or Firm* — Hamre, Schumann, Mueller & Larson, P.C.

(57) ABSTRACT

Provided is vehicle seat with a seat cushion and a seat back, the vehicle seat comprising: a duct disposed astride the seat cushion and the seat back, and configured to connect an air passage and a blower, the air passage being formed in the seat cushion and the seat back; and a side frame cover configured to cover part of the duct. The duct includes a first duct member and a second duct member connected to the first duct member. The side frame cover is configured to cover at least part of a first connected section that is a section at which the first duct member and the second duct member are connected.

8 Claims, 54 Drawing Sheets

(30) Foreign Application Priority Data

| | | |
|---|---|---|
| Jul. 31, 2017 | (JP) | JP2017-148036 |
| Jul. 31, 2017 | (JP) | JP2017-148042 |
| Jul. 19, 2018 | (JP) | JP2018-136114 |

(58) Field of Classification Search
USPC ............................. 297/180.13, 180.1, 180.14
See application file for complete search history.

(56) References Cited

U.S. PATENT DOCUMENTS

| | | | |
|---|---|---|---|
| 6,196,627 B1* | 3/2001 | Faust | B60N 2/5635 |
| | | | 297/180.1 |
| 6,478,369 B1 | 11/2002 | Aoki et al. | |
| 6,505,886 B2 | 1/2003 | Gielda et al. | |
| 7,810,848 B2 | 10/2010 | Yoshino | |
| 7,963,595 B2* | 6/2011 | Ito | B60N 2/5657 |
| | | | 297/180.14 |
| 10,173,561 B2 | 1/2019 | Cho et al. | |
| 2002/0145312 A1 | 10/2002 | Gielda et al. | |
| 2008/0048447 A1 | 2/2008 | Yoshino | |
| 2010/0300644 A1* | 12/2010 | Chung | B60N 2/5678 |
| | | | 165/41 |
| 2011/0061401 A1* | 3/2011 | Jun | B60N 2/5657 |
| | | | 62/3.3 |
| 2012/0144844 A1* | 6/2012 | Park | B60N 2/5657 |
| | | | 62/3.3 |
| 2014/0179212 A1* | 6/2014 | Space | B60N 2/5657 |
| | | | 454/76 |
| 2016/0272038 A1* | 9/2016 | Tanaka | B60N 2/5657 |
| 2017/0080837 A1* | 3/2017 | Cho | B60N 2/5657 |
| 2018/0043807 A1* | 2/2018 | Arata | B60N 2/565 |
| 2019/0092197 A1* | 3/2019 | Arata | B60N 2/565 |
| 2019/0135145 A1* | 5/2019 | Zhang | B60N 2/5678 |
| 2020/0317097 A1* | 10/2020 | Lim | B32B 3/02 |

FOREIGN PATENT DOCUMENTS

| | | |
|---|---|---|
| JP | S6127915 | 2/1986 |
| JP | H01172011 | 7/1989 |
| JP | H0414894 | 2/1992 |
| JP | H07317982 | 12/1995 |
| JP | 2580658 | 2/1997 |
| JP | 2001047848 | 2/2001 |
| JP | 2002267090 | 9/2002 |
| JP | 2004082961 | 3/2004 |
| JP | 2007333108 | 12/2007 |
| JP | 2009023477 | 2/2009 |
| JP | 2009178450 | 8/2009 |
| JP | 2009196565 | 9/2009 |
| JP | 2016215670 | 12/2016 |
| JP | 2017061289 | 3/2017 |
| JP | 2017094924 | 6/2017 |

OTHER PUBLICATIONS

Office Action issued for Japanese Patent Application No. 2017-148029, Dispatch Date: Jul. 6, 2021, 11 pages including English translation.

Office Action issued for Japanese Patent Application No. 2017-148033, Dispatch Date: Jul. 6, 2021, 9 pages including English translation.

Office Action issued for Japanese Patent Application No. 2017-148042, Dispatch Date: Jul. 6, 2021, 13 pages including English translation.

* cited by examiner (a)

(b) (c)

(a)

(b)

VEHICLE SEAT

TECHNICAL FIELD

The present invention relates to a vehicle seat with a seat cushion and a seat back.

BACKGROUND ART

There is hitherto known in the art a car seat which comprises a seat cushion and a seat back having outlet openings and air passages formed therein, a blower attached to a bottom surface of the seat cushion, and a duct connecting the blower and an air passage of the seat back wherein conditioned air is forced by the blower through the air passages and the duct to the outlet openings (Patent document 1).

CITATION LIST

Patent Literature

Patent Document 1: JP 2009-023477 A

SUMMARY OF INVENTION

In some embodiments where the duct is made up of a plurality of parts connected to each other, a connected section of the duct at which such duct parts are connected would possibly be hit, for example, by a foot of a rear-seat occupant, or otherwise subjected to an impact, which in turn would disadvantageously cause the connected section to become broken off.

In typical known embodiments where two or more seats arranged adjacently left and right have their individual blowers provided one for each seat, high manufacturing costs would be a problem to be resolved.

In some embodiments known in the art where the duct is laid or routed in such a manner as to extend out from a rear end of the seat cushion toward the seat back, the duct would disadvantageously be hit by a foot of a rear-seat occupant.

Against this backdrop, as one object, the present invention has been made in an attempt to provide a vehicle seat in which a connected section of a duct made up of a plurality of connected parts can be protected.

It is another object to make a cover member compact.

It is still another object to protect an engaged spot of the connected section of the duct.

It is still another object to provide a feature which enables visual inspection of a state of engagement of the engaged spot of the connected section of the duct.

It is still another object to provide a simple configuration for connecting a plurality of duct parts.

It is still another object to make a plurality of duct parts less likely to become disconnected.

It is still another object to realize a configuration by which air is jetted out or drawn in over a wide area of a seat surface of a seat cushion or a seat back.

It is still another object to provide a vehicle seat with climate control capability at low cost.

It is still another object to increase flexibility in arrangement of a blower-side connecting port.

It is still another object to protect a duct.

It is still another object to make a duct less likely to be hit by a foot of a rear-seat occupant.

It is still another object to facilitate the work of fastening an outer covering of a seat cushion.

It is still another object to restrain upsizing of a seat.

It is still another object to improve rigidity of a duct.

It is still another object to restrain interference of a duct with another member.

It is still another object to reduce the likelihood that an unwanted force will be exerted on a duct.

It is still another object to render a duct capable of following a reclining operation in a desirable manner.

It is still another object to make a seat with a duct aesthetically pleasing to look at.

It is still another object to enable fastening of an end portion of an outer covering member while restraining interference of a duct with the outer covering.

In one aspect, provided is a vehicle seat with a seat cushion and a seat back, the vehicle seat comprising: a duct disposed astride the seat cushion and the seat back, and configured to connect an air passage and a blower, the air passage being formed in at least one of the seat cushion and the seat back; and a cover member configured to cover part of the duct, wherein the duct includes a first duct member and a second duct member connected to the first duct member, and wherein the cover member is configured to cover at least part of a first connected section that is a section at which the first duct member and the second duct member are connected.

With this configuration, the connected section of the duct made up of a plurality of parts can be protected.

The vehicle seat described above may be configured such that the first duct member includes a first engageable portion and a second engageable portion which are provided in the first connected section, wherein the second duct member includes a third engageable portion which is engageable with the first engageable portion, and a fourth engageable portion which is engageable with the second engageable portion, and wherein the cover member is configured to cover the first engageable portion and the third engageable portion, but not to cover the second engageable portion and the fourth engageable portion.

With this configuration, the cover member can be made compact as compared with an alternative configuration in which all the engageable portions are covered with the cover member.

The vehicle seat described above may be configured to comprise: left and right cushion side frames which constitute left and right frames of the seat cushion; and a rear frame by which the rear portions of the left and right cushion side frames are connected, wherein the duct is laid across a rear side of the rear frame and extends from the seat cushion toward the seat back, wherein the second engageable portion and the fourth engageable portion are provided at a right side surface or a left side surface of the first connected section.

With this configuration, the second engageable portion and the fourth engageable portion which are not covered with the cover member are made less likely to be hit by a foot of a rear-seat occupant, so that the second engageable portion and the fourth engageable portion that form engaged spots of the connected section of the duct can be protected. In addition, the state of engagement of the second engageable portion and the fourth engageable portion can be visually inspected.

The vehicle seat described above may be configured such that the first connected section is located in a position shifted closer to the left or right cushion side frame than to a center of the seat cushion in the lateral direction, wherein the first engageable portion and the third engageable portion are provided at a side surface of the first connected section that is more distant than the second engageable portion and the fourth engageable portion from the center of the seat cushion in the lateral direction.

With this configuration, as compared with an alternative configuration in which the first connected section is located in a position shifted closer to the center of the seat cushion in the lateral direction, the likelihood that the first connected section or its vicinity will be hit by a foot of a rear-seat occupant from the rear can be reduced in essence; therefore, the second engageable portion and the fourth engageable portion that are not covered with the cover member can be protected more effectively.

The vehicle seat described above may be configured such that the first engageable portion and the third engageable portion are located closer, in the lateral direction, to a door for getting in and out of a space at the rear of the vehicle seat than the second engageable portion and the fourth engageable portion.

With this configuration, despite the possibility that a foot or other part of a passenger getting in a space at the rear of the vehicle seat would hit the side surface (surface of the first connected section at which the first engageable portion and the third engageable portion are provided) or its vicinity, the first engageable portion and the third engageable portion can be protected effectively by the cover member in that the first engageable portion and the third engageable portion are covered with the cover member.

The vehicle seat described above may be configured such that the first engageable portion and the second engageable portion are projections having outwardly protruding shapes, and the third engageable portion and the fourth engageable portion are through holes with which the projections are engageable.

With this configuration, the first duct member and the second duct member can be rendered simple to connect in structure.

The vehicle seat described above may be configured such that the projections include barb portions that extend opposite to a direction in which the first duct member is connected to the second duct member.

With this configuration, the first duct member and the second duct member can be made less likely to become disconnected.

The vehicle seat described above may be configured such that the second duct member is connected to a rear end of the first duct member and extends upward, wherein the duct includes a third duct member disposed at the seat back and connected to an upper end of the second duct member, and wherein the cover member is configured to cover at least part of a second connected section that is a section at which the second duct member and the third duct member are connected.

With this configuration, not only the connected section at which the first duct member and the second duct member are connected but also the connected section at which the second duct member and the third duct member are connected can be protected.

The vehicle seat described above may comprise left and right back side frames which constitute left and right frames of the seat back, and may be configured such that the cover member includes a plate-shaped rear cover attached to the left and right back side frames and bridging the left and right back side frames, the rear cover being configured to cover a rear side of the second connected section.

With this configuration, the connected section at which the second duct member and the third duct member are connected can be protected effectively by the plate-shaped rear cover.

The vehicle seat described above may be configured such that one of the seat cushion and the seat back has a first air passage and a second air passage, wherein the duct includes a first duct portion connecting to the first air passage, and a second duct portion branching off from the first duct portion and connecting to the second air passage.

This configuration with which a plurality of air passages can be connected to the blower by the duct makes it possible to implement features of jetting-out or drawing-in of air over a wide area of a seat surface of a seat cushion or a seat back.

In another aspect, a vehicle seat, in which a first seat portion and a second seat portion are disposed left and right adjacent to each other, the first seat portion including a first seat cushion and a first seat back, and the second seat portion including a second seat cushion and a second seat back, comprises a duct connecting a blower and each of the first seat portion and the second seat portion.

The duct comprises: a main duct portion including a blower-side connecting port connectable to the blower; a first duct portion branching off from the main duct portion, and including a first connecting port connecting to an air passage formed in one of the first seat cushion and the first seat back; and a second duct portion branching off from the main duct portion, and including a second connecting port connecting to an air passage formed in one of the second seat cushion and the second seat back.

With this configuration, in a vehicle seat with two seat portions disposed left and right adjacent to each other, e.g., as installed typically as a rear seat of an automobile, air produced from one blower can be caused to pass through the main duct portion and the first duct portion and distributed into the air passage of the first seat portion and to pass through the main duct portion and the second duct portion and distributed into the air passage of the second seat portion.

Accordingly, the vehicle seat with climate control capability can be realized at low cost.

In the vehicle seat described above, the first duct portion may be configured to extend astride the first set cushion and the first seat back.

With this configuration, the blower-side connecting port can be located in a position remote from a position in which the air passage is provided; therefore, the degree of flexibility in arrangement of the blower-side connecting port can be increased.

The vehicle seat described above may further comprise a first cover member with which a rear side of at least a portion of the first duct portion located above the first seat cushion is covered entirely.

With this configuration, the first cover member provided therein can serve to reduce the likelihood that the first duct portion will be hit by a baggage at the rear side of the first seat portion or a rear-seat occupant or the like (hereinafter referred to simply as "baggage or the like") and become deformed. Accordingly, the first duct portion can be protected properly from the baggage or the like.

The vehicle seat described above may preferably be configured such that the first duct portion includes a plurality of parts connected to each other, wherein the first cover member is configured to cover a rear side of a connected section of the first duct portion at which the plurality of parts are connected.

With this configuration, the first cover member provided therein can serve to reduce the likelihood that a connected section of the plurality of parts of the first duct portion will be hit by the baggage or the like from the rear side and become broken off. Accordingly, the first duct portion can be protected properly from the baggage or the like.

In the vehicle seat described above, the second duct portion may be configured to extend astride the second seat cushion and the second seat back.

With this configuration, the blower-side connecting port can be located in a position remote from a position in which the air passage is provided; therefore, the degree of flexibility in arrangement of the blower-side connecting port can be increased.

The vehicle seat described above may further comprise a second cover member with which a rear side of at least a portion of the second duct portion located above the second seat cushion is covered entirely.

With this configuration, the second cover member provided therein can serve to reduce the likelihood that the second duct portion will be hit by a baggage or the like at the rear of the second seat portion and become deformed. Accordingly, the second duct portion can be protected properly from the baggage or the like.

The vehicle seat described above may preferably be configured such that the second duct portion includes a plurality of parts connected to each other, wherein the second cover member is configured to cover a rear side of a connected section of the second duct portion at which the plurality of parts are connected.

With this configuration, the second cover member provided therein can serve to reduce the likelihood that a connected section of the plurality of parts of the second duct portion will be hit by the baggage, etc. from the rear side and become broken off. Accordingly, the second duct portion can be protected properly from the baggage or the like.

In the vehicle seat described above, the first cover member and the second cover member may be configured as an integral cover member.

With this configuration, the number of parts of the cover member can be reduced, and the costs can be lowered further.

The cover member may comprise: a rear wall portion with which rear sides of the first duct portion and the second duct portion are covered; a pair of side wall portions extending from left and right end portions of the rear wall portion frontward; and an upper wall portion extending from an upper end of the rear wall portion frontward, and connecting with the pair of side wall portions.

With this configuration, the cover member is formed with the rear wall portion, the pair of side wall portions and the upper wall portion, generally in a shape of a box, and thus enhanced in rigidity; therefore, the cover member is made less likely to become deformed, so that deformation or the like of the first duct portion and the second duct portion can be restrained more effectively.

The vehicle seat described above may, for example, be configured as a rear seat of a car in which a trunk is disposed adjacent to rear sides of the first seat back and the second seat back.

In this situation, when a baggage in the trunk moves fast frontward at the time of hard braking, the first duct portion or the second duct portion can be protected by the first cover member or the second cover member.

In the vehicle seat described above, the first duct portion may further include a third connecting port connecting to an air passage formed in another of the first seat cushion and the first seat back.

With this configuration, air can be caused to flow through both of the air passages of the first seat cushion and the first seat back by one blower.

In the vehicle seat described above, the second duct portion may further include a fourth connecting port connecting to an air passage formed in another of the second seat cushion and the second seat back.

With this configuration, air can be caused to flow through both of the air passages of the second seat cushion and the second seat back by one blower.

In still another aspect, provided is a vehicle seat with a seat cushion and a seat back, the vehicle seat comprising: left and right cushion side frames constituting left and right frames of the seat cushion; a rear frame by which rear portions of the left and right cushion side frames are connected; and a duct disposed astride the seat cushion and the seat back, and configured to connect an air passage and a blower, the air passage being formed in at least one of the seat cushion and the seat back, wherein the duct has an upward-and-downward-extending portion laid across a front side of the rear frame and extending from the seat cushion toward the seat back.

With this configuration, the upward-and-downward-extending portion of the duct can be made less likely to be hit by a foot of a rear-seat occupant, by the rear frame. Since the duct is not routed at a rear side of the rear frame, to which the outer covering of the seat cushion may be fastened in some configurations, the duct would not constitute an obstacle to the fastening operation, so that the work of fastening the outer covering to the rear frame can be performed with increased ease.

The vehicle seat described above may be configured to comprise: left and right back side frames constituting left and right frames of the seat back; and a lower frame by which lower portions of the left and right back side frames are connected, wherein the duct has an upward-and-downward-extending portion laid across a front side of the lower frame and extending from the seat cushion toward the seat back.

With this configuration, the upward-and-downward-extending portion of the duct can be made less likely to be hit by a foot of a rear-seat occupant, by the lower frame.

In the vehicle seat described above, the duct may be configured to include a flexible portion having flexibility, wherein the flexible portion is located above the rear frame.

With this configuration, the soft flexible portion of the duct can be made less likely to be hit by a foot of a rear-seat occupant, by the rear frame.

In the vehicle seat described above, the duct may be configured to include a flexible portion having flexibility, wherein the flexible portion is located between the rear frame and the lower frame in a direction of extension of a shortest line segment connecting the rear frame and the lower frame.

With this configuration, the soft flexible portion of the duct can be made less likely to be hit by a foot of a rear-seat occupant, by the rear frame and/or the lower frame.

The vehicle seat described above may be configured such that the duct, of which the upward-and-downward-extending portion includes a first part and a second part connected to each other, has a connected section at which the first part and the second part are connected, the connected section being so located as to overlap the rear frame as viewed from a front or rear direction.

With this configuration, the connected section at which the first part and the second part of the duct are connected to each other can be made less likely to be hit by a foot of a rear-seat occupant, by the rear frame.

The vehicle seat described above may be configured such that the duct, of which the upward-and-downward-extending portion includes a third part and a fourth part connected to each other, has a connected section at which the third part and the fourth part are connected, the connected section being so located as to overlap the lower frame as viewed from a front or rear direction.

With this configuration, the connected section at which the third part and the fourth part of the duct are connected to each other can be made less likely to be hit by a foot of a rear-seat occupant, by the lower frame.

The vehicle seat described above may be configured such that a portion of the duct located at a front side of the rear frame has a flow path so shaped as to have a cross section of which a dimension in a front-rear direction is smaller than a dimension in a direction perpendicular to the front-rear direction.

With this configuration, the duct can be arranged at the front side of the rear frame in a way that enables downsizing in the front-rear direction, so that upsizing of the seat in the front-rear direction can be restrained.

The vehicle seat described above may be configured such that a portion of the duct located at a front side of the lower frame has a flow path so shaped as to have a cross section of which a dimension in a front-rear direction is smaller than a dimension in a direction perpendicular to the front-rear direction.

With this configuration, the duct can be arranged at the front side of the lower frame in a way that enables downsizing in the front-rear direction, so that upsizing of the seat in the front-rear direction can be restrained.

The vehicle seat described above may be configured such that a portion of the duct located below the rear frame is so curved as to have a shape of a letter U bulging rearward as viewed from a left or right direction.

With this configuration, the rigidity of the duct can be improved. Moreover, interference of the duct with another member disposed below the rear frame can be restrained.

The vehicle seat described above may be configured such that one of the seat cushion and the seat back has a first air passage and a second air passage, wherein the duct includes a first duct portion connecting to the first air passage, and a second duct portion branching off from the first duct portion and connecting to the second air passage.

This configuration with which a plurality of air passages can be connected to the blower by the duct makes it possible to implement features of jetting-out or drawing-in of air over a wide area of a seat surface of a seat cushion or a seat back.

The vehicle seat described above may be configured to comprise a pad member with which a frame of the seat cushion or the seat back is covered, wherein the pad member includes a recessed portion in which the upward-and-downward-extending portion of the duct is located.

With this configuration, interference between the duct and the pad member can be restrained, and thus the likelihood that an unwanted force will be exerted on the duct from the pad member can be reduced. Moreover, the duct can be arranged in a manner that permits downsizing, so that upsizing of the seat can be restrained.

The vehicle seat described above may be configured to comprise: a cushion pad with which a frame of the seat cushion is covered; and a back pad with which a frame of the seat back is covered, wherein the seat back is configured to be reclinable relative to the seat cushion, wherein the upward-and-downward-extending portion of the duct includes a flexible portion having flexibility, and wherein the flexible portion, at least part of which is located between the cushion pad and the back pad, is so curved as to have an arcuate shape bulging rearward in a state of readiness to be seated with the seat back being raised relative to the seat cushion.

With this configuration, the duct can be caused to follow a reclining operation of the seat back in a desirable manner.

In the vehicle seat described above, the seat back may be configured to be reclinable relative to the seat cushion, and the vehicle seat may be configured to comprise a cover member with which a portion of the duct disposed astride the seat cushion and the seat back is covered.

With this configuration, in which the duct is covered with the cover member and thus kept out of direct view through between the seat cushion and the seat back, the seat with the duct can be made aesthetically pleasing to look at.

The vehicle seat described above may be configured to comprise: a frame member constituting a frame of the seat cushion or the seat back; a pad member with which the frame member is covered; and an outer covering member with which the pad member is covered, wherein the outer covering member includes a first end portion extending from an occupant side of the seat cushion or the seat back to a reverse side opposite to the occupant side and retained on a target engageable portion at the reverse side opposite to the occupant side of the seat cushion or the seat back, as viewed from a left or right direction, and wherein the first end portion comprises: a first tongue portion laid across one of left and right sides of the duct and extending from the occupant side of the seat cushion or the seat back to the reverse side opposite to the occupant side; a second tongue portion laid across another of the left and right sides of the duct and extending from the occupant side of the seat cushion or the seat back to the reverse side opposite to the occupant side; a first engageable portion provided at the first tongue portion, the first engageable portion being engageable with the target engageable portion; and a second engageable portion provided at the second tongue portion, the second engageable portion being engageable with an end portion of the first tongue portion at said another of the left and right sides thereof and with the target engageable portion.

With this configuration, the first end portion can be retained on the target engageable portion while interference between the duct and the outer covering member is restrained.

In still another aspect, provided is a vehicle seat with a seat cushion and a seat back, the vehicle seat comprising: left and right cushion side frames constituting left and right frames of the seat cushion; and a duct disposed astride the seat cushion and the seat back, and configured to connect an air passage and a blower, the air passage being formed in at least one of the seat cushion and the seat back, wherein the duct is routed across a laterally outer side of the cushion side frames and extends from the seat cushion toward the seat back.

With this configuration, the duct can be rendered less likely to be hit by a foot of a rear-seat occupant. Moreover, since this configuration in which the duct is not routed at a rear side of the rear frame connecting the rear portions of the left and right cushion side frames may be adopted, without obstruction as would otherwise be caused by the duct, into an embodiment in which an outer covering of the seat cushion is to be fastened to the rear frame, the work of fastening the outer covering to the rear frame as required can be performed with increased ease.

The vehicle seat described above may be configured to comprise a cover member with which at least part of a laterally outer side of the cushion side frames is covered, wherein part of the duct is disposed between the cushion side frame and the cover member.

With this configuration, the duct can be protected by making use of the cover member for covering the cushion side frames.

The vehicle seat described above may be configured to comprise left and right back side frames constituting left and right frames of the seat back, wherein the cover member is a cover configured to cover a linking portion by which a rear portion of the cushion side frame and a lower portion of the back side frame are linked.

With this configuration, the duct as protected by the cover member, can be so arranged as to extend from the seat cushion toward the seat back, across the linking portion by which the cushion side frame and the back side frame are linked. Accordingly, the duct can be arranged in such a manner as to render the seat more compact in comparison with another configuration in which the duct is routed at the laterally outer side of the cushion side frames in such a manner as to take a detour set up around the linking portion, so that the seat can be restrained from upsizing.

The vehicle seat described above may be configured such that the duct includes a flexible portion having flexibility, the flexible portion being located between the cushion side frame and the cover member.

With this configuration, the soft flexible portion of the duct can be protected by the cover member.

The vehicle seat described above may be configured such that a portion of the duct located at a laterally outer side of the cushion side frames has a flow path so shaped as to have a cross section of which a dimension in a lateral direction is smaller than a dimension in a direction perpendicular to the lateral direction.

With this configuration, the duct can be arranged in such a space-saving manner at the laterally outer side of the cushion side frames as to render the seat compact in the lateral direction, so that the seat can be restrained from upsizing in the lateral direction.

The vehicle seat described above may be configured to have left and right sides thereof facing in left and right directions, a door of a vehicle being located at one of the left and right sides, wherein the duct is routed across a laterally outer side of a cushion side frame disposed at another of the left and right sides, and extends from the seat cushion toward the seat back.

With this configuration, in which the duct is thus arranged laterally opposite to the door, the duct can be rendered less likely to be hit by a foot or other part of a passenger when the passenger gets in the vehicle, whereby the duct can be protected.

The vehicle seat described above may be configured to comprise: a front link rotatably connected to a front portion of the cushion side frame; a rear link rotatably connected to a rear portion of the cushion side frame; and a link support member to which a lower portion of the front link is rotatably connected and to which a lower portion of the rear link is rotatably connected, wherein the duct extends through between the front link and the rear link.

With this configuration, interference of the duct with the front and rear links which would be caused when the duct is so arranged as to extend from the laterally outer side of the cushion side frame under the cushion side frame toward the underside of the seat cushion can be restrained.

The vehicle seat described above may be configured such that the seat cushion comprises a cushion frame constituting a frame of the seat cushion, and a cushion pad with which the cushion frame is covered, wherein the duct is routed under a portion of the cushion pad located at a laterally outer side of the cushion side frame.

With this configuration, the duct can be arranged in a space-saving manner, thus rendering the seat more compact in the lateral direction as compared with an alternative configuration in which the duct is routed at a laterally outer side of the cushion pad, so that the seat can be restrained from upsizing in the lateral direction.

The vehicle seat described above may be configured to comprise left and right back side frames constituting left and right frames of the seat back, wherein the duct includes a portion extending upward at a laterally outer side of the back side frame and routed above a linking portion by which a rear portion of the cushion side frame and a lower portion of the back side frame are linked, and an upper end portion extending at a rear side of the back side frame and connected to an air passage formed in the seat back.

With this configuration, the portion of the duct routed at the rear side of the back side frame can be located at a higher position as compared with an alternative configuration in which the duct is routed at the rear side of the back side frame from the vicinity of the linking portion by which the cushion side frame and the back side frame are linked, and is connected to the seat back. Accordingly, the duct can be restrained more reliably from being hit by a foot of a rear-seat occupant.

DESCRIPTION OF EMBODIMENTS

Hereinafter, a description will be given of a first embodiment with reference made to accompanying drawings. In this description, the front/rear (frontward/rearward), left/right (leftward/rightward; lateral), and upper/lower (upward/downward; vertical) are represented with reference to the front/rear, left/right, and upper/lower directions as viewed from a person seated on the seat.

Figure 1:
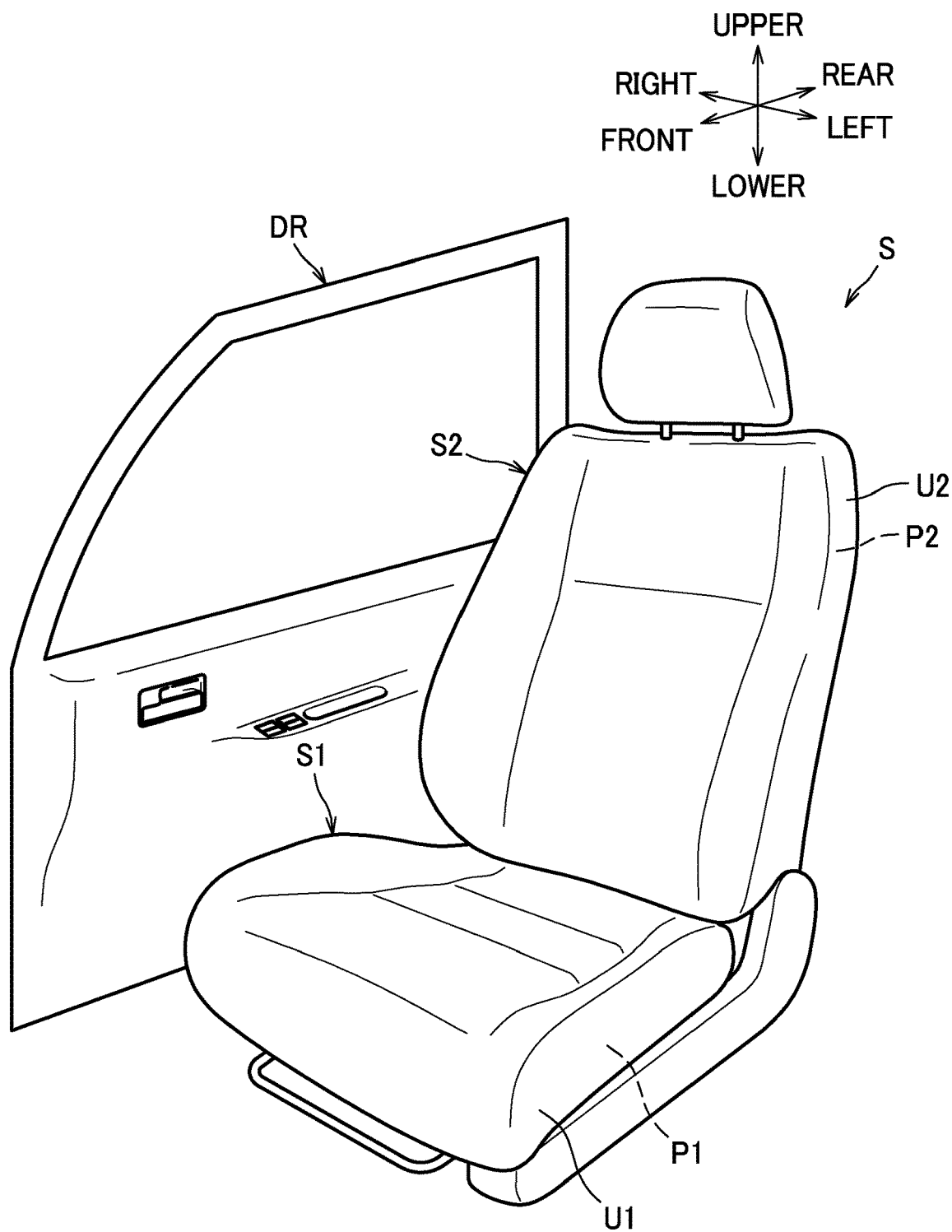
FIG. 1 is a view showing a car seat as a vehicle seat according to a first embodiment.

As shown in FIG. 1, a vehicle seat of the present embodiment is configured as a car seat S to be installed in an automobile, and includes a seat cushion S1 and a seat back S2.

Figure 2:
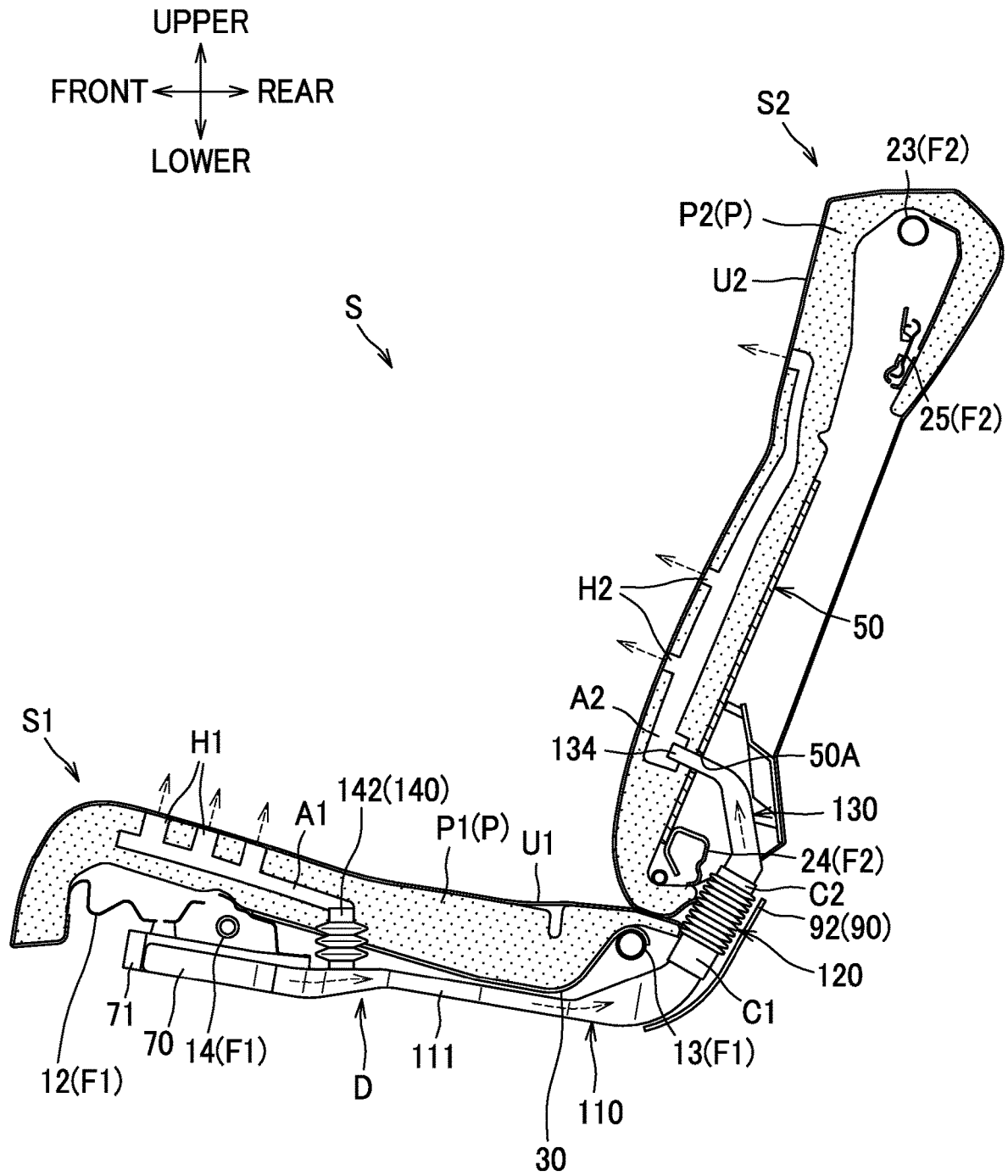
FIG. 2 is a section view of the car seat.

As shown in FIG. 2, the car seat S is constructed of a seat frame F (see FIG. 3) upholstered with a pad P made of urethane foam or the like and outer coverings U1, U2 made of fabrics, leather or the like.

The pad P includes a cushion pad P1 constituting a pad for a seat cushion S1, and a back pad P2 constituting a pad for a seat back S2. The cushion pad P1 has an air passage A1 formed therein, and a plurality of ventilation holes H1 extending from an upper surface and connected to the air passage A1. The back pad P2 has an air passage A2 formed therein, and a plurality of ventilation holes H2 extending from a front surface and connected to the air passage A2.

The air passages A1, A2 are connected via a duct D, which will be described later, to a blower 70. The blower 70 is a sirocco fan, and is disposed under a pan frame 12, which will be described later. The blower 70 is attached to the pan frame 12 via a bracket 71. The car seat S is configured to cause air forced from the blower 70 to pass through the duct D and the air passages A1, A2 and to be jetted out from the ventilation holes H1, H2 to an occupant seated on the seat.

Figure 3:
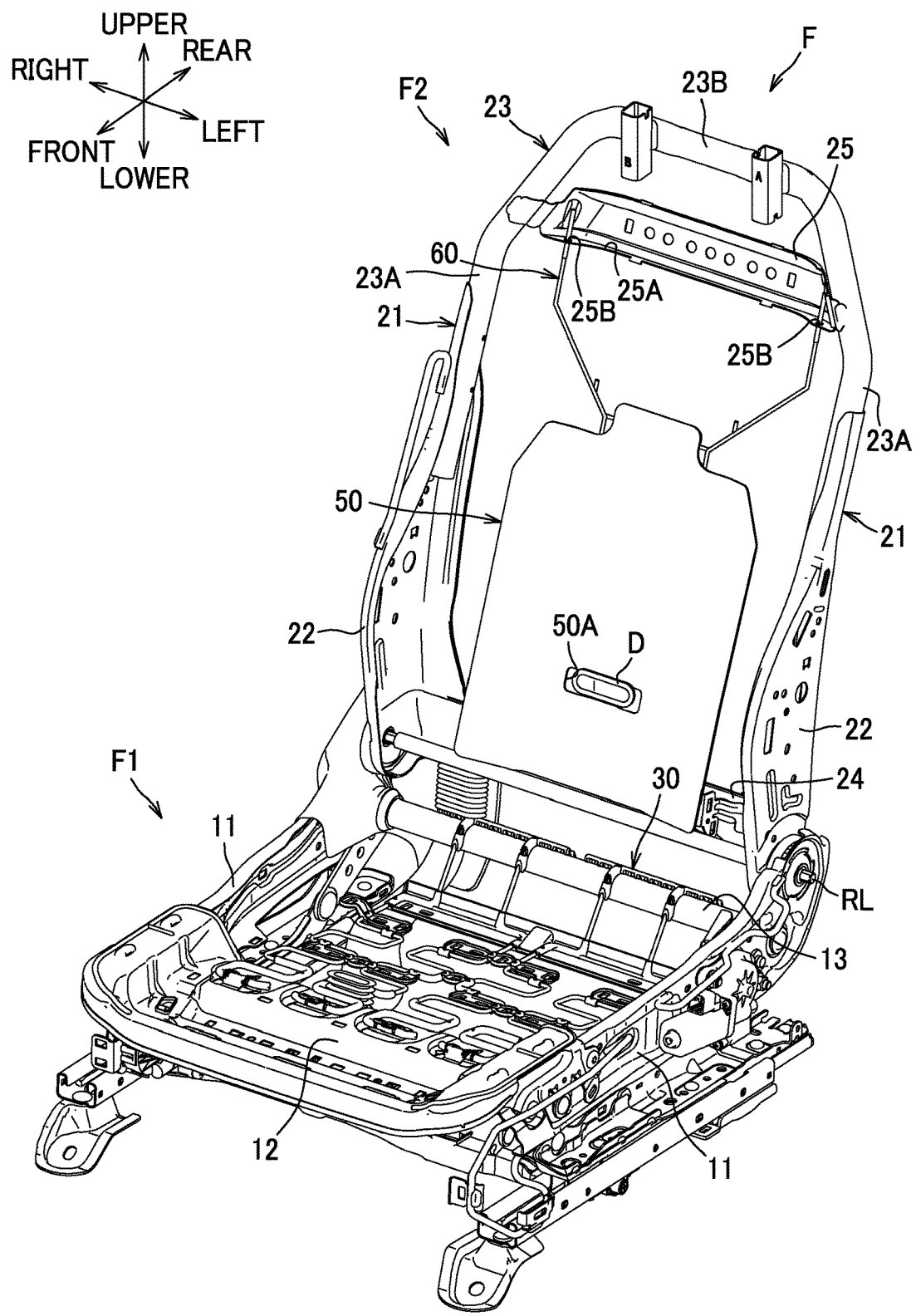
FIG. 3 is a perspective view of a seat frame.

As shown in FIG. 3, the seat frame F includes a cushion frame F1 constituting a frame of the seat cushion S1 and a back frame F2 constituting a frame of the seat back S2. The seat cushion S1 is constructed of the cushion frame F1 upholstered with the cushion pad P1 and the outer covering U1, and the seat back S2 is constructed of the back frame F2 upholstered with the back pad P2 and the outer covering U2 (see FIG. 1).

Figure 6:
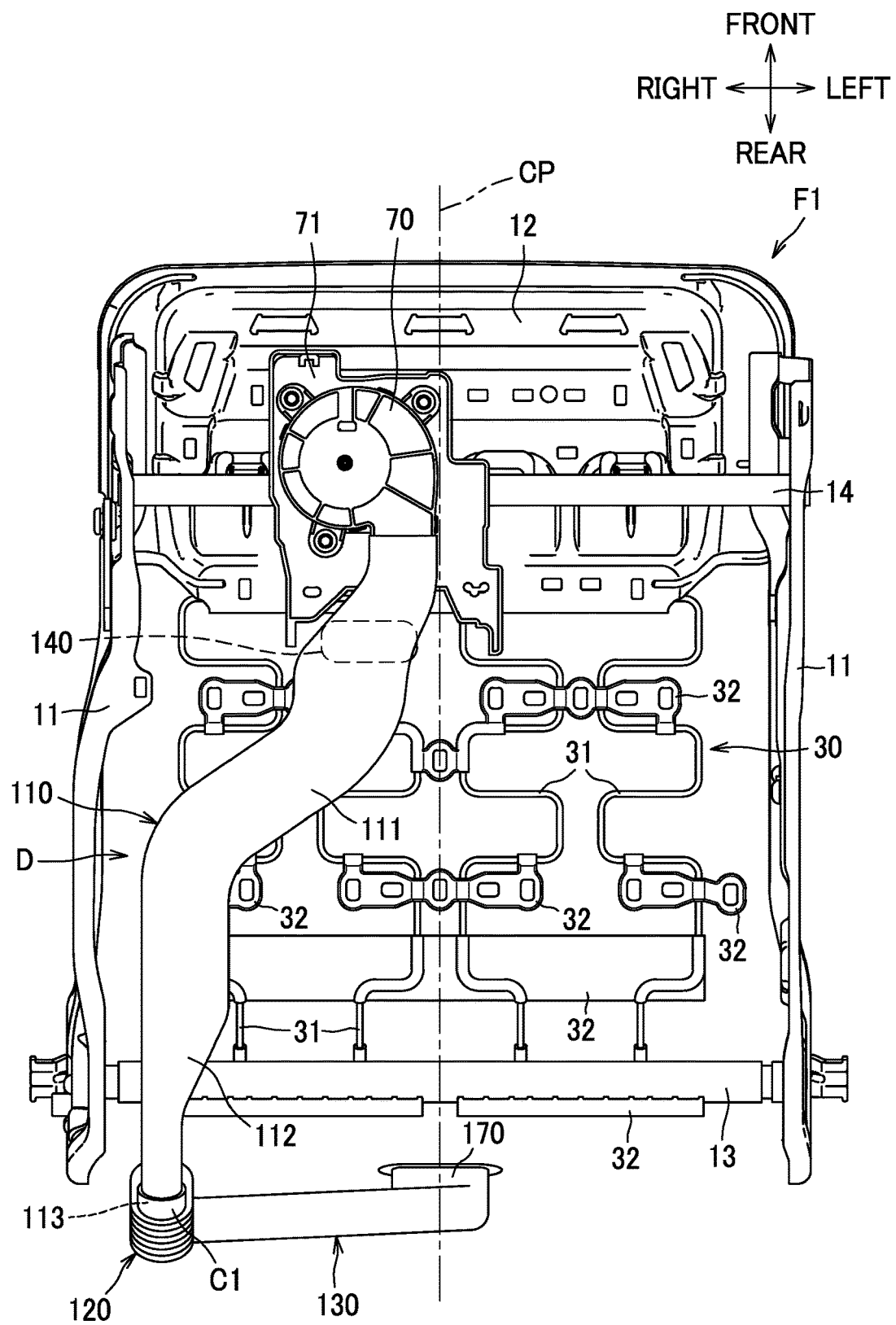
FIG. 6 is a view of a cushion frame, a blower, and the duct as viewed from below.

The cushion frame F1 includes left and right cushion side frames 11, a pan frame 12, a rear pipe 13 as a rear frame, and a front pipe 14 (see FIG. 6). The left and right cushion side frames 11 are members constituting left and right frames of the seat cushion S1, and are located apart from and face to each other in a lateral direction. The cushion side frames 11 are made of sheet metal, formed each in an elongate shape and arranged with its longitudinal direction aligned with a front-rear direction.

The pan frame 12 is made of sheet metal, and configured to connect front portions of the left and right cushion side frames 11. As shown in FIG. 6, the rear pipe 13 and the front pipe 14 are made of metal piping material, located apart from each other in the front-rear direction, and configured to connect left and right cushion side frames 11. To be more specific, the rear pipe 13 connects rear portions of the left and right cushion side frames 11, and the front pipe 14 connects front portions of the left and right cushion side frames 11. The front pipe 14 is disposed under the pan frame 12.

Arranged between the left and right cushion side frames 11 is a support member 30. The support member 30 is a member configured to receive a load from an occupant seated on the seat, and includes a plurality of wire members 31, and a plurality of plastic members 32 by which the wire members 31 are connected. The wire members 31 are made of metal wire, and configured to extend in the front-rear direction while bending alternately leftward and rightward. The wire members 31 are arranged side by side in the lateral direction and so provided as to bridge the pan frame 12 and the rear pipe 13. The plastic members 32 are made of plastic, and formed integrally with the wire members 31 by insert molding in such a manner as to surround parts of the wire members 31 in their entire circumferences.

As shown in FIG. 3, the back frame F2 includes left and right sheet-metal frames 22, a pipe frame 23, a lower frame 24, and a bridging frame 25. The left and right sheet-metal frames 22 are located apart from and face to each other in a lateral directions. The sheet-metal frames 22 are made of sheet metal, formed in an elongate shape and arranged with its longitudinal direction aligned with an upward-downward direction.

The pipe frame 23 is made of metal piping material, and includes left and right upper side frames 23A extending substantially in the upward-downward direction, and an upper frame 23B by which upper ends of the upper side frames 23A are connected. The left and right upper side frames 23A of which lower portions are connected to upper portions of the sheet-metal frames 22 form, together with the left and right sheet-metal frames 22, left and right back side frames 21 constituting left and right frames of the seat back S2. The lower frame 24 is made of sheet metal, and configured to connect lower portions of the left and right back side frames 21. The bridging frame 25 is made of sheet metal, and configured to connect upper portions of the left and right back side frames 21. The bridging frame 25 includes a lower extension portion 25A provided on a lower end thereof and extending frontward, and left and right end portions of the lower extension portion 25A has formed therein support holes 25B piercing through upper and lower sides thereof.

Arranged between the left and right back side frames 21 are a pressure-receiving member 50 and a wire member 60. The pressure-receiving member 50 is a plate-shaped member configured to receive a load from an occupant seated on the seat, and is made of plastic or the like. The pressure-receiving member 50 is so disposed as to face the back of an occupant. The pressure-receiving member 50 has an opening 50A for a duct D to be inserted therethrough. The wire member 60 is a member that connects the pressure-receiving member 50 to the back frame F2. The wire member 60 has a lower end portion fixed to the lower frame 24, and upper end portions inserted in the support holes 25B of the bridging frame 25, and is thereby connected to the back frame F2. The pressure-receiving member 50 is retained on the wire member 60 by tie-down bands or the like (not shown), to thereby get connected via the wire member 60 to the back frame F2.

A rear portion of the cushion side frame 11 and a lower portion of the back side frame 21 are rotatably linked via a reclining mechanism RL. The car seat S is thereby configured such that the seat back S2 is tiltable relative to the seat cushion S1 frontward and rearward.

Figure 4:
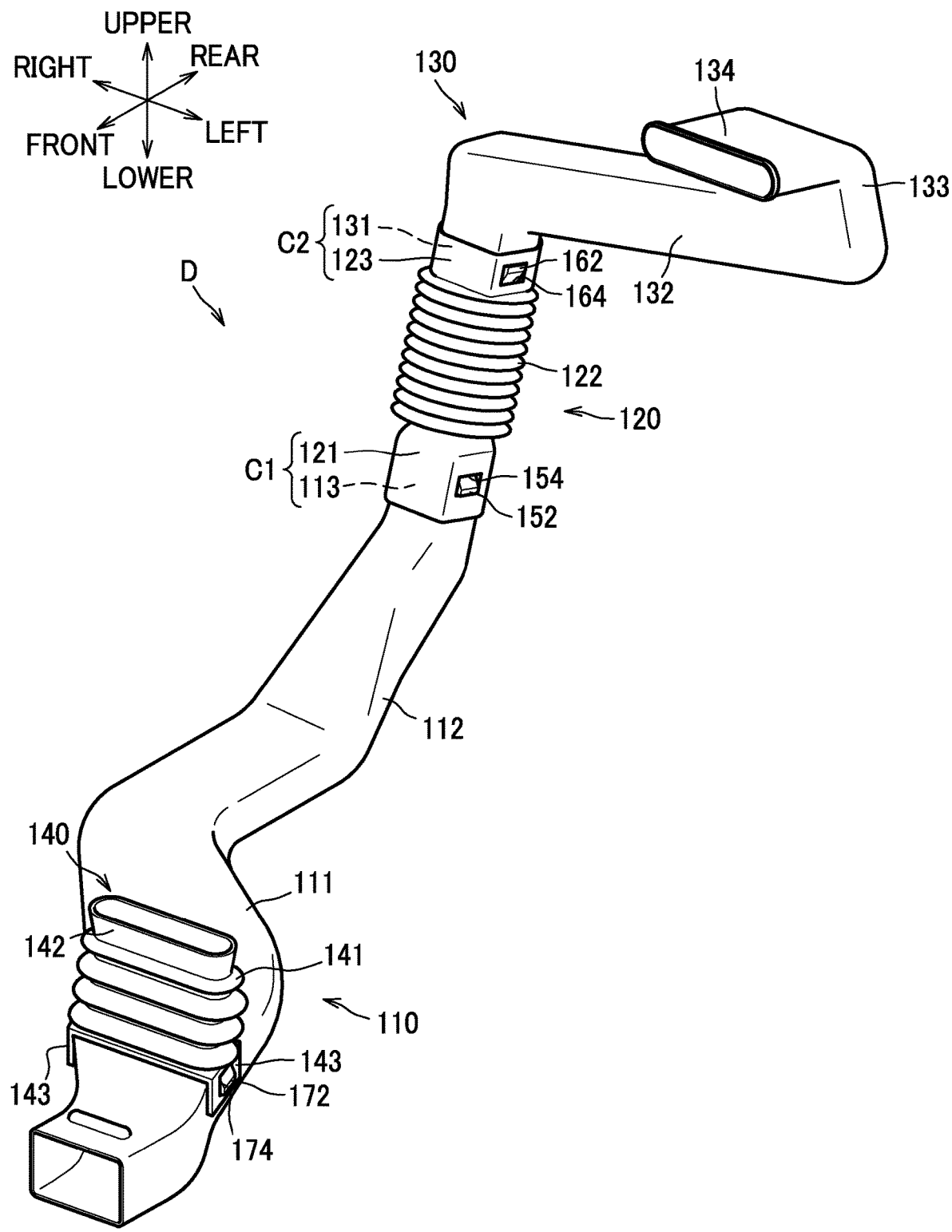
FIG. 4 is a perspective view of a duct.

As shown in FIG. 2, the duct D is a member configured to connect the blower 70 to the air passages A1, A2 formed in the pads P (P1, P2) of the seat cushion S1 and the seat back S2. The duct D is made up of a plurality of parts. To be more specific, as shown in FIG. 4, the duct D includes a first duct member 110, a second duct member 120, a third duct member 130, and a fourth duct member 140.

The first duct member 110 includes a first tubular portion 111 extending generally in the front-rear direction, a second tubular portion 112 extending from a rear end of the first tubular portion 111 obliquely in a rearward-and-upward direction, and a first connecting tubular portion 113 extending from an upper end of the second tubular portion 112 in a generally upward direction. The first tubular portion 111 has a front end portion connected to the blower 70 (see FIG. 2).

The second duct member 120 is connected to a rear end of the first duct member 110, and configured to extend from the rear end of the first duct member 110 in a generally upward direction. The second duct member 120 includes a second connecting tubular portion 121, a first bellows portion 122 provided above the second connecting tubular portion 121, and a third connecting tubular portion 123 provided above the first bellows portion 122. The second connecting tubular portion 121 is formed with an inside space thereof so sized as to permit the first connecting tubular portion 113 of the first duct member 110 to be fitted therein. The first bellows portion 122 is configured to have flexibility as well as an extensible-contractible feature. The third duct member 130 is connected to an upper end of the second duct member 120.

The third duct member 130 includes a fourth connecting tubular member 131 extending generally in an upward-downward direction, a third tubular portion 132 extending from an upper end of the fourth connecting tubular portion 131 obliquely in a leftward-and-upward direction (in an obliquely upward direction deviating toward a center of the car seat S in the lateral direction), a fourth tubular portion 133 extending from an upper end of the third tubular portion 132 in a generally upward direction, and a back connecting tubular portion 134 extending from an upper end of the fourth tubular portion 133 substantially in a frontward direction. The fourth connecting tubular portion 131 is formed with such a size as to permit itself to be fitted in an inside space of the third connecting tubular portion 123 of the second duct member 120. The back connecting tubular portion 134 has a front end portion thereof connected to the air passage A2 formed in the back pad P2 (see FIG. 2).

The fourth duct member 140 is connected to a front portion of the first duct member 110, and configured to extend generally in an upward-downward direction. The fourth duct member 140 includes a second bellows portion 141, a cushion connecting tubular portion 142 provided above the second bellows portion 141, and left and right connecting wall portions 143 provided below the second bellows portion 141. The second bellows portion 141 is configured to have flexibility as well as an extensible-contractible feature. The cushion connecting tubular portion 142 is connected to the air passage A1 formed in the cushion pad F1 (see FIG. 2). The connecting wall portions 143 are configured to extend from a lower end of the second bellows portion 141 downward and provided to sandwich the first tubular portion 111 of the first duct member 110 from the left and right sides.

As shown in FIG. 5(a), the first duct member 110 includes a first engageable portion 151 and a second engageable portion 152 provided in a first connected section C1, and the second duct member 120 includes a third engageable portion 153 and a fourth engageable portion 154 provided in the first connected section C1. The first connected section C1 is a section at which the first duct member 110 and the second duct member 120 are connected. Specifically, the first connected section C1 is a section at which the first connecting tubular portion 113 of the first duct member 110 and the second connecting tubular portion 121 of the second duct member 120 are connected with and overlaid on one another.

The first engageable portion 151 and the second engageable portion 152 are projections having shapes protruding from left and right side surfaces of the first connecting tubular portion 113 outwardly in a lateral direction. The third engageable portion 153 and the fourth engageable portion 154 are generally rectangular holes piercing through left and right sides with which the engageable portions 151, 152 configured as projections are engageable, and provided in left and right sidewalls of the second connecting tubular portion 121. The third engageable portion 153 is engageable with the first engageable portion 151, and the fourth engageable portion 154 is engageable with the second engageable portion 152.

The third duct member 130 includes a fifth engageable portion 161 and a sixth engageable portion 162 provided in a second connected section C2, and the second duct member 120 includes a seventh engageable portion 163 and an eighth engageable portion 164 provided in the second connected section C2. The second connected section C2 is a section at which the second duct member 120 and the third duct member 130 are connected. Specifically, the second connected section C2 is a section at which the third connecting tubular portion 123 of the second duct member 120 and the fourth connecting tubular portion 131 of the third duct member 130 are connected with and overlaid on one another.

The fifth engageable portion 161 and the sixth engageable portion 162 are projections having shapes protruding from left and right side surfaces of the fourth connecting tubular portion 131 outwardly in a lateral direction. The seventh engageable portion 163 and the eighth engageable portion 164 are generally rectangular holes piercing through left and right sides with which the engageable portions 161, 162 are engageable, and provided in left and right sidewalls of the third connecting tubular portion 123. The seventh engageable portion 163 is engageable with the fifth engageable portion 161, and the eighth engageable portion 164 is engageable with the sixth engageable portion 162.

Moreover, as shown in FIG. 5(b), the first duct member 110 includes a ninth engageable portion 171 and a tenth engageable portion 172 provided in the first tubular portion 111, and the fourth duct member 140 includes an eleventh engageable portion 173 and a twelfth engageable portion 174 provided in the connecting wall portions 143. The ninth engageable portion 171 and the tenth engageable portion 172 are projections having shapes protruding from left and right side surfaces of the first tubular portion 111 outwardly in a lateral direction. The eleventh engageable portion 173 and the twelfth engageable portion 174 are generally rectangular holes piercing through left and right sides with which the engageable portions 171, 172 are engageable.

The eleventh engageable portion 173 is engageable with the ninth engageable portion 171, and the twelfth engageable portion 174 is engageable with the tenth engageable portion 172. The first duct member 110 is provided with a fifth connecting tubular portion 114 which branches off from the first tubular portion 111, extends in a generally upward direction, and is fitted in an inside of the fourth duct member 140.

Figure 5:
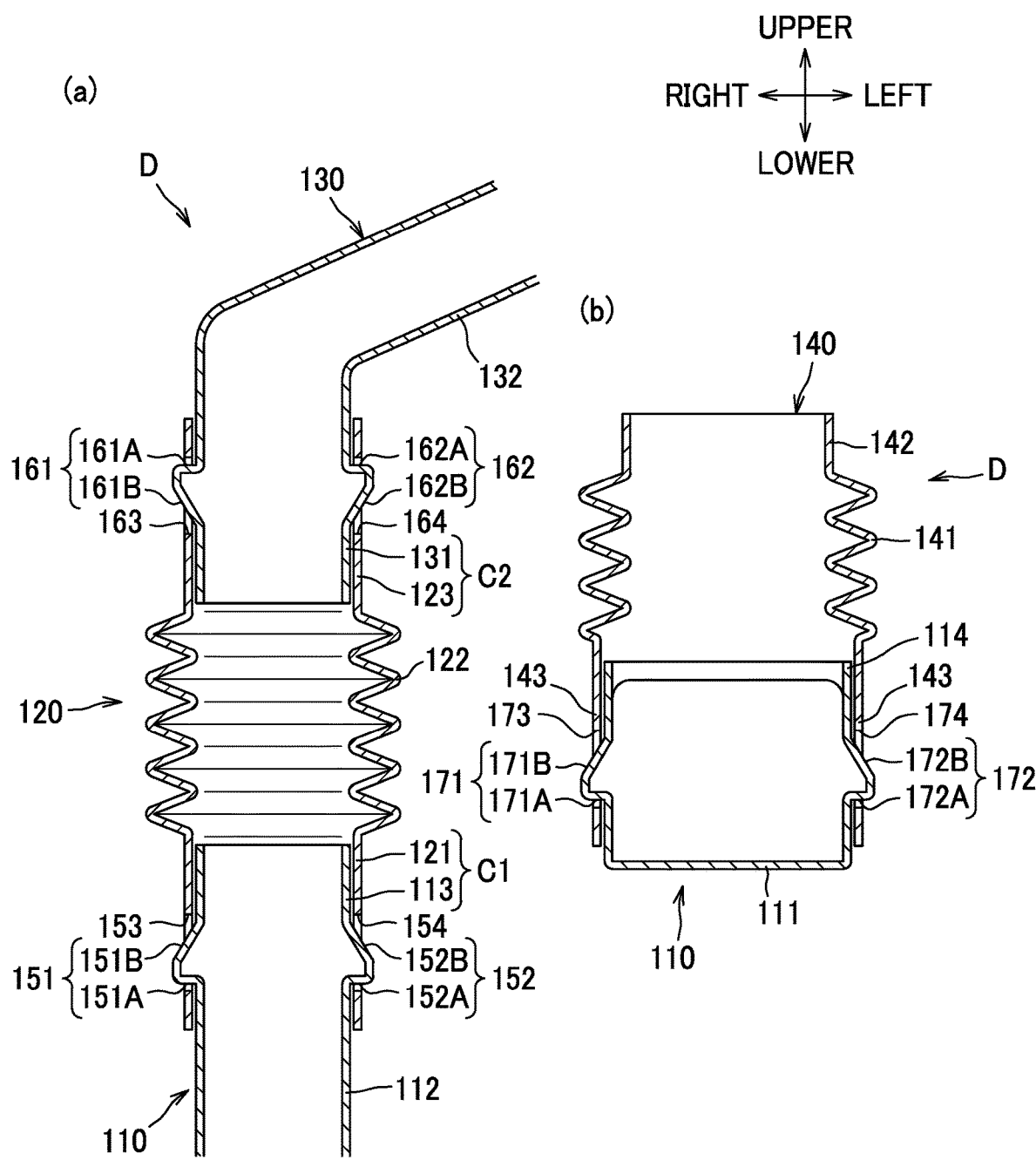
FIG. 5 includes a section views (a) and (b) showing connected sections and their vicinities of the duct.

The engageable portions 151, 152, 161, 162, 171, 172 are each configured to have a generally triangular shape in a cross section shown in FIG. 5. To be more specific, the engageable portions 151, 152, 161, 162, 171, 172 respectively have contact surfaces 151A, 152A, 161A, 162A, 171A, 172A, and inclined surfaces 151B, 152B, 161B, 162B, 171B, 172B. The contact surfaces 151A, 152A, 161A, 162A, 171A, 172A are configured as flat surfaces generally perpendicular to a direction of extension of the second duct member 120 or the fourth duct member 140 (the upward-downward direction in FIG. 5). The inclined surfaces 151B, 152B, 161B, 162B, 171B, 172B are configured as surfaces obliquely extending from laterally outer ends of the contact surfaces 151A, 152A, 161A, 162A, 171A, 172A toward the ends of the corresponding connecting tubular portions 113, 131, 114 in directions inclined toward the center of the duct D in the lateral direction.

As shown in FIG. 2, the duct D is disposed astride the seat cushion S1 and the seat back S2. To be more specific, the duct D is laid in such a stretched state as to extend from an underside of the seat cushion S1 across a rear side of the rear pipe 13 upward toward the seat back S2. The duct D, for the most part, is arranged such that the first duct member 110 and the fourth duct member 140 are disposed at the seat cushion S1, the third duct member 130 is disposed at the seat back S2, and the second duct member 120 is disposed astride the seat cushion S1 and the seat back S2. The first connected section C1 is located rearward of the rear pipe 13, and the second connected section C2 is located rearward of the lower frame 24.

As shown in FIG. 6, the duct D is so arranged as to have the first duct member 110 disposed under the support member 30 and on the right side of a laterally central position (center plane CP) of the seat cushion S1. The first duct member 110 is so arranged as to have its front end portion connected to the blower 70 disposed under the pan frame 12, the first tubular portion 111 extending in a generally rearward direction, the second tubular portion 112 extending across under the rear pipe 13, and the first connecting tubular portion 113 located at a rear side of the rear pipe 13.

Figure 7:
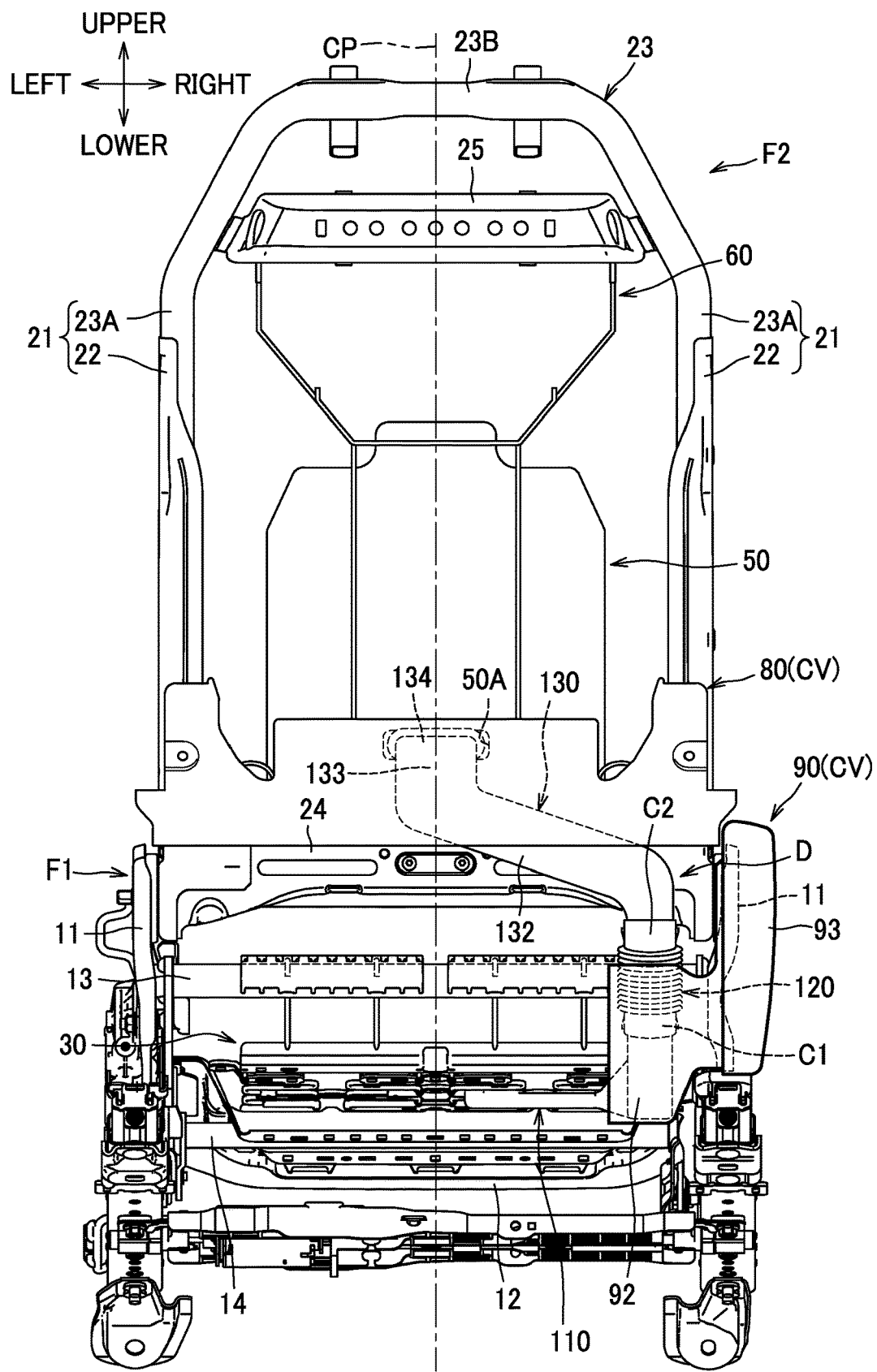
FIG. 7 is a view of a back frame, the duct, and a cover member as viewed from the rear.

As shown in FIG. 7, the duct D is so arranged as to have the second duct member 120 extending in a generally upward direction and disposed astride the cushion frame F1 and the back frame F2. The second duct member 120 is, in other words, the first connected section C1 and the second connected portion C2 are, located in a position shifted closer to the right cushion side frame 11 than to the center plane CP in the lateral direction.

Also, the duct D is so arranged as to have the third tubular portion 132 of the third duct member 130 extending at a rear side of the lower frame 24 in an obliquely upward direction toward the center plane CP, and the fourth tubular portion 133 extending in a generally upward direction along the center plane CP. Furthermore, the duct D is so arranged as to have the back connecting tubular portion 134 of the third duct member 130 extending in a generally frontward direction, through the opening 50A of the pressure-receiving member 50, and connected to the air passage A2 formed in the back pad P2 (see FIG. 2).

As shown in FIG. 5(a), the second engageable portion 152 and the fourth engageable portion 154 are provided at a left side surface of the first connected section C1, and the sixth engageable portion 162 and the eighth engageable portion 164 are provided at a left side surface of the second connected section C2. The tenth engageable portion 172 is provided at a left side surface of the first tubular portion 111, and the twelfth engageable portion 174 is provided in the left connecting wall portion 143. On the other hand, the first engageable portion 151 and the third engageable portion 153 are provided at a right side surface of the first connected section C1, and the fifth engageable portion 161 and the seventh engageable portion 163 are provided at a right side surface of the second connected section C2. The ninth engageable portion 171 is provided at a right side surface of the first tubular portion 111, and the eleventh engageable portion 173 is provided in the right connecting wall portion 143.

Hereupon, the first connected section C1 is located in a position shifted closer to the right cushion side frame 11; accordingly, the first engageable portion 151 and the third engageable portion 153 are provided at a side surface of the first connected section C1 that is more distant than the second engageable portion 152 and the fourth engageable portion 154 from the center plane CP (see FIG. 7) in the lateral direction. Similarly, the fifth engageable portion 161 and the seventh engageable portion 163 are provided at a side surface of the second connected section C2 that is more distant than the sixth engageable portion 162 and the eighth engageable portion 164 from the center plane CP in the lateral direction.

As shown in FIG. 1, the car seat S is arranged such that the car seat S and a door DR for openably closing a doorway for getting in and out of a space at the rear of the car seat S therethrough which space may be made available by folding the seat back S2 of the car seat S forward are disposed at the right side. Therefore, as shown in FIG. 1 and FIG. 5(a), the first engageable portion 151 and the third engageable portion 153 provided at the right side surface of the first connected section C1 are located closer, in the lateral direction, to the door DR than the second engageable portion 152 and the fourth engageable portion 154 provided at the left side surface of the first connected section C1.

As shown in FIG. 7, the car seat S comprises a cover member CV. The cover member CV includes a rear cover 80 and a side frame cover 90.

The rear cover 80 is formed of plastic or the like in a shape of a plate elongate in the lateral direction, and disposed rearward of the fourth tubular portion 133 and the back connecting tubular portion 134 of the third duct member 130. The rear cover 80 has its left and right end portions fastened by bolts or otherwise fixed to laterally inwardly extending portions of the rear ends of the left and right back side frames 21. In this way, the rear cover 80 is attached to and bridges the left and right back side frames 21. Provision of the rear cover 80 as described above may make it possible to have a connected region, at which the duct D and the back pad P2 are connected, protected by the rear cover.

Figure 8:
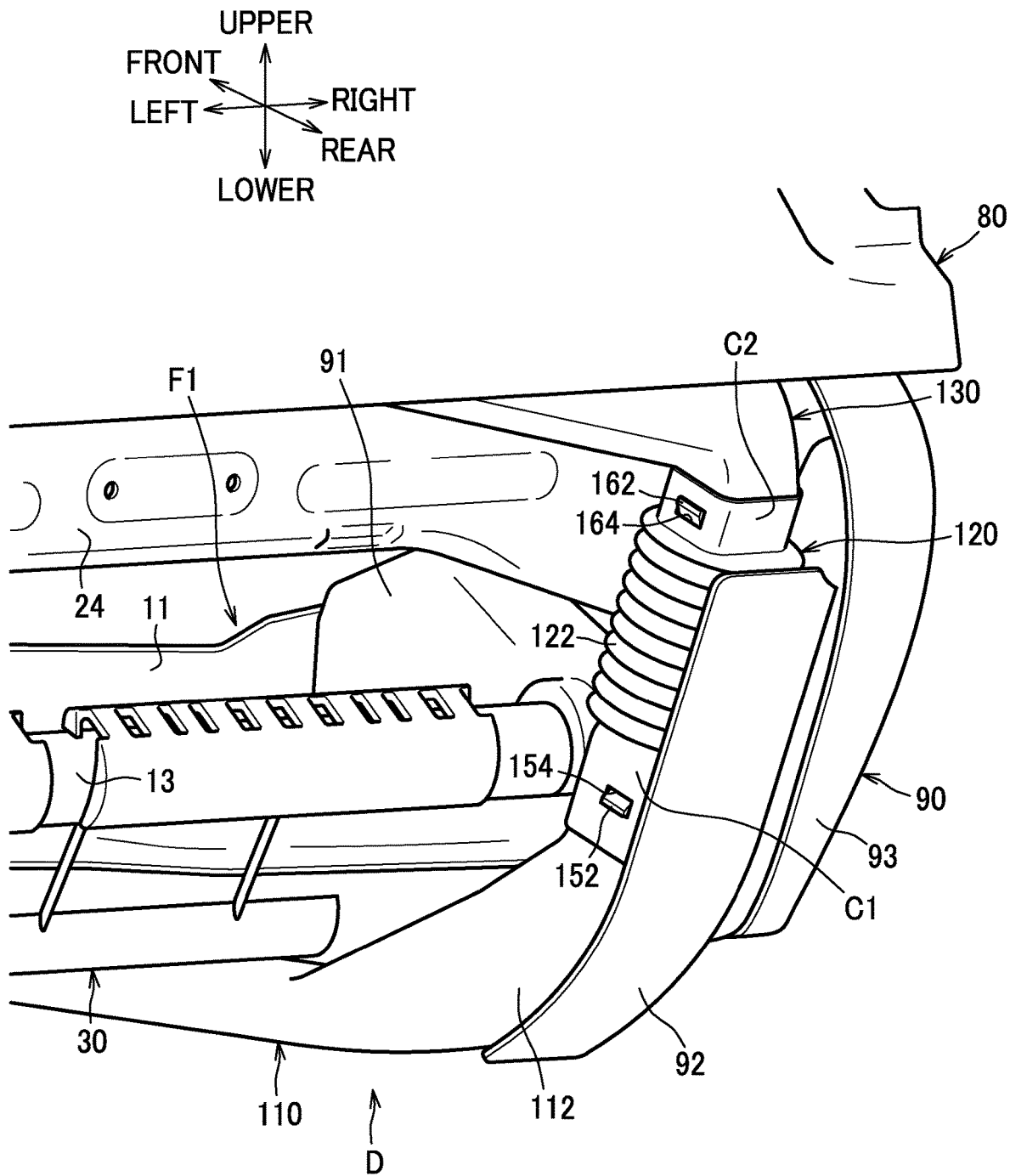
FIG. 8 is a perspective view of the duct and a side frame cover as viewed from a laterally inner side.

The side frame cover 90 is a member configured to cover a rear end portion of the right cushion side frame 11. The side frame cover 90 is made of plastic, and includes a side frame cover portion 91 (see FIG. 8), a duct cover portion 92, and a reclining mechanism cover portion 93. As shown in FIG. 8, the side frame cover portion 91 is a portion with which a laterally inner side of the rear end portion of the right cushion side frame 11 is covered.

Figure 9:
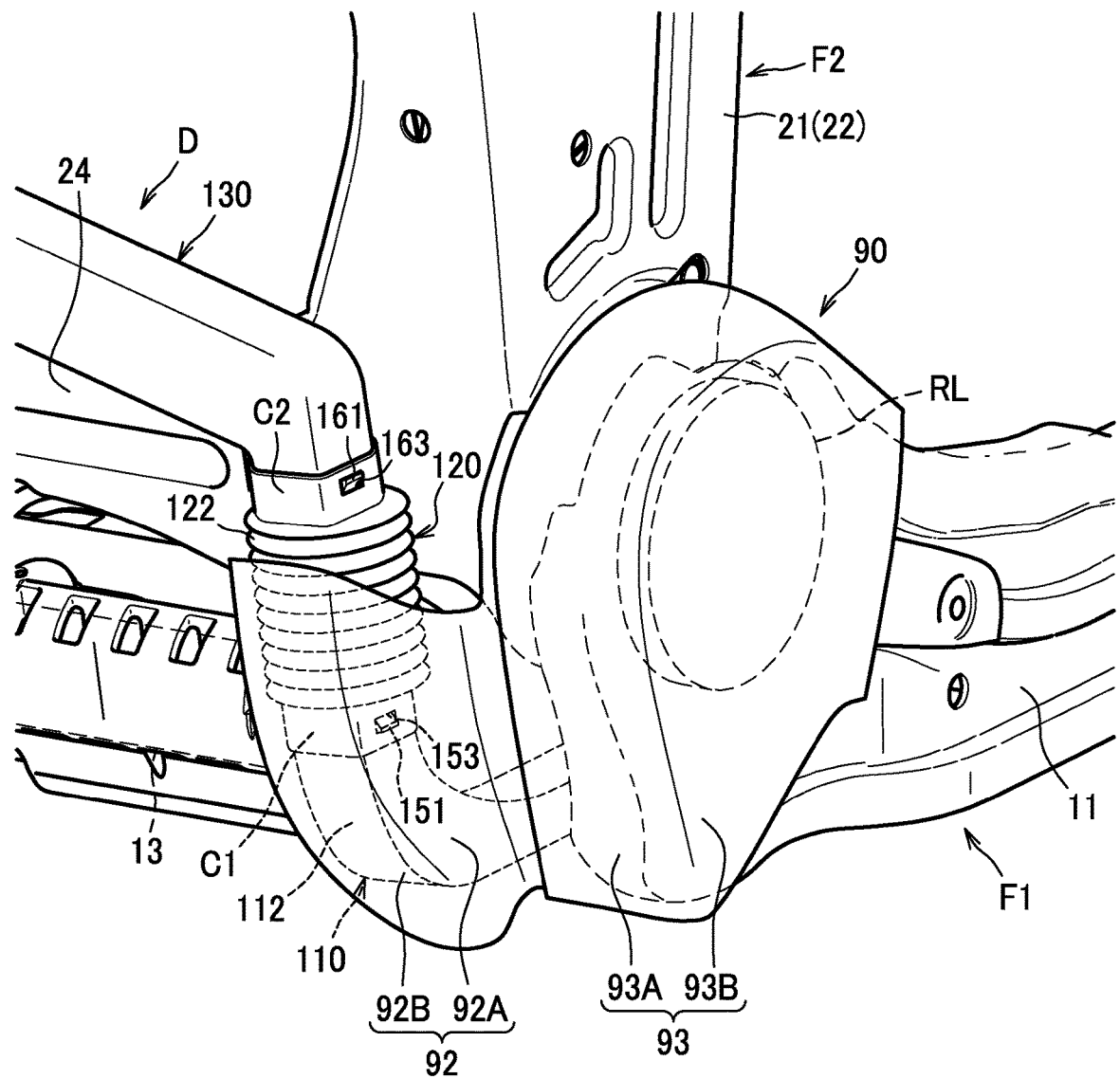
FIG. 9 is a perspective view of the duct and the side frame cover as viewed from a laterally outer side.

The duct cover portion 92 is a portion which is disposed rearward of the cushion frame F1 and with which part of the duct is covered. To elaborate, the duct cover portion 92 is disposed rearward of the rear pipe 13, and partially covers the second tubular portion 112, the first connected section C1 and the first bellows portion 122. More specifically, as shown in FIG. 9, the duct cover portion 92 includes a first side cover portion 92A extending from a rear end of the side frame cover portion 91 rearward, and a rear cover portion 92B extending from a rear end of the first side cover portion 92A laterally inward. The first side cover portion 92A covers right sides of the second tubular portion 112, the first connected section C1, and the first bellows portion 122. The rear cover portion 92B has a cross-sectional shape of an arc jutting obliquely in a rearward-and-downward direction, extends in a downward-and-frontward direction, and covers rear sides of the second tubular portion 112, the first connected section C1 and the first bellows portion 122.

The duct cover portion 92 is configured such that the first side cover portion 92A covers a right side surface of the first connected section C1 and the rear cover portion 92B covers a rear side surface of the first connected section C1. On the other hand, the duct cover portion 92 fails to cover a left side surface of the first connected section C1. In this way, the duct cover portion 92 is configured to cover the first engageable portion 151 and the third engageable portion 153 provided at the right side surface of the first connected section C1, but not to cover the second engageable portion 152 and the fourth engageable portion 154 provided at the left side surface of the first connected section C1, as shown in FIG. 8.

As shown in FIG. 9, the reclining mechanism cover portion 93 is a portion with which the reclining mechanism RL is covered, and is formed generally in a shape of a cup that opens on a laterally inner side and a bottom side thereof. The reclining mechanism cover portion 93 is so formed as to extend from the side frame cover portion 91 along a peripheral surface of the reclining mechanism RL, and includes a peripheral cover portion 93A with which the rear side, the upper side and the front side of the reclining mechanism RL are covered, and a second side cover portion 93B with which the laterally outer side of the reclining mechanism RL is covered.

In accordance with the present embodiment as described above, the side frame cover 90 which constitutes the cover member CV covers the first connected section C1 that is a section at which the first duct member 110 and the second duct member 120 are connected, and thus can serve to protect the connected section (first connected section C1) of the duct D made up of a plurality of parts.

Moreover, since the side frame cover 90 is configured to cover the first engageable portion 151 and the third engageable portion 153 but not to cover the second engageable portion 152 and the fourth engageable portion 154, the side frame cover 90 can be made compact in comparison with an alternative configuration in which the cover member is configured to cover all the engageable portions.

Since the second engageable portion 152 and the fourth engageable portion 154 are provided at the left side surface of the first connected section C1, the second engageable portion 152 and the fourth engageable portion 154 that are not covered with the side frame cover 90 can be made less likely to be hit by a foot of a rear-seat occupant. Accordingly, the second engageable portion 152 and the fourth engageable portion 154 with which engagement for connection at the connected section of the duct D is established can be protected. Since the second engageable portion 152 and the fourth engageable portion 154 are not provided at the front side surface or the rear side surface which is covered with the side frame cover 90, of the first connected section C1, but provided at the left side surface thereof which is not covered with the side frame cover 90, the state of engagement of the second engageable portion 152 and the fourth engageable portion 154 can be visually inspected.

Since the first connected section C1 is located in a position shifted closer to the right cushion side frame 11 than to the center plane CP, the likelihood that the first connected section C1 or its vicinity will be hit by a foot of a rear-seat occupant from the rear can be reduced in essence, in comparison with an alternative configuration in which the first connected section C1 is located in a position shifted closer to the center plane CP. Accordingly, the second engageable portion 152 and the fourth engageable portion 154 that are not covered with the side frame cover 90 can be protected more effectively. Moreover, since the likelihood that the first connected section C1 or its vicinity, in other words, the second duct member 120, will be hit by a foot of a rear-seat occupant from the rear can be reduced in essence, the engageable portions 161 to 164 that are not covered with the side frame cover 90 can be properly protected as well.

Since the first engageable portion 151 and the third engageable portion 153 are located closer to the door DR for getting in and out of a space at the rear of the car seat S than the second engageable portion 152 and the fourth engageable portion 154, there is a possibility that a foot or other part of a passenger getting in a space at the rear of the car seat S would hit the side surface (surface of the first connected section C1 at which the first engageable portion 151 and the third engageable portion 153 are provided) or its vicinity; however, the first engageable portion 151 and the third engageable portion 153 can be protected effectively by the side frame cover 90 in that the first engageable portion 151 and the third engageable portion 153 are covered with the side frame cover 90.

Since the first engageable portion 151 and the second engageable portion 152 are configured as projections, and the third engageable portion 153 and the fourth engageable portion 154 are configured as holes with which the engageable portions 151, 152 are engageable, the connection of the first duct member 110 and the second duct member 120 can be established in simple structure. The same may apply to the connection of the second duct member 120 and the third duct member 130 as well as the connection of the first duct member 110 and the fourth duct member 140.

When an occupant sits down on the seat cushion S1 and weighs down the cushion pad P1 and the support member 30, the first duct member 110 moves down to a lower position, and a force thus acted thereon would tend to cause the first duct member 110 to become disconnected from the second duct member 120; nevertheless, the contact surfaces 151A, 152A of the engageable portions 151, 152 caught by the edges of the engageable portions 153, 154 can serve to make the first duct member 110 less likely to be disconnected from the second duct member 120.

When the seat back S2 is tilted forward relative to the seat cushion S1, the third duct member 130 is tilted together with the seat back S2, and a force thus acted thereon would tend to cause the third duct member 130 to become disconnected from the second duct member 120; nevertheless, the contact surfaces 161A, 162A of the engageable portions 161, 162 caught by the edges of the engageable portions 163, 164 can serve to make the third duct member 130 less likely to be disconnected from the second duct member 120.

Next, a description will be given of a second embodiment. Hereinafter, the same structural features as those of the embodiment described previously are designated by the same reference numerals and an explanation thereof will be omitted where appropriate, and the features different from those of the embodiment described previously will be explained in detail.

Figure 10:
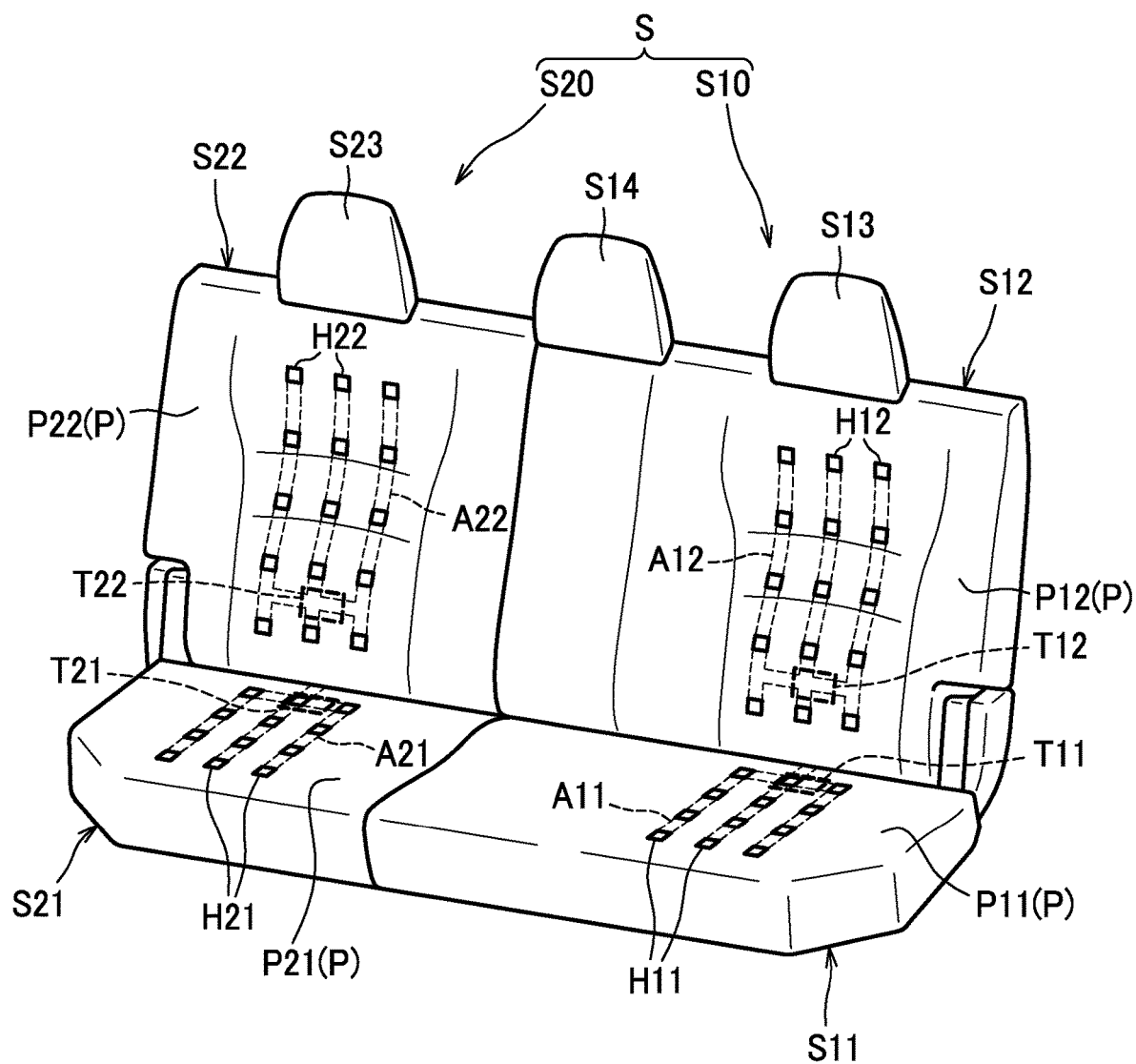
FIG. 10 is a view showing a car seat as a vehicle seat according to a second embodiment.

As shown in FIG. 10, a vehicle seat of the present embodiment is configured as a car seat S installed in an automobile, and includes a first seat portion S10 and a second seat portion S20. The first seat portion S10 and the second seat portion S20 are located left and right adjacent to each other without intervening space.

The first seat portion S10 includes a first seat cushion S11 and a first seat back S12. The first seat portion S10 also includes a first headrest S13 and a third headrest S14.

The second seat portion S20 includes a second seat cushion S21 and a second seat back S22. The second seat portion S20 also includes a second headrest S23.

The first seat portion S10 has a width greater than that of the second seat portion S20, and the first seat back S12 and the second seat back S22 are configured to be independently forward-foldable. In other words, the car seat S is a so-called 60/40 split fold-down seat.

Figure 11:
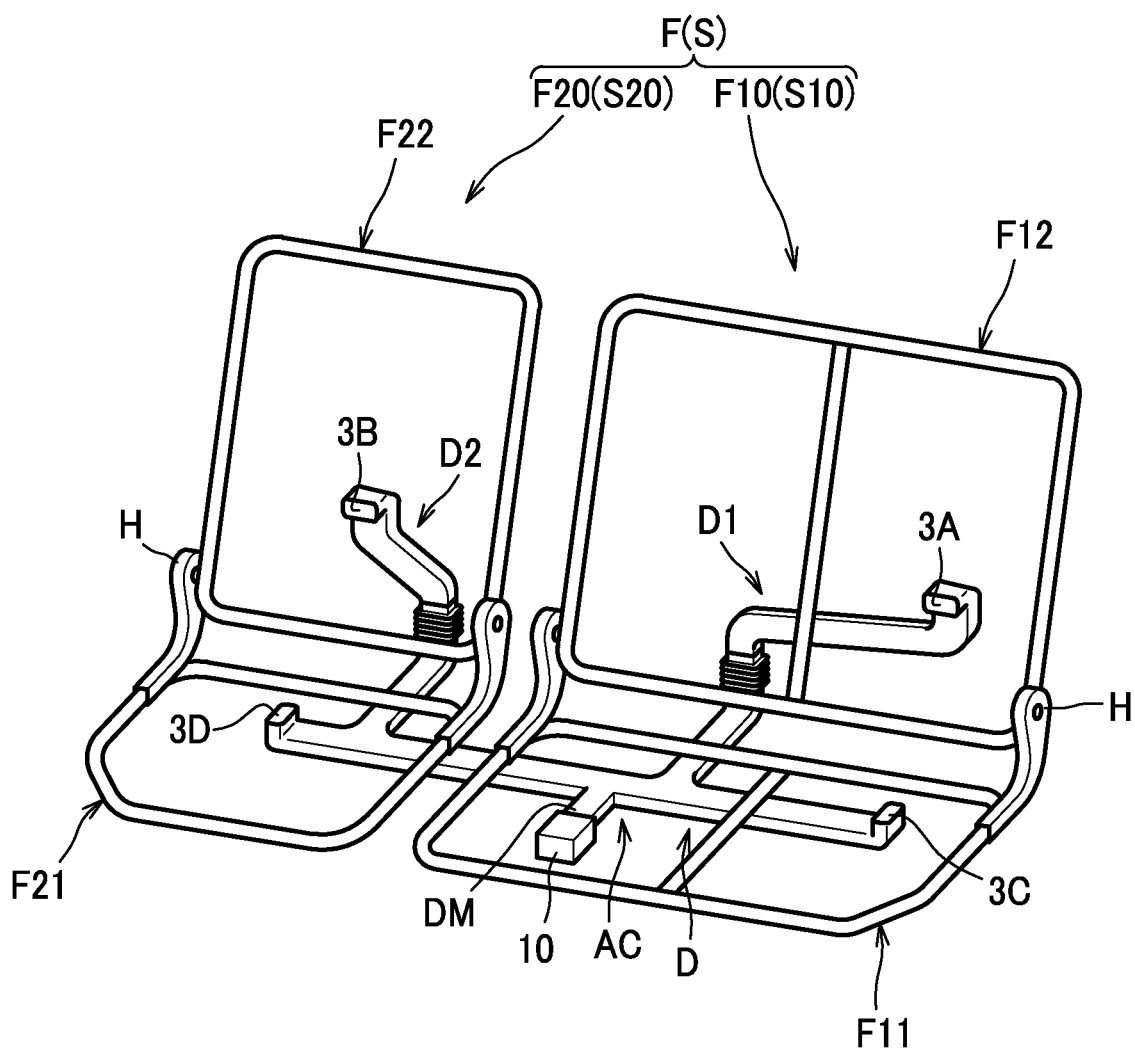
FIG. 11 is a perspective view of a seat frame and an air conditioner.

In the interior of the car seat S, a seat frame F as shown in FIG. 11 is included. As shown in FIG. 10, the seat frame F is covered with a pad P, and further, the pad P is covered with an outer covering (not shown).

A pad P11 of the first seat cushion P11 has an air passage A11 formed therein, and a plurality of ventilation holes H11 connecting to the air passage A11 are arranged at a surface of the pad P11. A connecting port T11 connecting to the air passage A11 is arranged at an undersurface of the pad P11.

A pad P12 of the first seat back S12 has an air passage A12 formed therein, and a plurality of ventilation holes H12 connecting to the air passage A12 are arranged at a surface of the pad P12. A connecting port T12 connecting to the air passage A12 is arranged at a rear surface of the pad P12.

A pad P21 of the second seat cushion S21 has an air passage A21 formed therein, and a plurality of ventilation holes H21 connecting to the air passage A21 are arranged at a surface of the pad P21. A connecting port T21 connecting to the air passage A21 is arranged at an undersurface of the pad P21.

A pad P22 of the second seat back S22 has an air passage A22 formed therein, and a plurality of ventilation holes H22 connecting to the air passage A22 are arranged at a surface of the pad P22. A connecting port T22 connecting to the air passage A22 is arranged at a rear surface of the pad P22.

As shown in FIG. 11, the seat frame F includes a first seat frame F10 corresponding to the first seat portion S10, and a second seat frame F20 corresponding to the second seat portion S20.

The first seat frame F10 includes a first seat cushion frame F11 and a first seat back frame F12 linked to the first seat cushion frame F11 via a hinge H.

The second seat frame F20 includes a second seat cushion frame F21 and a second seat back frame F22 linked to the second seat cushion frame F21 via a hinge H.

The car seat S further includes an air conditioner AC configured to cause air to be jetted out from respective ventilation holes H11, H12, H21, H22.

The air conditioner AC includes a blower 10 and a duct D.

The blower 10 is, for example, a sirocco fan. The blower 10 is disposed under the first seat cushion frame F11, and fixed via a bracket (not shown) to the first seat cushion frame F11.

The duct D connects the blower 10 and each of the first seat portion S10 and the second seat portion S20.

Figure 12:
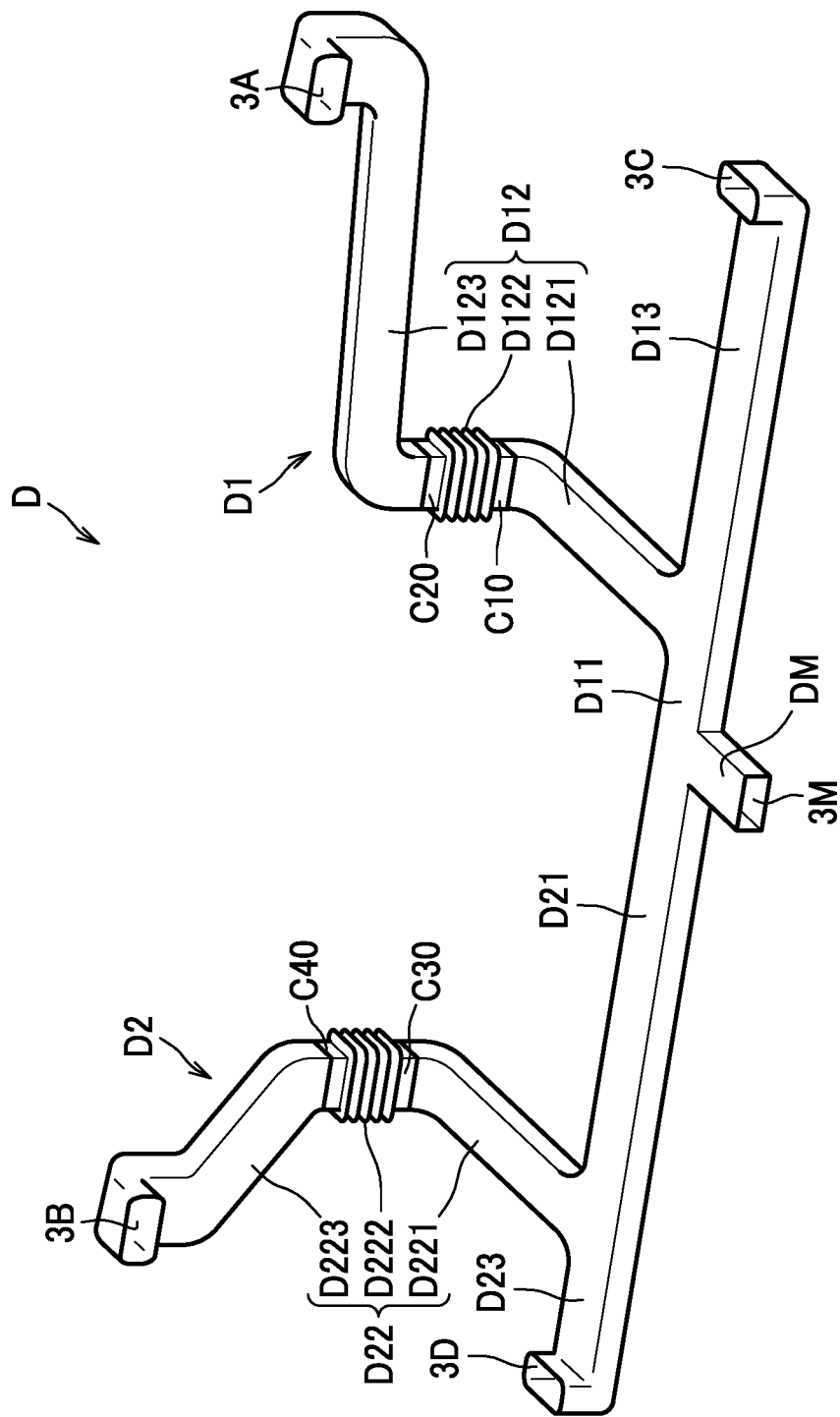
FIG. 12 is a perspective view of a duct.

As shown in FIG. 12, the duct D includes a main duct portion DM, a first duct portion D1 and a second duct portion D2.

The main duct portion DM extends in a front-rear direction, and includes a blower-side connecting port 3M provided at a front end thereof for connection to the blower 10. The blower-side connecting port 3M is connected to an air outlet of the blower 10 (see FIG. 11 and FIG. 15).

The first duct portion D1 branches off from the main duct portion DM leftward. The first duct portion D1 includes a first main duct portion D11 extending from the main duct portion DM leftward, a first branch duct portion D12 branching off from the first main duct portion D11 rearward, and a third branch duct portion D13 branching off from the first main duct portion D11 leftward.

The first branch duct portion D12 extends astride the first seat cushion S11 and the first seat back S12. To be more specific, the first branch duct portion D12 includes a first lower duct D121 provided at the first seat cushion S11 and extending in the front-rear direction, a bellows portion D122 provided at rear portions of the first seat cushion S11 and the first seat back S12 and extending in an upward-downward direction, and a first upper duct D123 provided at a rear portion of the first seat back S12 and extending obliquely in a leftward-and-upward direction.

The first lower duct D121 includes a rear end portion inserted in and connected to a lower end portion of the bellows portion D122. The first upper duct D123 includes a lower end portion inserted in and connected to an upper end portion of the bellows portion D122. In short, the first branch duct portion D12 constituting the first duct portion D1 is made up of a plurality of parts connected to each other. Hereupon, a section at which the bellows portion D122 and the first lower duct D121 are connected is referred to as a first connected section C10, and a section at which the bellows portion D122 and the first upper duct D123 are connected is referred to as a second connected section C20. The first connected section C10 is defined by overlaid regions of the bellows portion D122 and the first lower duct D121, and the second connected section C20 is defined by overlaid regions of the bellows portion D122 and the first upper duct D123.

The bellows portion D122 has flexible and extensible-contractible capabilities. This allows the bellows portion D122 to be caused, when the first seat back S12 is folded forward, to bend and extend, thereby changing the shape of the first duct portion D1.

The first upper duct D123 includes an upper end portion which is bent frontward and has a first connecting port 3A provided at a front end thereof for connection to the air passage A12 formed in the first seat back S12. The upper end portion of the first upper duct D123 is inserted in the connecting port T12 of the air passage A12 in the first seat back S12, whereby the first connecting port 3A is connected to the connecting port T12 (see FIG. 15).

The third branch duct portion D13 includes an extreme end portion which is bent upward and has a third connecting port 3C provided at an upper end thereof for connection to the air passage A11 formed in the first seat cushion S11. The extreme end portion of the third branch duct portion D13 is inserted in the connecting port T11 of the air passage A11 in the first seat cushion S11, whereby the third connecting port 3C is connected to the connecting port T11 (see FIG. 15).

The second duct portion D2 branches off from the main duct portion DM rightward. The second duct portion D2 includes a second main duct portion D21 extending from the main duct portion DM rightward, a second branch duct portion D22 branching off from the second main duct portion D21 rearward, and a fourth branch duct portion D23 branching off from the second main duct portion D21 leftward.

The second branch duct portion D22 extends astride the second seat cushion S21 and the second seat back S22. To be more specific, the second branch duct portion D22 includes a second lower duct D221 provided at the second seat cushion S21 and extending in the front-rear direction, a bellows portion D222 provided at rear portions of the second seat cushion S21 and the second seat back S22 and extending in an upward-downward direction, and a second upper duct D223 provided at a rear portion of the second seat back S22 and extending obliquely in a rightward-and-upward direction.

The second lower duct D221 includes a rear end portion inserted in and connected to a lower end portion of the bellows portion D222. The second upper duct D223 includes a lower end portion inserted in and connected to an upper end portion of the bellows portion D222. In short, the second branch duct portion D22 constituting the second duct portion D2 is made up of a plurality of parts connected to each other. Hereupon, a section at which the bellows portion D222 and the second lower duct D221 are connected is referred to as a third connected section C30, and a section at which the bellows portion D222 and the second upper duct D223 are connected is referred to as a fourth connected section C40. The third connected section C30 is defined by overlaid regions of the bellows portion D222 and the second lower duct D221, and the fourth connected section C40 is defined by overlaid regions of the bellows portion D222 and the second upper duct D223.

The bellows portion D222 has flexible and extensible-contractible capabilities. This allows the bellows portion D222 to be caused, when the second seat back S22 is folded forward, to bend and extend, thereby changing the shape of the second duct portion D2.

The second upper duct D223 includes an upper end portion which is bent frontward and has a second connecting port 3B provided at a front end thereof for connection to the air passage A22 formed in the second seat back S22. The upper end portion of the second upper duct D223 is inserted in the connecting port T22 of the air passage A22 in the second seat back S22, whereby the second connecting port 3B is connected to the connecting port T22 (see FIG. 15).

The fourth branch duct portion D23 includes an extreme end portion which is bent upward and has a fourth connecting port 3D provided at an upper end thereof for connection to the air passage A21 formed in the second seat cushion S21. The extreme end portion of the fourth branch duct portion D23 is inserted in the connecting port T21 of the air passage A21 in the second seat cushion S21, whereby the fourth connecting port 3D is connected to the connecting port T21 (see FIG. 15).

Figure 13:
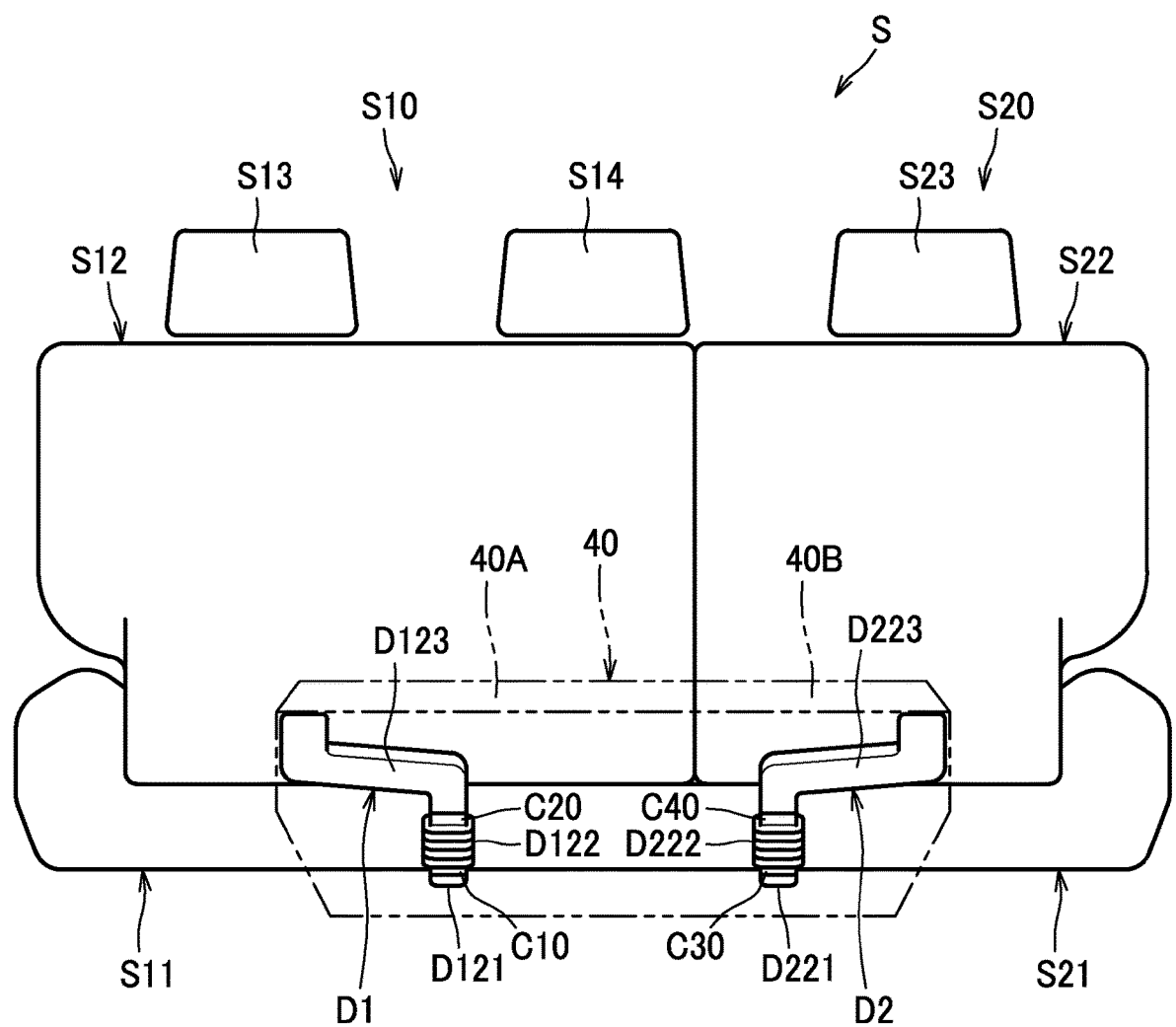
FIG. 13 is a rear view of the car seat.

As shown in FIG. 13, the car seat S includes a cover member 40 with which rear sides of the first duct portion D1 and the second duct portion D2 are covered entirely.

Figure 14:
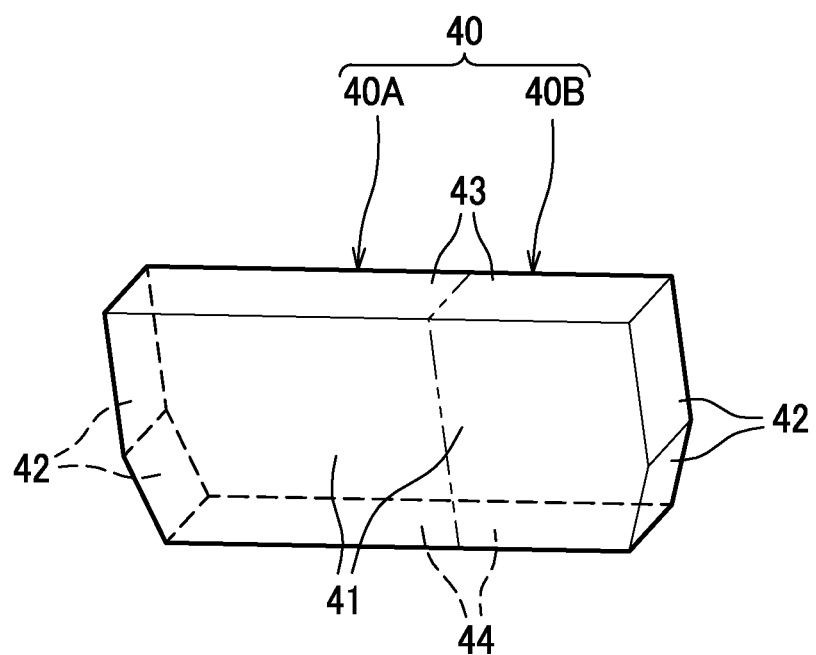
FIG. 14 is a perspective view of a cover member.

As shown in FIG. 14, the cover member 40 includes a first cover member 40A and a second cover member 40B. The first cover member 40A is provided for the first seat cushion S11 and the first seat back S12, and configured to entirely cover a rear side of at least a portion of the first duct portion D1 located above the first seat cushion S11. The second cover member 40B is configured to entirely cover a rear side of at least a portion of the second duct portion D2 located above the second seat cushion S21. In the present embodiment, the first cover member 40A and the second cover member 40B are configured as an integral cover member 40.

The cover member 40 is comprised of a plate-shaped member provided separately from the outer covering. This plate-shaped member may, for example, be made of plastic (including fiber reinforced plastics), metal, or other materials.

The cover member 40 includes a rear wall portion 41 with which rear sides of the first duct portion D1 and the second duct portion D2 are covered, a pair of side wall portions 42 extending from left and right ends of the rear wall portion 41 frontward, an upper wall portion 43 extending from an upper end of the rear wall portion 41 frontward and connecting to the pair of side wall portions 42, and a lower wall portion 44 extending from a lower end of the rear wall portion 41 frontward and connecting to the pair of side wall portions 42.

Figure 15:
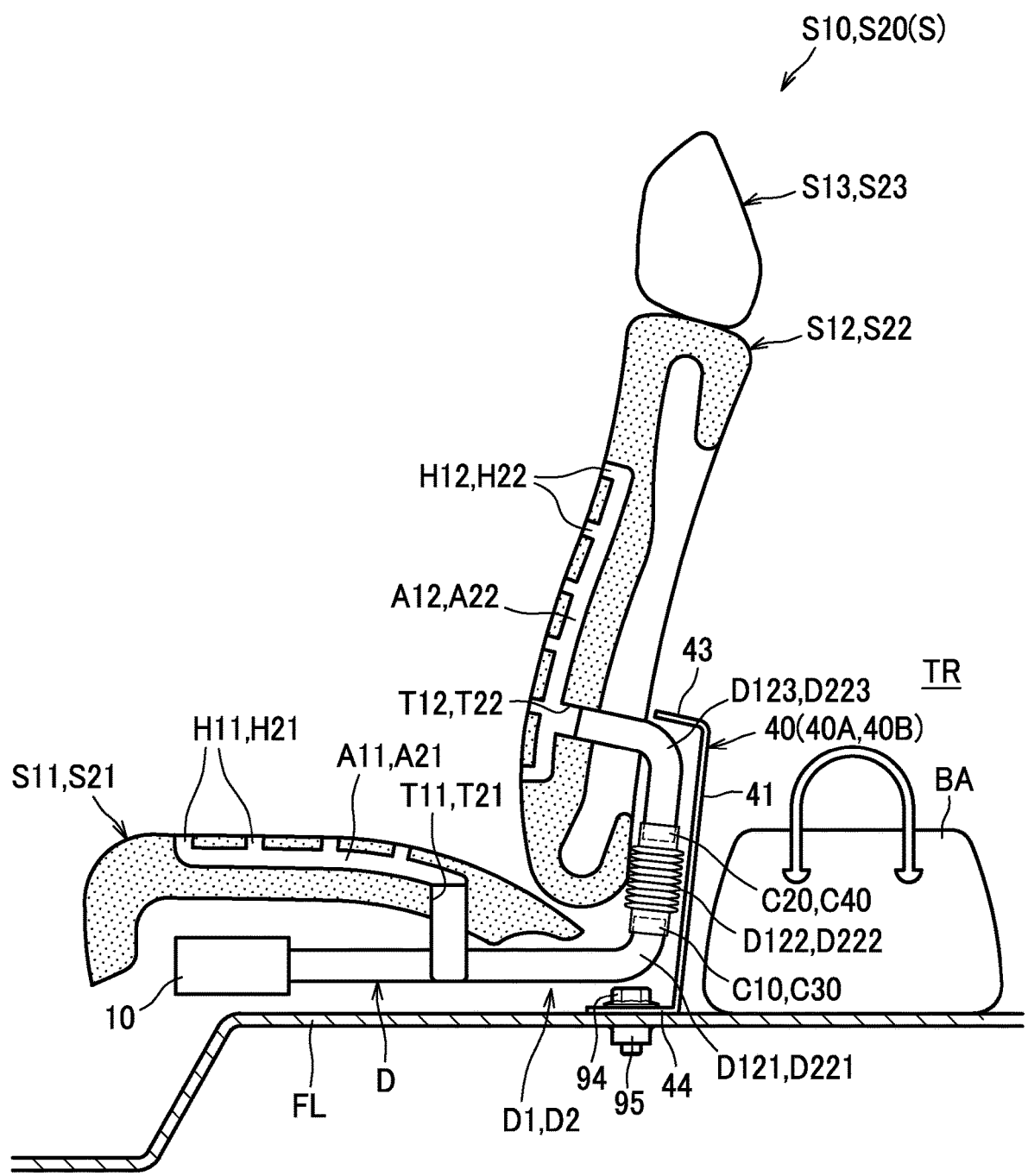
FIG. 15 is a section view illustrating a configuration related to the air conditioner for the car seat.

As shown in FIG. 15, the car seat S is a rear seat of a car, in which a trunk TR is disposed adjacent to rear sides of the first seat back S12 and the second seat back S22. Connection between the first duct portion D1 and the first seat portion S10 and connection between the second duct portion D2 and the second seat portion S20 are provided with the same structure, and FIG. 15 is thus illustrated with reference characters indicated side by side for the first seat portion S10 and the second seat portion S20.

A weld nut 95 is fixed at the floor FL of the car. A bolt 94 is inserted through a hole (not shown) provided in the lower wall portion 44, and the cover member 40 is fastened on the floor FL with the bolt 94 engaged with the weld nut 95.

As shown in FIG. 13 and FIG. 15, the first cover member 40A covers the rear sides of the connected sections of a plurality of parts of the first duct portion D1. To be more specific, the first cover member 40A covers the rear sides of the first connected section C10 and the second connected section C20 of the first duct portion D1. Also, the second cover member 40B covers the rear sides of the connected sections of a plurality of parts of the second duct portion D2. To be more specific, the second cover member 40B covers the rear sides of the third connected section C30 and the fourth connected section C40 of the second duct portion D2.

A description will be given of operations and advantageous effects of the car seat S configured as described above according to the present embodiment.

As shown in FIG. 11, the car seat S of the present embodiment is capable of allowing air from a single blower 10 to flow through the main duct portion DM and the first duct portion D1 into the air passages A11, A12 of the first seat portion S10, to thereby be jetted out from the ventilation holes H11, H12, and to flow through the main duct portion DM and the second duct portion D2 into the air passages A21, A22 of the second seat portion S20, to thereby be jetted out from the ventilation holes H21, H22. Therefore, the seat in which two seat portions are disposed left and right adjacent to each other can be provided with climate control capability at low cost.

Also, in the car seat S, the first duct portion D1 is disposed astride the first seat cushion S11 and the first seat back S12, and the second duct portion D2 is disposed astride the second seat cushion S21 and the second seat back S22, so that air can be forced from the blower 10 provided at the first seat cushion S11 to the first seat back S12 and the second seat back S22. Accordingly, the blower-side connecting port 3M can be located in a position remote from the positions in which the air passages A12, A22 are arranged, so that the degree of flexibility in arrangement of the blower-side connecting port 3M can be increased.

Moreover, since the car seat S comprises the cover member 40 with which the rear side of the duct D is covered entirely as shown in FIG. 15, the first duct portion D1 and the second duct portion D2 can be protected by the cover member 40 even if a baggage BA placed in the trunk TR at the rear side of the car seat S moves fast frontward and bumps against the car seat S at the time of hard braking. Accordingly, the likelihood that the baggage BA will hit the first duct portion D1 or the second duct portion D2 and cause the first duct portion D1 or the second duct portion D2 to become deformed can be reduced. In an alternative embodiment where at the rear side of the car seat S, no trunk is provided and another seat is installed instead, the likelihood that a foot or other part of an occupant seated on that seat at the rear side will hit the duct D and cause the duct D to become deformed can be reduced.

Furthermore, since the cover member 40 is configured to cover the rear sides of the connected sections of a plurality of parts of the first duct portion D1 and the second duct portion D2, i.e., the first connected section C10, the second connected section C20, the third connected section C30 and the fourth connected section C40, the likelihood that these connected sections will be hit by a baggage BA or a foot of an occupant at the rear and the connection of the plurality of parts will be broken off can be reduced.

Although the bellows portions D122, D222 are portions flexible and easy to become deformed, the cover member 40 covers the rear sides of the bellows portions D122, D222, and thus can serve to reduce the likelihood that the bellows portions D122, D222 will be hit by a baggage BA or a foot of an occupant at the rear and become deformed.

Since the cover member 40 is formed of the first cover member and the second cover member formed integrally with each other, the number of parts of the cover member can be reduced and the costs can be lowered further.

Since the cover member 40 is formed generally in the shape of a box having the rear wall portion 41, the pair of side wall portions 42, and the upper wall portion 43, and thus has an increased rigidity, the cover member 40 is made less likely to become deformed even if hit by a baggage BA or the like from the rear, so that the deformation or the like of the first duct portion D1 and the second duct portion D2 can be restrained more effectively. In particular, since the cover member 40 in the present embodiment is formed generally in the shape of a box further having the lower wall portion 44 in addition to the rear wall portion 41, the pair of side wall portions 42, and the upper wall portion 43, the rigidity is extremely high, so that the duct D can be protected effectively.

A description will be given of a third embodiment.

Figure 16:
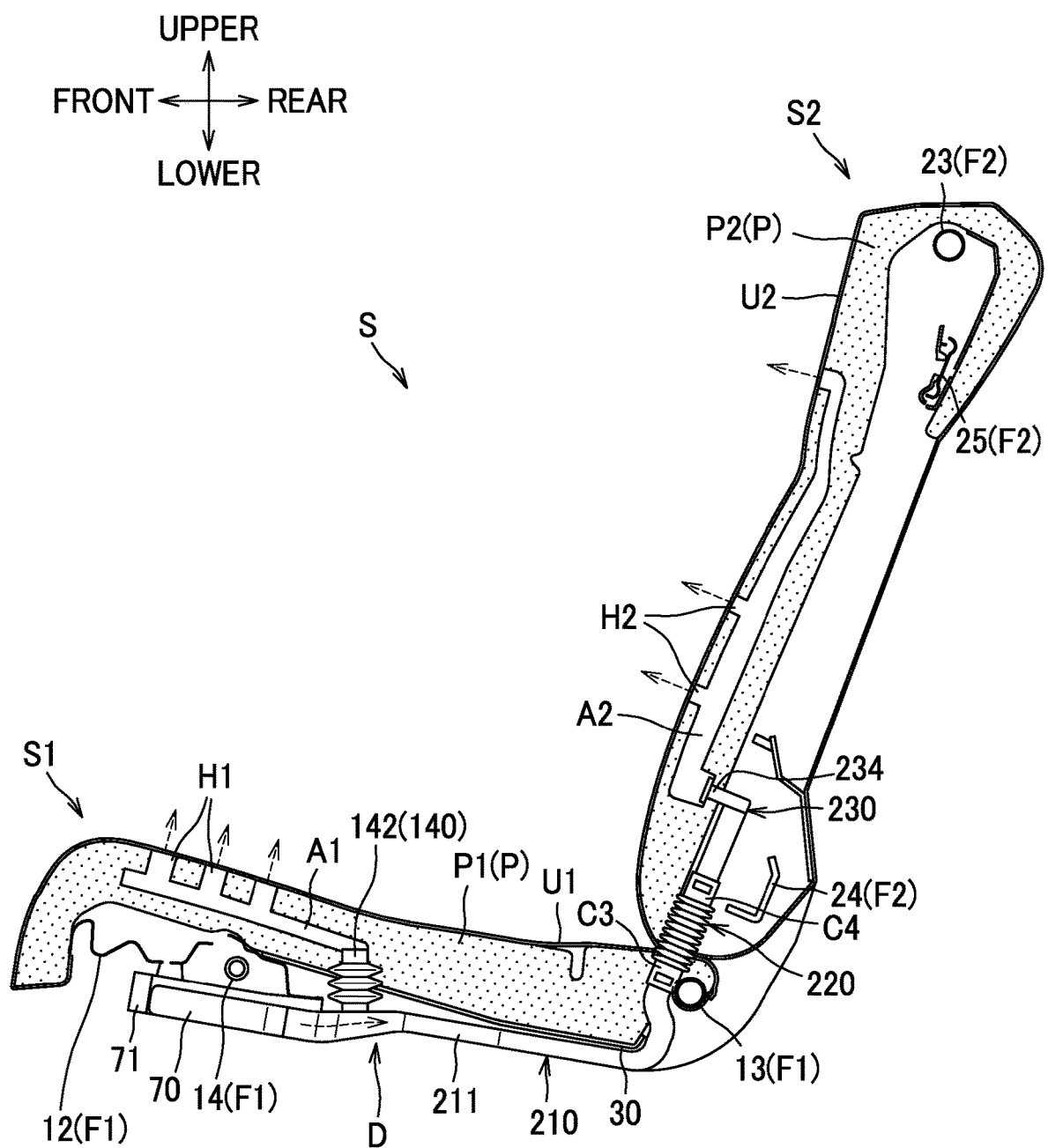
FIG. 16 is a section view of a car seat as a vehicle seat according to a third embodiment.

As shown in FIG. 16, a car seat S comprises a seat frame F (see FIG. 17) upholstered with a pad P and outer coverings U1, U2. The pad P and the seat frame F are configured generally in a manner similar to that in which the relevant features of the car seat S in the first embodiment are configured.

Figure 17:
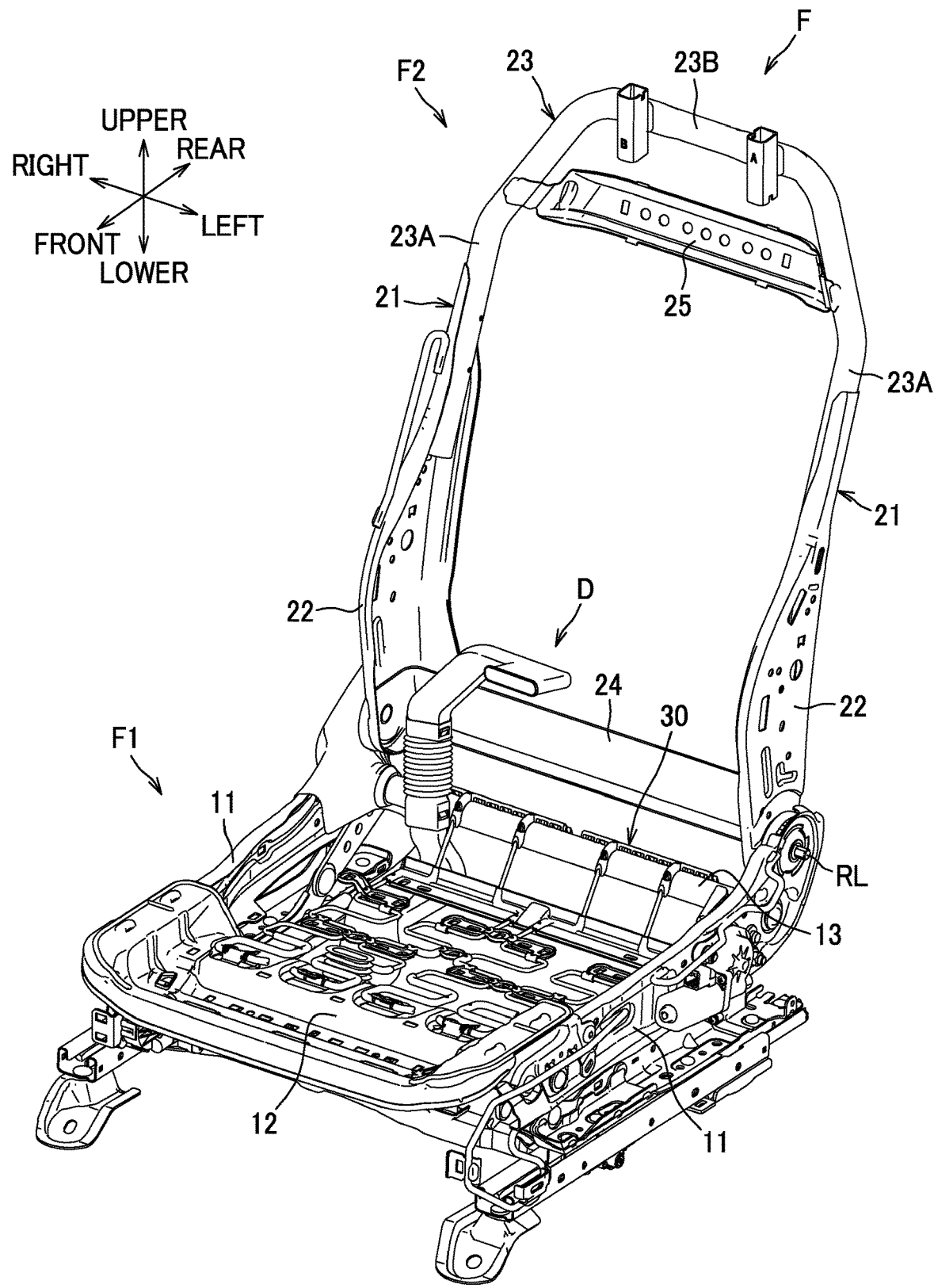
FIG. 17 is a perspective view of a seat frame.

As shown in FIG. 17, the back frame F2 includes left and right sheet-metal frames 22, a pipe frame 23, a lower frame 24 as a lower frame, and a bridging frame 25.

A rear portion of the cushion side frame 11 and a lower portion of the back side frame 21 are rotatably linked via a reclining mechanism RL.

Figure 18:
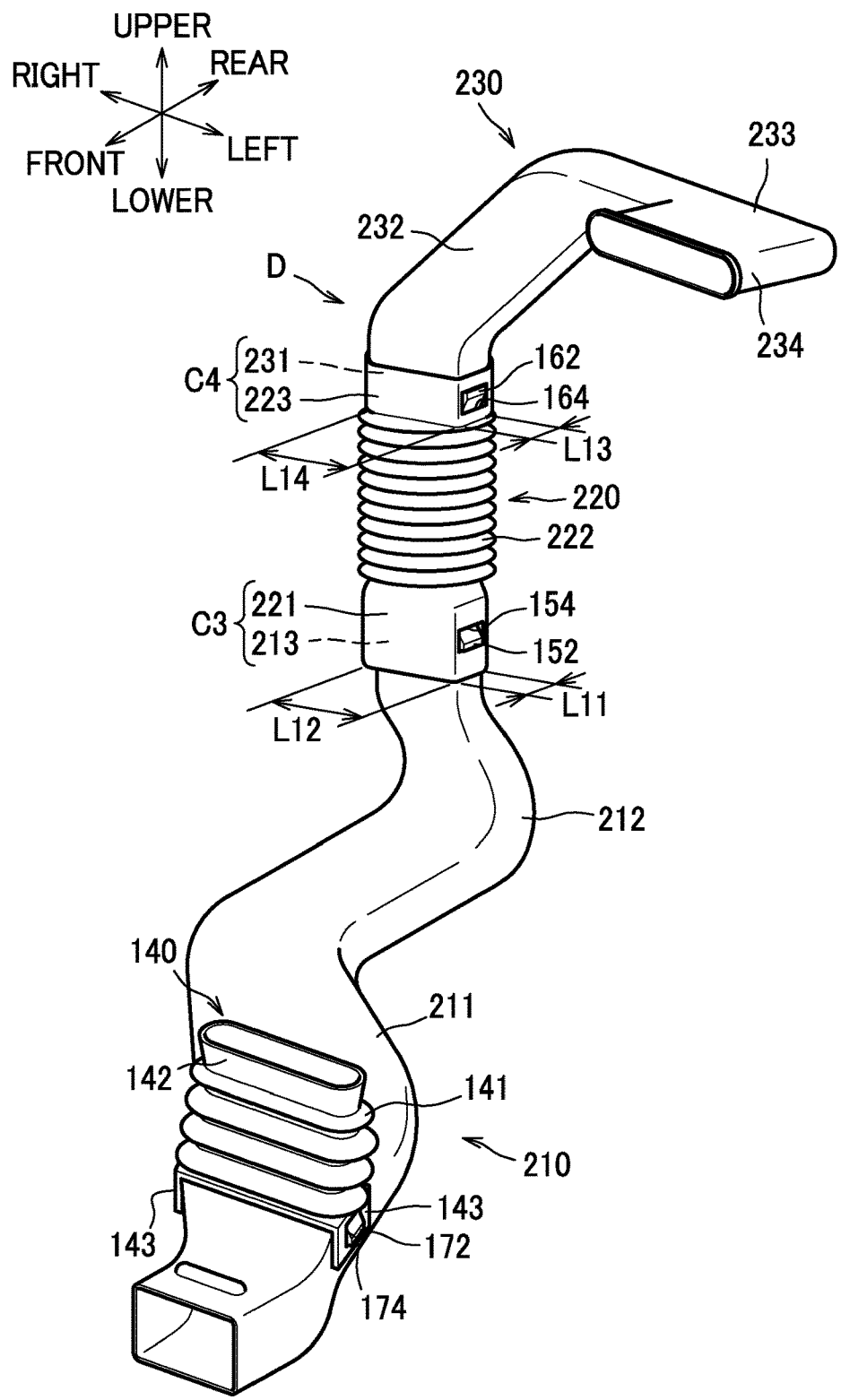
FIG. 18 is a perspective view of a duct.

As shown in FIG. 18, the duct D includes a plurality of parts connected to each other. To be more specific, the duct D includes a first duct member 210 as a first part, a second duct member 220 as a second part and a third part, a third duct member 230 as a fourth part, and a fourth duct member 140.

The first duct member 210 includes a lower tubular portion 211 extending generally in a front-rear direction, a curved tubular portion 212 extending from a rear end of the lower tubular portion 211 and so curved as to bulge rearward and extend upward, and a first connecting tubular portion 213 extending from an upper end of the curved tubular portion 212 substantially in an upward direction. The lower tubular portion 211 includes a front end portion connected to the blower 70 (see FIG. 16).

The second duct member 220 is connected to a rear portion of the first duct member 210, and so provided as to extend substantially in an upward-downward direction. The second duct member 220 includes a second connecting tubular portion 221, a first bellows portion 222 as a flexible portion provided on the top of the second connecting tubular portion 221, and a third connecting tubular portion 223 provided on the top of the first bellows portion 222. The second connecting tubular portion 221 is formed with an inside space thereof so sized as to permit the first connecting tubular portion 213 of the first duct member 210 to be fitted therein. The first bellows portion 222 is configured to have flexibility as well as an extensible-contractible feature.

The third duct member 230 is connected to an upper end of the second duct member 220. The third duct member 230 includes a fourth connecting tubular portion 231 extending generally in an upward-downward direction, a first upper tubular portion 232 extending from an upper end of the fourth connecting tubular portion 231 obliquely in a leftward-and-upward direction (in an obliquely upward direction deviating toward the center of the car seat S in the lateral direction), a second upper tubular portion 233 extending from an upper end of the first upper tubular portion 232 leftward (toward the center of the car seat S in the lateral direction), and a back connecting tubular portion 234 extending from the second upper tubular portion 233 in a generally frontward direction. The fourth connecting tubular portion 231 is formed with such a size as to permit itself to be fitted in an inside space of the third connecting tubular portion 223 of the second duct member 220. The back connecting tubular portion 234 has a front end portion thereof connected to the air passage A2 formed in the back pad P2 (see FIG. 16).

The fourth duct member 140 is connected to a front portion of the first duct member 210, and configured to extend generally in an upward-downward direction. The connecting wall portions 143 configured to extend from a lower end of a second bellows portion 141 downward are provided to sandwich the lower tubular portion 211 of the first duct member 210 from the left and right sides.

As shown in FIG. 19(a), the first duct member 210 includes a first engageable portion 151 and a second engageable portion 152 provided in a first connected section C3, and the second duct member 220 includes a third engageable portion 153 and a fourth engageable portion 154 provided in the first connected section C3. The first connected section C3 is a section at which the first duct member 210 and the second duct member 220 are connected. Specifically, the first connected section C3 is a section at which the first connecting tubular portion 213 of the first duct member 210 and the second connecting tubular portion 221 of the second duct member 220 are connected with and overlaid on one another. The first connected section C3 extends generally in an upward-downward direction. In other words, the duct D includes an upward-downward-extending portion which includes the first connected section C3.

The first engageable portion 151 and the second engageable portion 152 are projections having shapes protruding from left and right side surfaces of the first connecting tubular portion 213 outwardly in a lateral direction. The third engageable portion 153 and the fourth engageable portion 154 are generally rectangular holes piercing through left and right sides with which the engageable portions 151, 152 configured as projections are engageable, and provided in left and right sidewalls of the second connecting tubular portion 221.

The third duct member 230 includes a fifth engageable portion 161 and a sixth engageable portion 162 provided in a second connected section C4, and the second duct member 220 includes a seventh engageable portion 163 and an eighth engageable portion 164 provided in the second connected section C4. The second connected section C4 is a section at which the second duct member 220 and the third duct member 230 are connected. Specifically, the second connected section C4 is a section at which the third connecting tubular portion 223 of the second duct member 220 and the fourth connecting tubular portion 231 of the third duct member 230 are connected with and overlaid on one another. The second connected section C4 extends generally in an upward-downward direction. In other words, the duct D includes an upward-downward-extending portion which includes the second connected section C4.

The fifth engageable portion 161 and the sixth engageable portion 162 are projections having shapes protruding from left and right side surfaces of the fourth connecting tubular portion 231 outwardly in a lateral direction. The seventh engageable portion 163 and the eighth engageable portion 164 are generally rectangular holes piercing through left and right sides with which the engageable portions 161, 162 are engageable, and provided in left and right sidewalls of the third connecting tubular portion 223.

Moreover, as shown in FIG. 19(b), the first duct member 210 includes a ninth engageable portion 171 and a tenth engageable portion 172 provided in the lower tubular portion 211, and the fourth duct member 140 includes an eleventh engageable portion 173 and a twelfth engageable portion 174 provided in the connecting wall portions 143. The ninth engageable portion 171 and the tenth engageable portion 172 are projections having shapes protruding from left and right side surfaces of the lower tubular portion 211 outwardly in a lateral direction. The first duct member 210 is provided with a fifth connecting tubular portion 214 which branches off from the lower tubular portion 211, extends in a generally upward direction, and is fitted in an inside of the fourth duct member 140.

Figure 19:
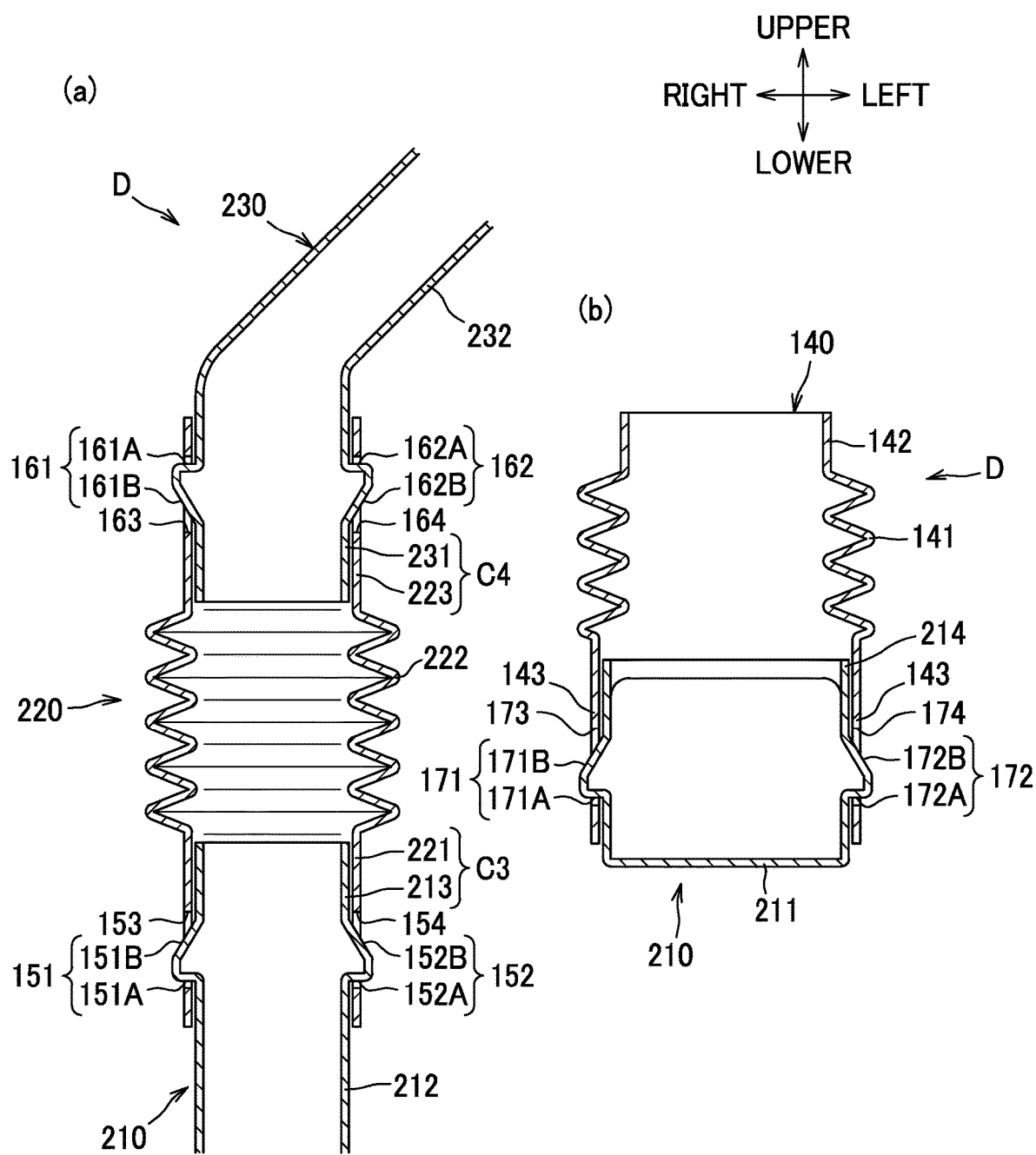
FIG. 19 includes section views (a) and (b) showing connected sections and their vicinities of the duct.

The engageable portions 151, 152, 161, 162, 171, 172 are each configured to have a generally triangular shape in a cross section shown in FIG. 19. The contact surfaces 151A, 152A, 161A, 162A, 171A, 172A are configured as flat surfaces generally perpendicular to a direction of extension of the second duct member 220 or the fourth duct member 140 (the upward-downward direction in FIG. 19). The inclined surfaces 151B, 152B, 161B, 162B, 171B, 172B are configured as surfaces obliquely extending from laterally outer ends of the contact surfaces 151A, 152A, 161A, 162A, 171A, 172A toward the ends of the corresponding connecting tubular portions 213, 231, 214 in directions inclined toward the center of the duct D in the lateral direction.

The ninth engageable portion 171 is provided at a right side surface of the lower tubular portion 211, and the tenth engageable portion 172 is provided at a left side surface of the lower tubular portion 211.

As shown in FIG. 16, the duct D is disposed astride the seat cushion S1 and the seat back S2. To be more specific, the duct D, for the most part, is arranged such that the first duct member 210 and the fourth duct member 140 are disposed at the seat cushion S1, the third duct member 230 is disposed at the seat back S2, and the second duct member 220 is disposed astride the seat cushion S1 and the seat back S2.

Figure 20:
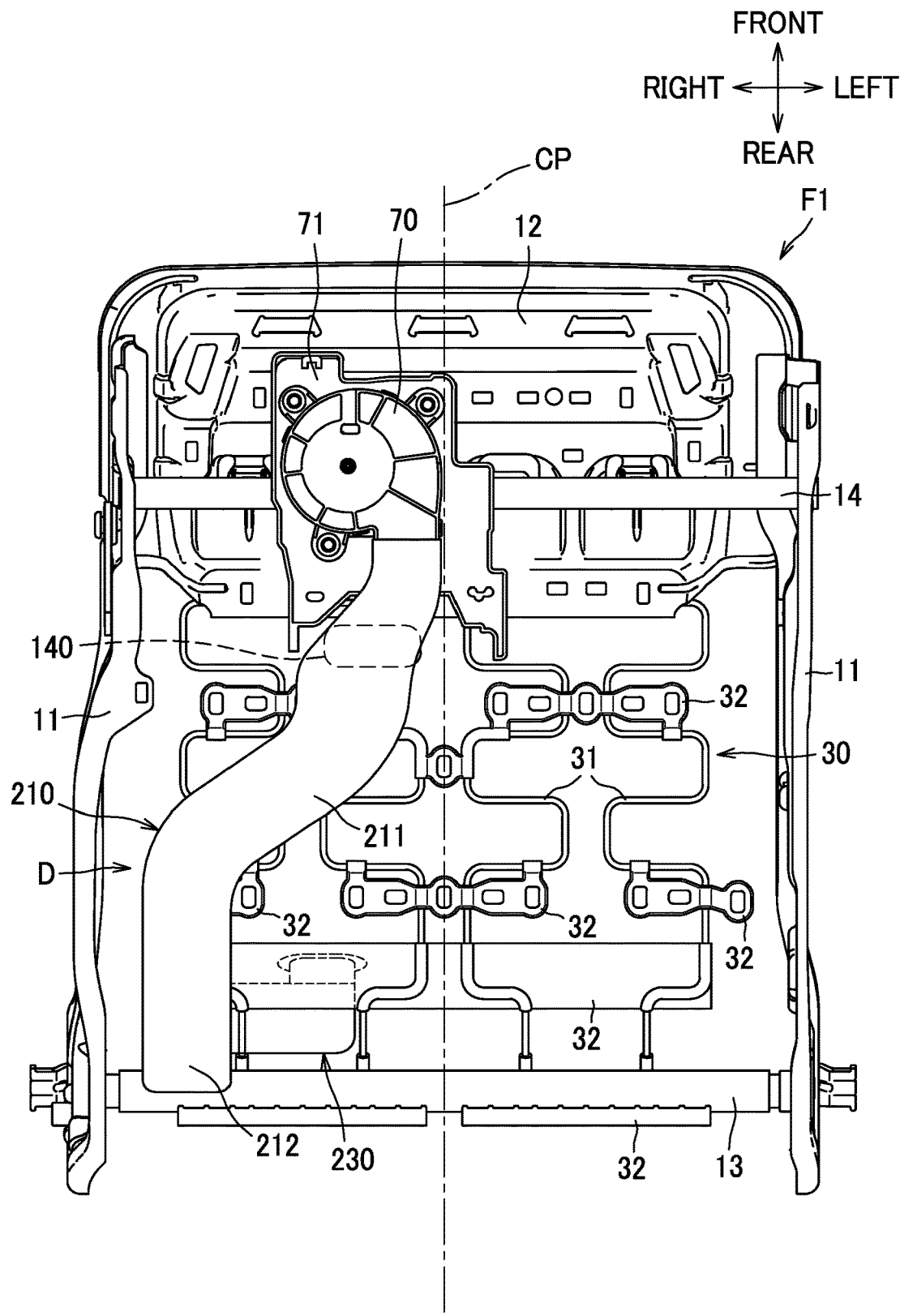
FIG. 20 is a view of a cushion frame, a blower, and the duct as viewed from below.
Figure 21:
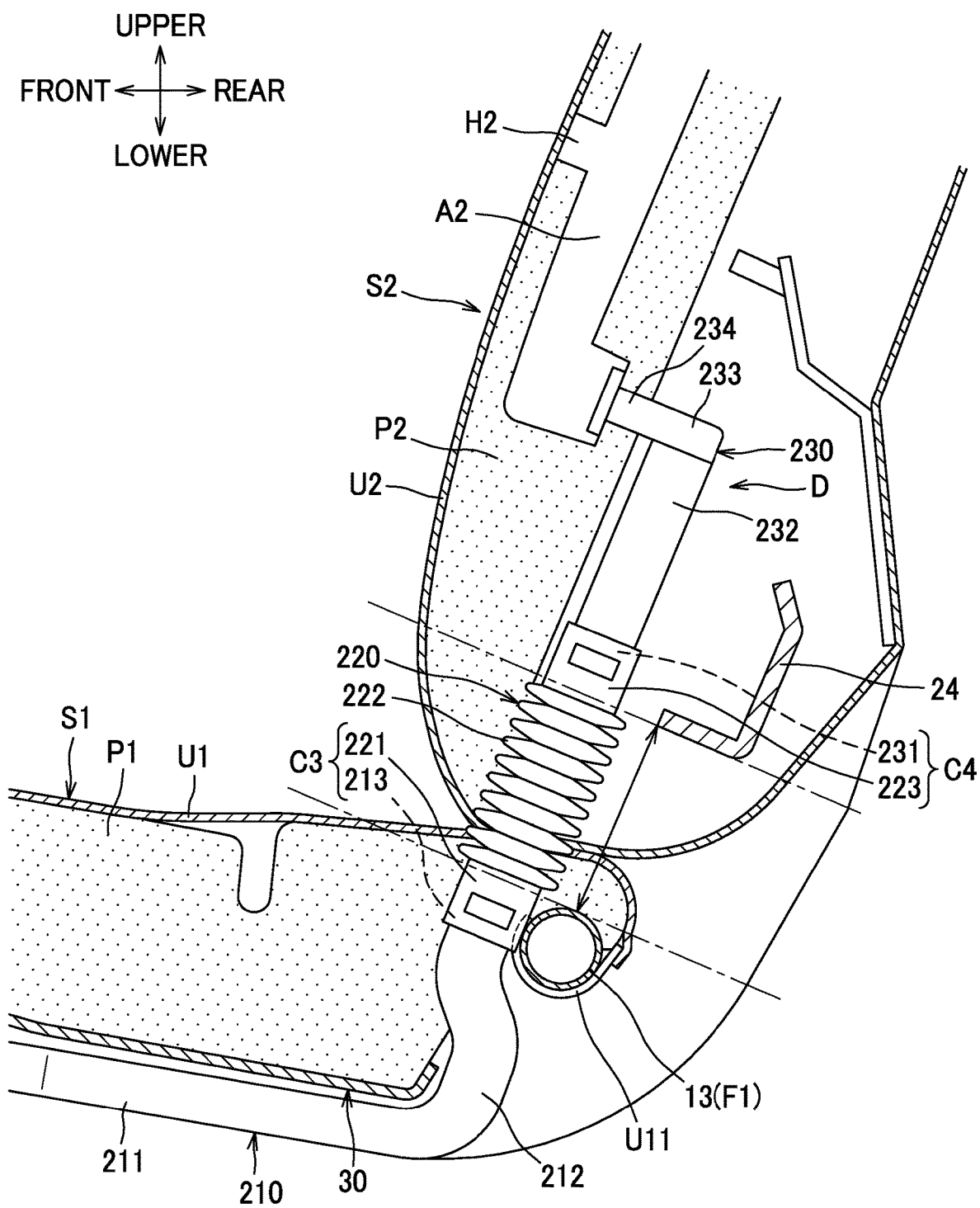
FIG. 21 is an enlarged sectional view of a rear portion of the car seat.

As shown in FIG. 20, the duct D is so arranged as to have the first duct member 210 disposed under the support member 30, on the right side of a laterally central position (center plane CP) of the seat cushion S1. The first duct member 210 has its front end portion connected to the blower 70 disposed under the pan frame 12, and the lower tubular portion 211 extending in a generally rearward direction. As shown in FIG. 21, the curved tubular portion 212 is located below the rear pipe 13 and so curved as to generally have a shape of a letter U bulging rearward as viewed from the left or right direction. To elaborate, the curved tubular portion 212 is so curved as to be routed at the underside, the rear side and the upper side of a rear end portion of the support member 30, thereby taking a detour set up around the rear end portion of the support member 30. The first connecting tubular portion 213 extends substantially in an upward-downward direction, across the front side of the rear pipe 13 toward the seat back S2 located above.

Moreover, the duct D is so arranged as to have the second duct member 220 extending generally in the upward-downward direction, astride the cushion frame F1 and the back frame F2.

Figure 22:
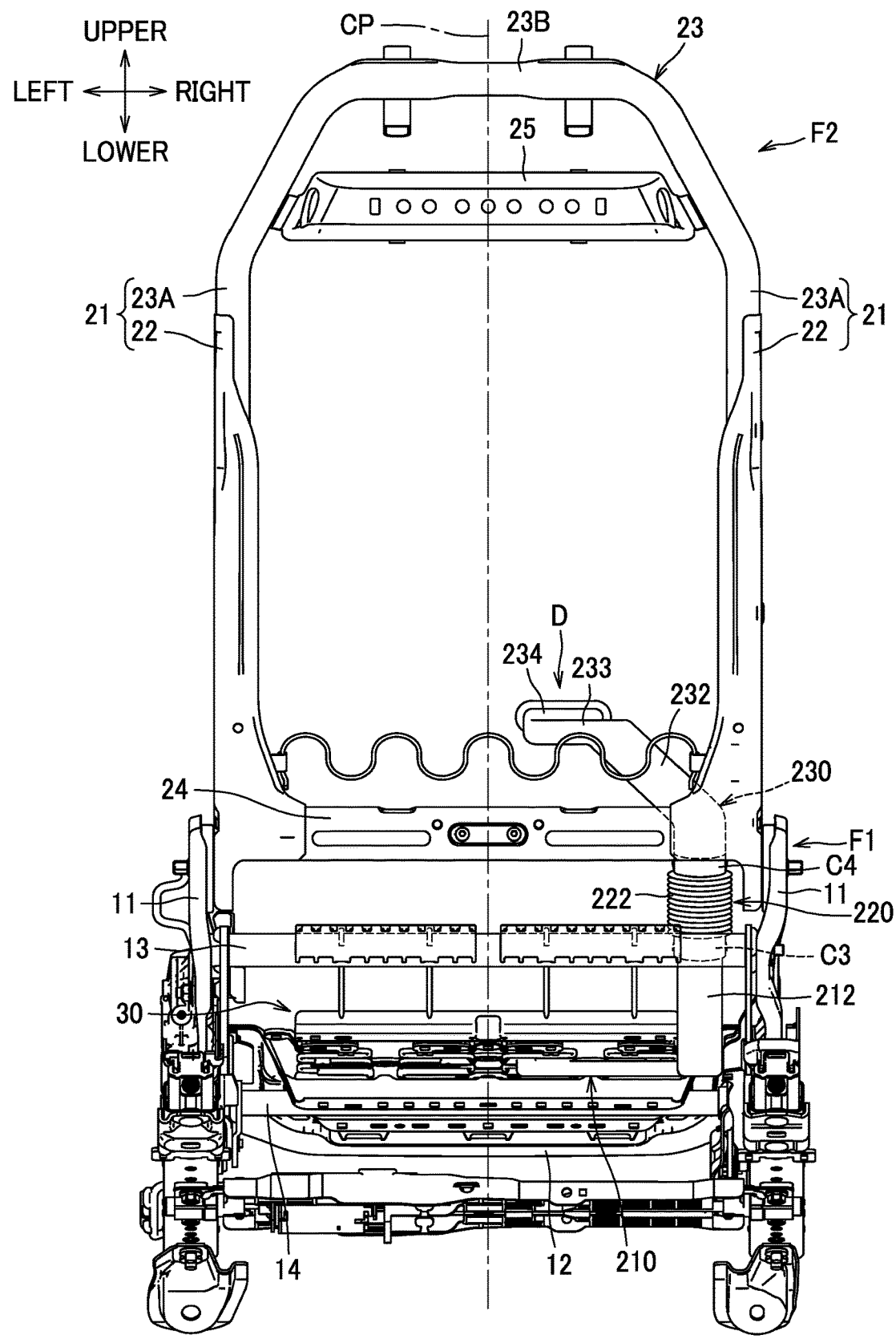
FIG. 22 is a view of a back frame and the duct as viewed from the rear.

As shown in FIG. 22, the duct D is routed in such a manner that the first upper tubular portion 232 and the second upper tubular portion 233 of the third duct member 230 which are connected to the upper end of the second duct member 220 extend toward the center plane CP, and the back connecting tubular portion 234 which extends from the second upper tubular portion 233 in a generally frontward direction is connected to the air passage A2 formed in the back pad P2 (see FIG. 16). The curved tubular portion 212, the first connected section C3 (the first connecting tubular portion 213 and the second connecting tubular portion 221), the bellows portion 222, the second connected section C4 (the third connecting tubular portion 213 and the fourth connecting tubular portion 231) are located in a position shifted closer to the right cushion side frame 11 than to the center plane CP in the lateral direction.

As shown in FIG. 21, the duct D includes a portion extending generally in the upward-downward direction, which portion is so disposed as to extend across the front side of the rear pipe 13 and the lower frame 24 from the seat cushion S1 toward the seat back S2. To be more specific, the first connected section C3 is routed across the front side of the rear pipe 13, and the second connected section C4 and the first upper tubular portion 232 are routed across the front side of the lower frame 24.

The duct D is so routed that the first connected section C3 overlaps the rear pipe 13 as viewed from a front or rear direction. In addition, the duct D is so routed that the second connected section C4 and the first upper tubular portion 232 overlap the lower frame 24 as viewed from the front or rear direction.

The first connected section C3, that is, a portion of the duct D at a front side of the rear pipe 13 has a flow path so shaped as to have a cross section of which a dimension L11 in the front-rear direction is smaller than a dimension L12 in the lateral direction which is a direction perpendicular to the front-rear direction. The second connected section C4, that is, a portion of the duct D at a front side of the lower frame 24 has a flow path so shaped as to have a cross section of which a dimension L13 in the front-rear direction is smaller than a dimension L14 in the lateral direction. In other words, the first connected section C3 (the first connecting tubular portion 213 and the second connecting tubular portion 221) and the second connected section C4 (the third connecting tubular portion 223 and the fourth connecting tubular portion 231) are each configured to have a flat cross-sectional shape compressed in the front-rear direction.

Referring back to FIG. 21, the first bellows portion 222 is located above the rear pipe 13. To elaborate, the first bellows portion 222 is located generally between the rear pipe 13 and the lower frame 24. More specifically, the first bellows portion 222 is between the rear pipe 13 and the lower frame 24 in a direction of extension of the shortest line segment connecting the rear pipe 13 and the lower frame 24 (see an arrow).

The outer covering U1 of the seat cushion S1, with which the cushion frame F1 and the cushion pad P1 are covered, includes a hook U11 provided at an end portion of the outer covering U1, and is fastened to the rear pipe 13 that constitutes the cushion frame F1, with the hook U11 being hooked on the rear pipe 13.

According to the present embodiment described above, the first connected section C3 and its vicinity of the duct D is laid across the front side of the rear pipe 13 and extends from the seat cushion S1 toward the seat back S2; therefore, the first connected section C3 and its vicinity of the duct D can be protected from the rear by the rear pipe 13. In this way, the first connected section C3 and its vicinity of the duct D can be made less likely to be hit by a foot of a rear-seat occupant. Since the duct D is not routed at the rear side of the rear pipe 13, the duct D would not constitute an obstacle to the fastening of the hook U11 provided at the outer covering U1 of the seat cushion S1, to the rear pipe 13, so that the work of fastening the outer covering U1 to the rear pipe 13 can be performed with increased ease.

Since the second connected section C4 and its vicinity of the duct D is laid across the front side of the lower frame 24 and extends from the seat cushion S1 toward the seat back S2, the second connected section C4 and its vicinity of the duct D can be protected from the rear by the lower frame 24. Accordingly, the second connected section C4 and its vicinity of the duct D can be made less likely to be hit by a foot of a rear-seat occupant.

Since the first bellows portion 222 of the duct D is located above the rear pipe 13, a foot of a rear-seat occupant which could possibly hit the rear portion of the seat cushion S1 can be blocked by the rear pipe 13. Accordingly, the first bellows portion 222 that is a softer portion of the duct D can be made less likely to be hit by a foot of a rear-seat occupant.

Since the first bellows portion 222 of the duct D is located between the rear pipe 13 and the lower frame 24, a foot of a rear-seat occupant which could possibly hit the rear portion of the seat cushion S1 or the lower portion of the seat back S2 can be blocked by the rear pipe 13 or the lower frame 24. Accordingly, the first bellows portion 222 can be made less likely to be hit by a foot of a rear-seat occupant, by the rear pipe 13 or the lower frame 24.

Since the first connected section C3 of the duct D is so located as to overlap the rear pipe 13 as viewed from the front or rear direction, a foot of a rear-seat occupant which could possibly hit the rear portion of the seat cushion S1 can be blocked by the rear pipe 13. Accordingly, the connected section at which the first duct member 210 and the second duct member 220 are connected can be made less likely to be hit by a foot of a rear-seat occupant, by the rear pipe 13.

Since the second connected section C4 of the duct D is so located as to overlap the lower frame 24 as viewed from the front or rear direction, a foot of a rear-seat occupant which would possibly hit the lower portion of the seat back S2 can be blocked by the lower frame 24. Accordingly, the connected section at which the second duct member 220 and the third duct member 230 are connected can be made less likely to be hit by a foot of a rear-seat occupant, by the lower frame 24.

Since the first connected section C3 located at the front side of the rear pipe 13 has a flow path so shaped as to have a cross section of which a dimension L11 in the front-rear direction is smaller than a dimension L12 in the lateral direction, the first connected section C3 can be made thinner in the front-rear direction. Accordingly, the duct D can be arranged at the front side of the rear pipe 13 in a way that enables downsizing in the front-rear direction, so that upsizing of the car seat S in the front-rear direction can be restrained.

Since the second connected section C4 located at the front side of the lower frame 24 has a flow path so shaped as to have a cross section of which a dimension L13 in the front-rear direction is smaller than a dimension L14 in the lateral direction, the second connected section C4 can be made thinner in the front-rear direction. Accordingly, the duct D can be arranged at the front side of the lower frame 24 in a way that enables downsizing in the front-rear direction, so that upsizing of the car seat S can be restrained.

Since the duct D includes the curved tubular portion 212 that is so curved as to have a shape of a letter U, the rigidity of the duct D can be improved. Moreover, since the curved tubular portion 212 of the duct D is so curved as to detour around the rear end portion of the support member 30, interference of the duct D with the support member 30 disposed below the rear pipe 13 can be restrained. In other words, the curved tubular portion 212 restraining the duct D from interfering with the support member 30 can ensure that the support member 30 configured to receive a load from an occupant has a sufficient dimension in the front-rear direction, so that the stability in the support for and the comfort of an occupant in the car seat S can be improved.

Since the first engageable portion 151 and the second engageable portion 152 are configured as projections, and the third engageable portion 153 and the fourth engageable portion 154 are configured as holes with which the projections are engageable, the connection of the first duct member 210 and the second duct member 220 can be established in simple structure.

The same may apply to the second duct member 220 and the third duct member 230 as well as the connection of the first duct member 210 and the fourth duct member 140.

When an occupant sits down on the seat cushion S1 and weighs down the cushion pad P1 and the support member 30, the first duct member 210 moves down to a lower position, and a force thus acted thereon would tend to cause the first duct member 210 to become disconnected from the second duct member 220; nevertheless, the contact surfaces 151A, 152A of the engageable portions 151, 152 caught by the edges of the engageable portions 153, 154 can serve to make the first duct member 210 less likely to be disconnected from the second duct member 220.

When the seat back S2 is tilted forward relative to the seat cushion S1, the third duct member 230 is tilted together with the seat back S2, and a force thus acted thereon would tend to cause the third duct member 230 to become disconnected from the second duct member 220; nevertheless, the contact surfaces 161A, 162A of the engageable portions 161, 162 caught by the edges of the engageable portions 163, 164 can serve to make the third duct member 230 less likely to be disconnected from the second duct member 220.

Next, a description of a fourth embodiment will be given. In the present embodiment, the right side corresponds to "one of the left and right sides", and the left side corresponds to "another of the left and right side".

Figure 23:
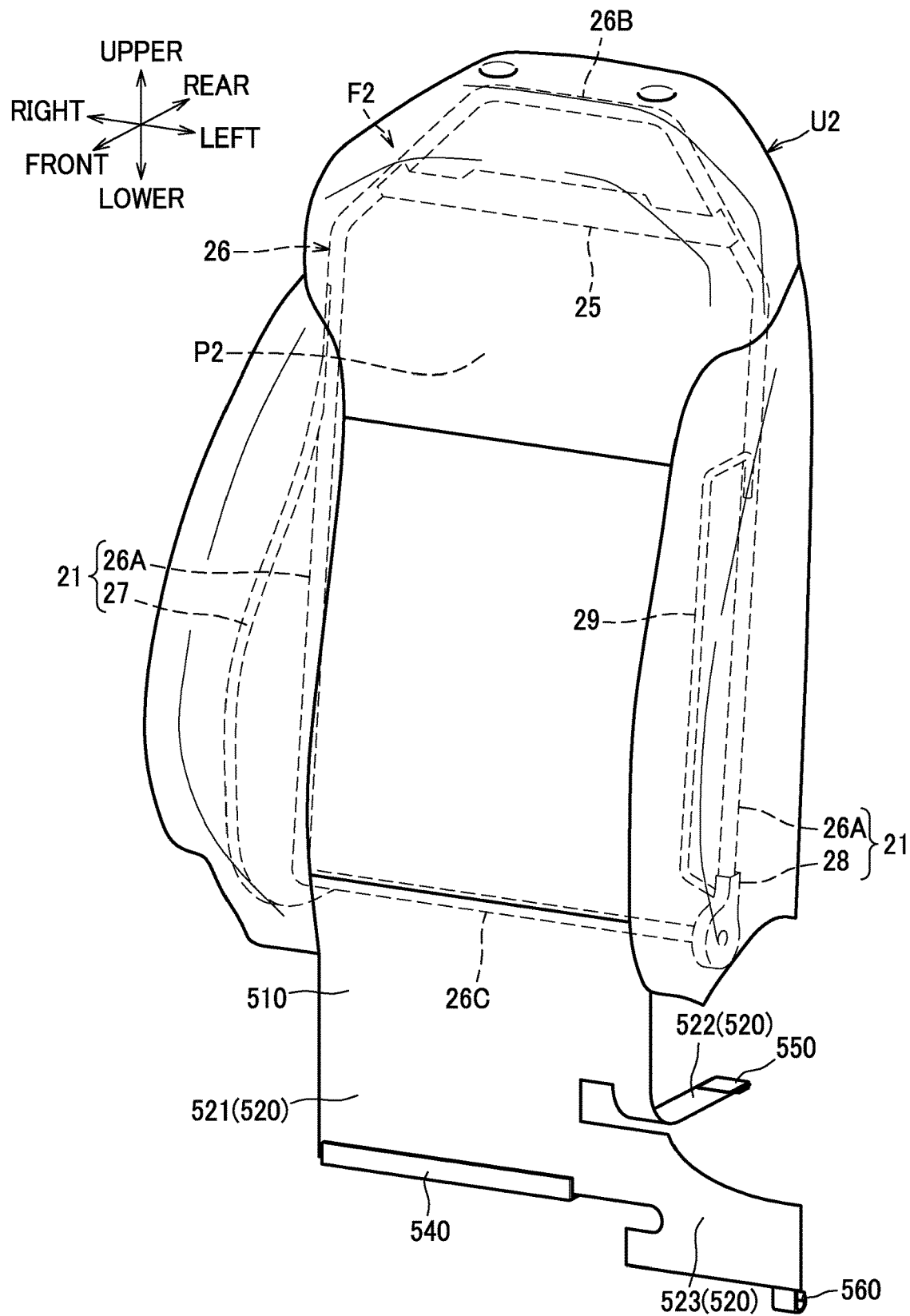
FIG. 23 is a perspective view showing a configuration of a seat back of a car seat as a vehicle seat according to a fourth embodiment.

As shown in FIG. 23, the back frame F2 as a frame member includes a pipe frame 26, sheet-metal frames 27, 28, a bridging frame 25, and a wire frame 29.

The pipe frame 26 is a frame of a metal pipe bent in a generally rectangular shape with both ends located at its bottom and joined to each other by welding, and includes left and right side frames 26A extending substantially in an upward-downward direction, and an upper frame 26B and a lower frame 26C as a pair of connecting portions. The upper frame 26B and the lower frame 26C extend in the lateral direction, and located apart from each other in a perpendicular direction that is perpendicular to the lateral direction, specifically, in the upward-downward direction. The upper frame 26B connects upper ends of the left and right side frames 26A, and the lower frame 26C connects lower ends of the left and right side frames 26A.

The sheet-metal frames 27, 28 are made of sheet metal. The sheet-metal frame 27 is formed in an elongate shape with its longitudinal direction aligned with the upward-downward direction, and welded to a right side portion of the pipe frame 26. The right side frame 26A and the sheet-metal frame 27 constitute a right back side frame 21. The sheet-metal frame 28 is configured and so arranged as to hold a left-side lower end portion of the pipe frame 26 and welded to the pipe frame 26. The left side frame 26A and the sheet-metal frame 28 constitute a left back side frame 21. The left and right back side frames 21 as a pair of side portions are located apart from each other in the lateral direction.

The wire frame 29 is a frame of a metal wire (rod) bent generally in a shape of a letter C, and is fixed to the back side frame 21 located at the left side. To be more specific, the wire frame 29 has its upper end portion fixed to a portion at or near the center in the upward-downward direction of the left side frame 26A by welding, and its lower end portion fixed to a lower end portion of the left side frame 26A by welding.

As shown in FIG. 24(a), the duct D includes a first duct member 210 as a first tubular member, a second duct member 220 as a second tubular member, a third duct member 230, and a fourth duct member 140 which are connected to one another. In the present embodiment, a first upper tubular portion 232A of the third duct member 230 extends from an upper end of a fourth connecting tubular portion 231 in a generally rearward direction. A second upper tubular portion 233A extends from a rear end of the first upper tubular portion 232A rightward (toward the center of the car seat S in the lateral direction) and connects to a back connecting tubular portion 234.

As shown in FIG. 24(b), the first duct member 210 includes a first engageable projection 155 provided in a first connected section C3, and the second duct member 220 includes a first engageable recess 156 provided in the first connected section C3. The first engageable projection 155 is a projection so shaped as to protrude from an outer peripheral surface of a first connecting tubular portion 213 outwardly of the first connecting tubular portion 213, and provided around the entire circumference of the outer peripheral surface of the first connecting tubular portion 213. The first engageable recess 156 is a recess formed in an inner peripheral surface of a second connecting tubular portion 221, and provided around the entire circumference of the inner peripheral surface of the second connecting tubular portion 221. The first duct member 210 and the second duct member 220 are connected by inserting the first connecting tubular portion 213 in the inside of the second connecting tubular portion 221, and causing the first engageable projection 155 and the first engageable recess 156 to be engaged with each other.

As shown in FIG. 24(c), the second duct member 220 includes a second engageable recess 166 provided in a second connected section C4, and the third duct member 230 includes a second engageable projection 165 provided in the second connected section C4. The second engageable recess 166 is a recess formed in an inner peripheral surface of a third connecting tubular portion 223, and provided around the entire circumference of the inner peripheral surface of the third connecting tubular portion 223. The second engageable projection 165 is a projection so shaped as to protrude from an outer peripheral surface of the fourth connecting tubular portion 231 outwardly of the fourth connecting tubular portion 231, and provided around the entire circumference of the outer peripheral surface of the fourth connecting tubular portion 231. The second duct member 220 and the third duct member 230 are connected by inserting the fourth connecting tubular portion 231 in the inside of the third connecting tubular portion 223, and causing the second engageable projection 165 and the second engageable recess 166 to be engaged with each other.

It is to be understood that the engageable projections and the engageable recesses may be configured contrariwise such that the engageable projection is provided on an inner peripheral surface of a tubular portion to be located outside, e.g., the second connecting tubular portion 221 and the third connecting tubular portion 223, and so shaped as to protrude inwardly of the tubular portion, and the engageable recess is provided in an outer peripheral surface of a tubular portion to be inserted and located inside, e.g., the first connecting tubular portion 213 and the fourth connecting tubular portion 231, and so shaped as to be recessed inwardly of the tubular portion.

Figure 25:
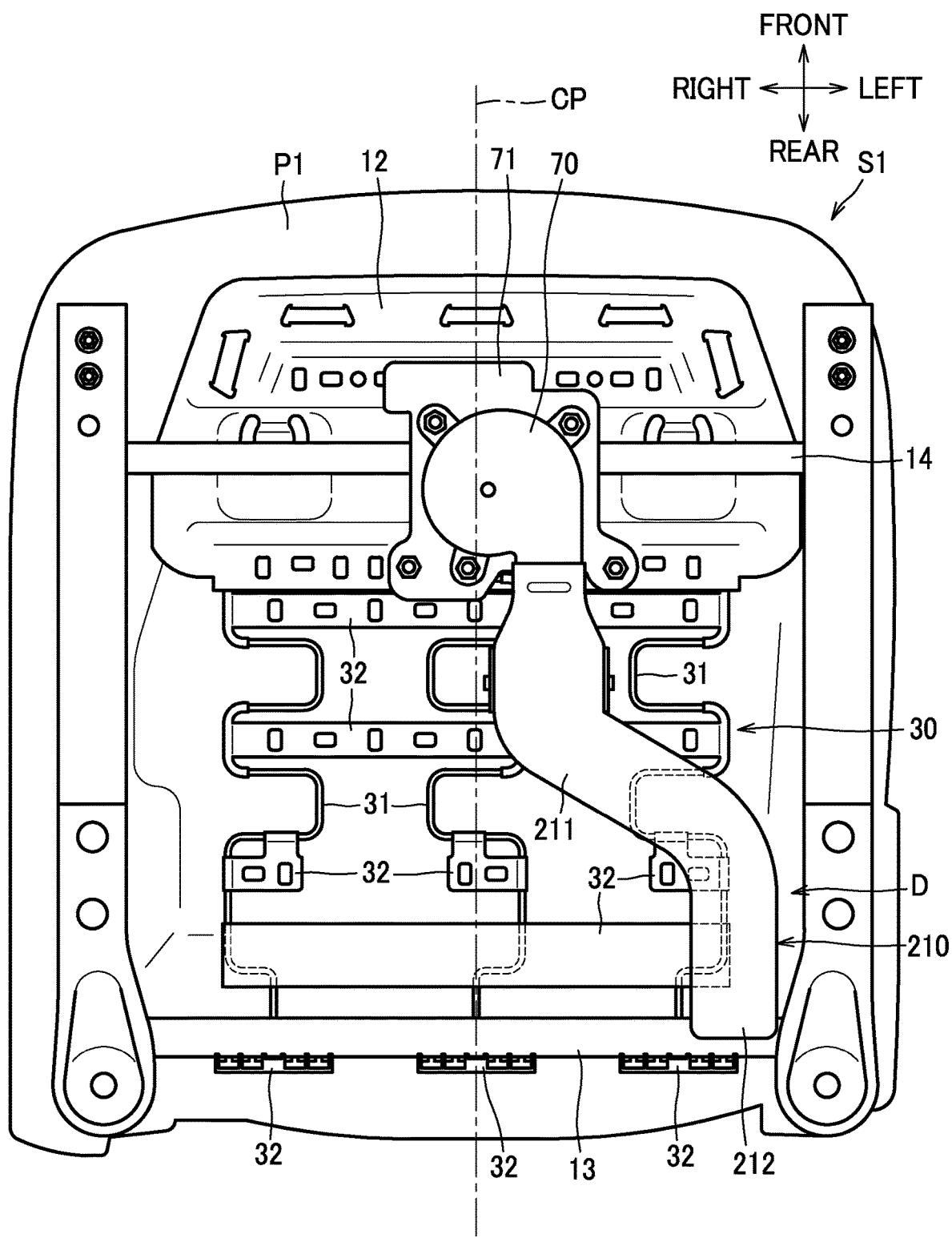
FIG. 25 is a view of the car seat as viewed from below.

As shown in FIG. 25, the duct D includes a lower tubular portion 211 disposed under the support member 30, on the left side of the center plane CP. The lower tubular portion 211 extends generally in the front-rear direction and has its front end portion connected to a blower 70. In the present embodiment, the support member 30 includes a plurality of (specifically, three) wire members 31 arranged side by side in the lateral direction. Each of the wire members 31 is so provided as to bridge the pan frame 12 as a front frame and the rear pipe 13. The duct D is so routed as to have a portion thereof arranged outward of an outermost wire member 31 in the lateral direction. To be more specific, a left side portion of a rear end portion of the lower tubular portion 211 of the duct D is arranged outward of the outermost wire member 31 in the lateral direction.

Figure 26:
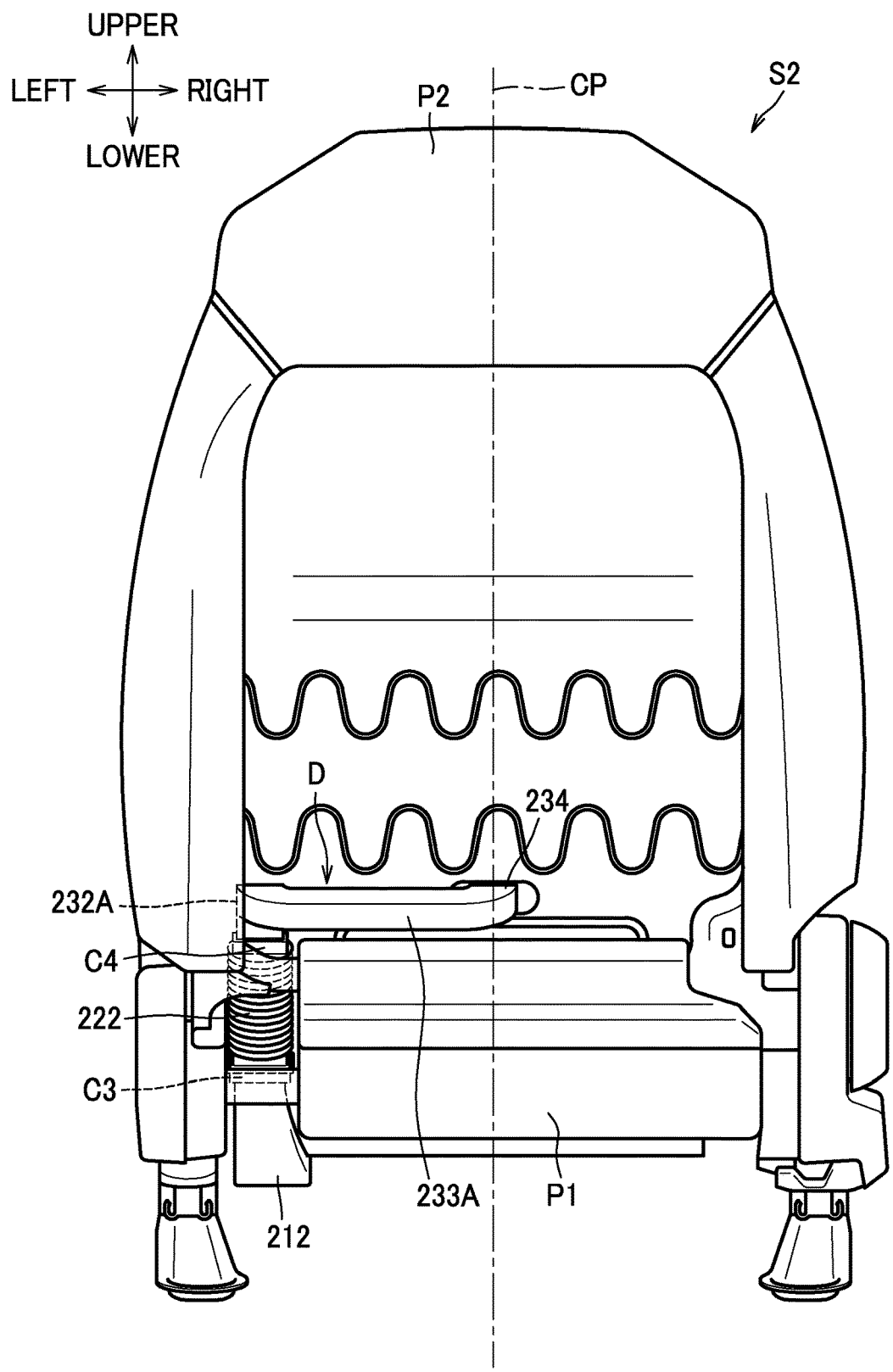
FIG. 26 is a view of the car seat as viewed from the rear.

As shown in FIG. 26, the duct D includes a curved tubular portion 212, a first connected section C3, a first bellows portion 222, a second connected section C4, and a first upper tubular portion 232A which are located in a position shifted closer to the left end than to the center (center plane CP) of the seat back S2 in the lateral direction. In other words, an upward-and-downward-extending portion of the duct D is located in a position shifted closer to the left end than to the center plane CP.

Figure 27:
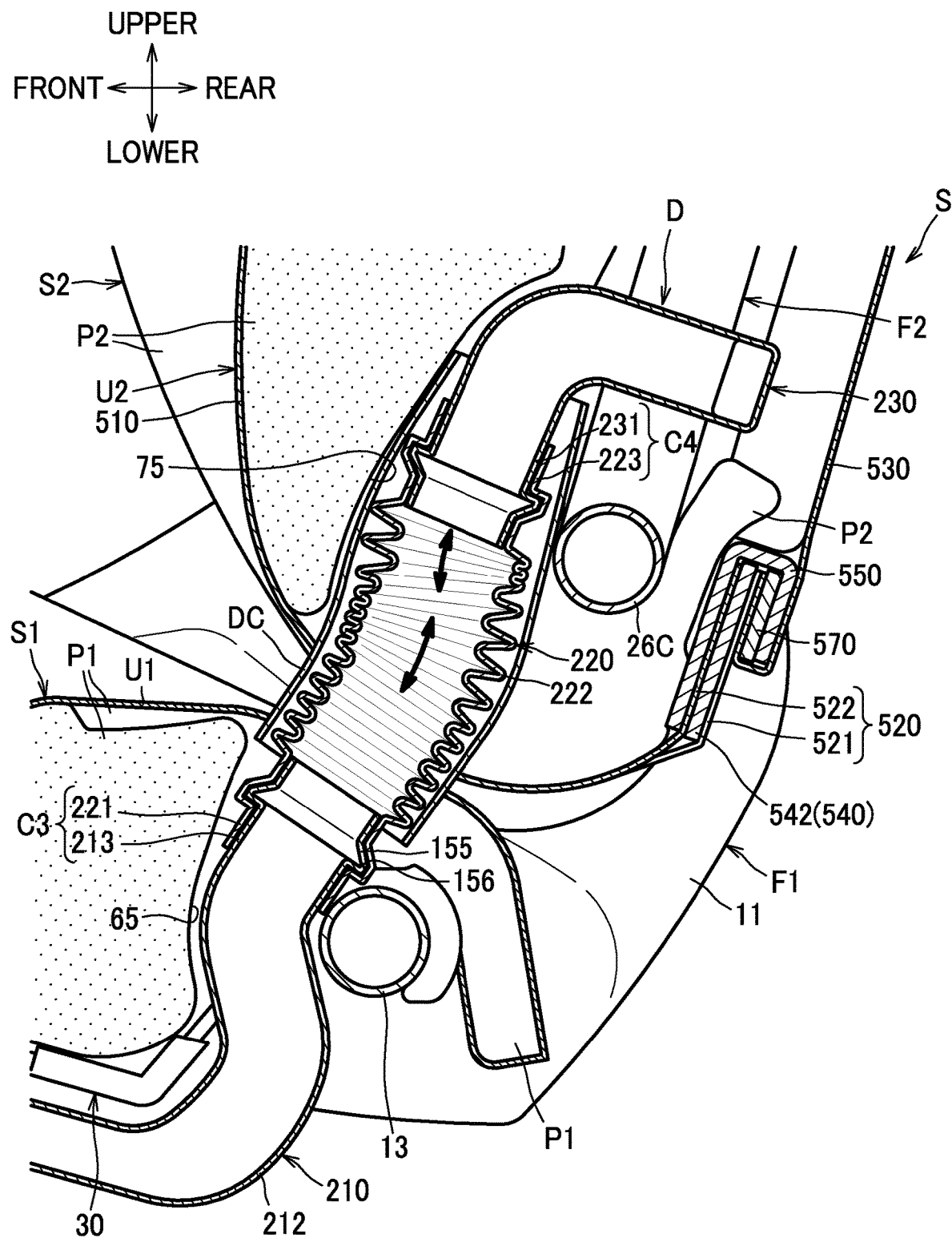
FIG. 27 is an enlarged section view of a rear portion of the car seat.

As shown in FIG. 27, the duct D is routed in such a way as to have its upward-and-downward-extending portion laid across front sides of the rear pipe 13 and the lower frame 26C and extending from the seat cushion S1 toward the seat back S2. To be more specific, the upward-and-downward-extending portion of the duct D includes a curved tubular portion 212, a first connected section C3, a first bellows portion 222, and a second connected section C4. The duct D is routed in such a way as to have an upper end portion of the curved tubular portion 212 and the first connected section C3 laid across the front side of the rear pipe 13, and to have an upper end portion of the first bellows portion 222 and the second connected section C4 laid across the front side of the lower frame 26C. To elaborate more, the upper end portion of the curved tubular portion 212 and the first connected section C3 are located between the rear pipe 13 and the cushion pad P1 arranged before and behind, whereas the upper end portion of the first bellows portion 222 and the second connected section C4 are located between the lower frame 26C and the back pad P2 arranged before and behind.

The seat back S2 is configured to be tiltable (reclinable) frontward and rearward relative to the seat cushion S1, and the first bellows portion 222 is so curved as to have an arcuate shape bulging rearward in a state of readiness to be seated with the seat back S2 being raised relative to the seat cushion S1 as shown in FIG. 27. To be more specific, the bellows portion 222, in the state of readiness to be seated, is so curved generally in the shape of a letter S as to have its upper portion curved in an arcuate shape bulging frontward (see the upper arrow) and its lower portion just under the upper end portion curved in an arcuate shape bulging rearward (see the lower arrow). The first bellows portion 222 is routed in such a way as to have a portion thereof (specifically, its lower end portion) located between the cushion pad P1 and the back pad P2.

In the present embodiment, the car seat S includes a cover member DC.

Figure 24:
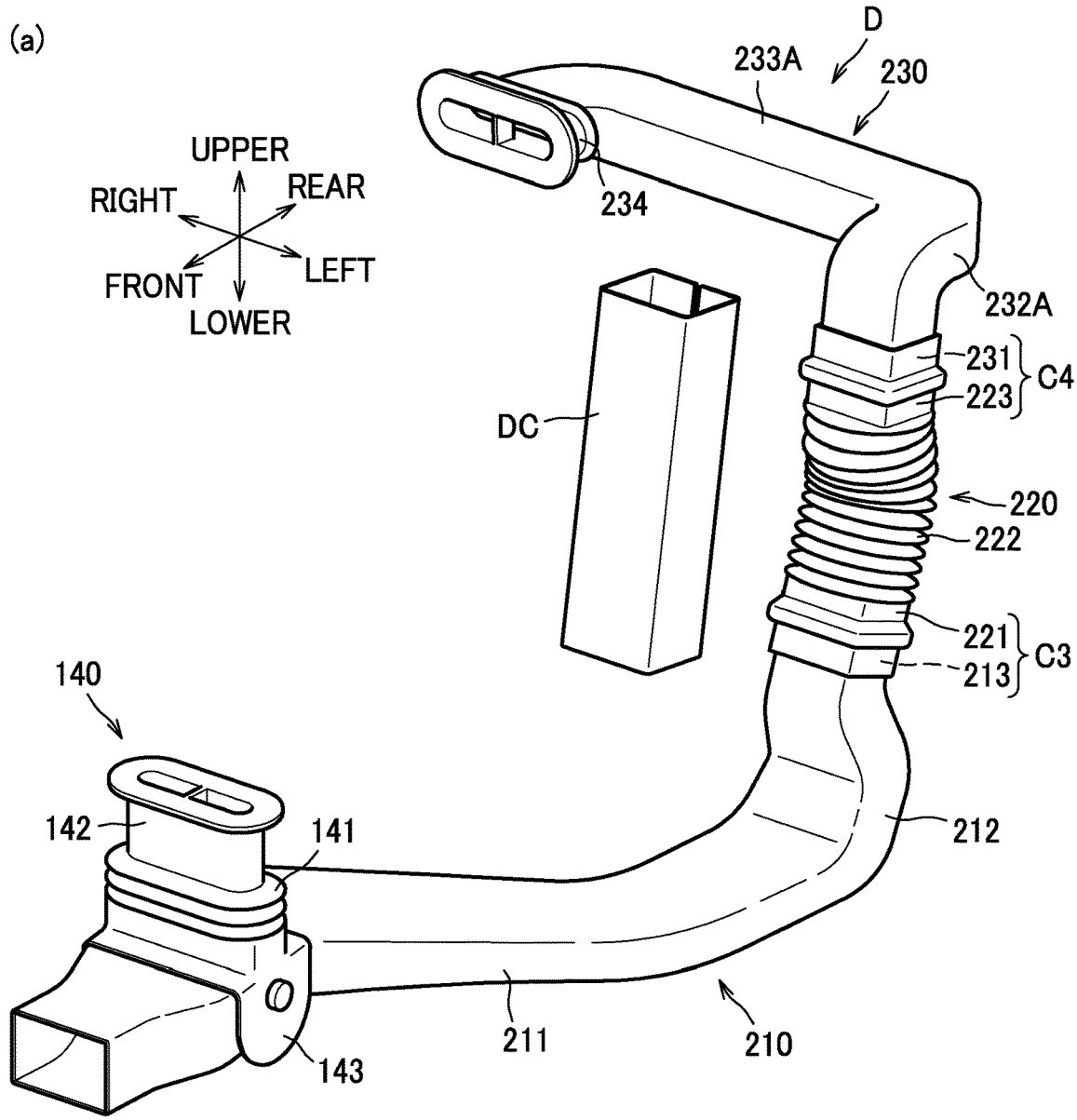
FIG. 24 includes a perspective view (a) of a duct and a cover member; a section view (b) of a first connected section; and a section view (c) of a second connected section.
Figure 24:
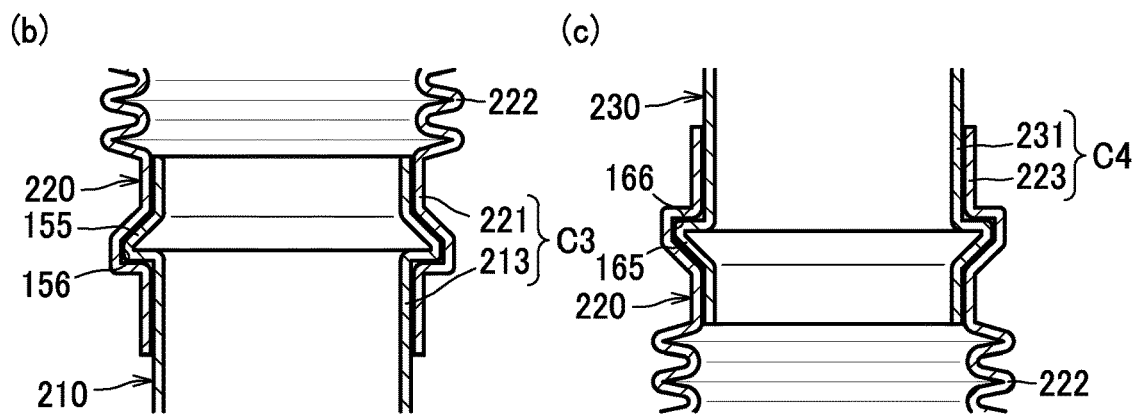

The cover member DC is made of fabrics, leather or the like similar to the material of the outer coverings U1, U2, and has flexibility. The cover member DC is, for example, as shown in FIG. 24, made of a sheet member, which is formed generally in a shape of a letter C in cross section, modified into a tubular shape with its opposed ends sewn together, and put on the duct D and thereby attached to the duct D. Referring back to FIG. 27, the cover member DC is attached in such a manner as to mainly cover the first bellows portion 222 and the second connected section C4. Since the cover member DC covers the first bellows portion 222, the cover member DC covers a portion of the duct D laid astride between the seat cushion S1 and the seat back S2.

The duct D is disposed in such a state that the first connected section C3 as an overlapped section is in contact with the rear pipe 13. The first connected section C3 is a portion at which the inside of the second connecting tubular portion 221 of the second duct member 220 is lined with the first connecting tubular portion 213 inserted therein of the first duct member 221. The first connected section C3 of the duct D includes a portion provided with the first engageable projection 155 and the first engageable recess 156 and a lower portion just thereunder brought in contact with the rear pipe 13. It is to be understood that the first connected section C3 may be configured, in such a manner reverse to the configuration shown in FIG. 27 that the inside of the first connecting tubular portion 213 of the first duct member 210 is lined with the second connecting tubular portion 221 inserted therein of the second duct member 220. The similar discussion may be brought up for the second connected section C4.

Figure 28:
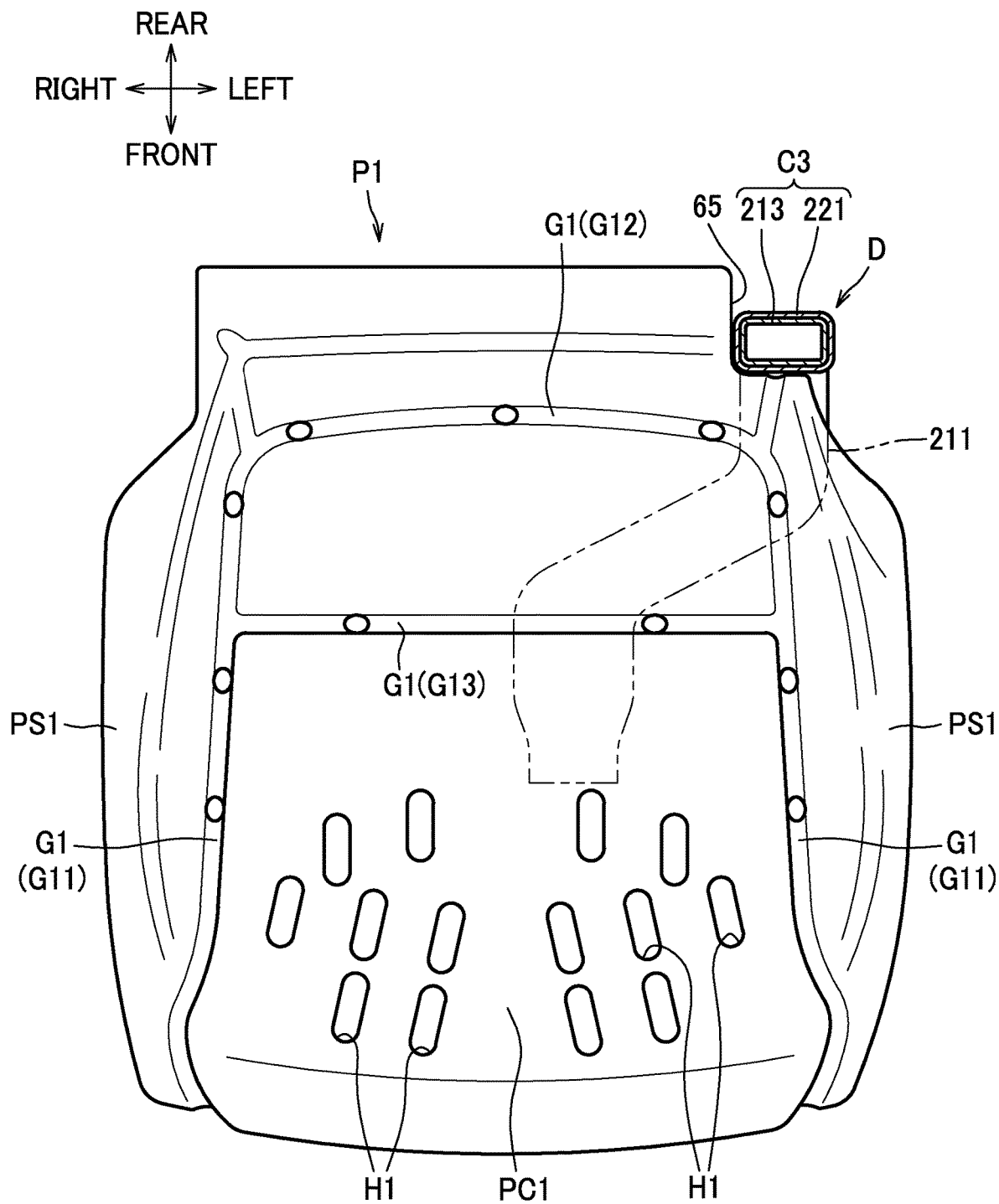
FIG. 28 is a view of a cushion pad as viewed from above.
Figure 29:
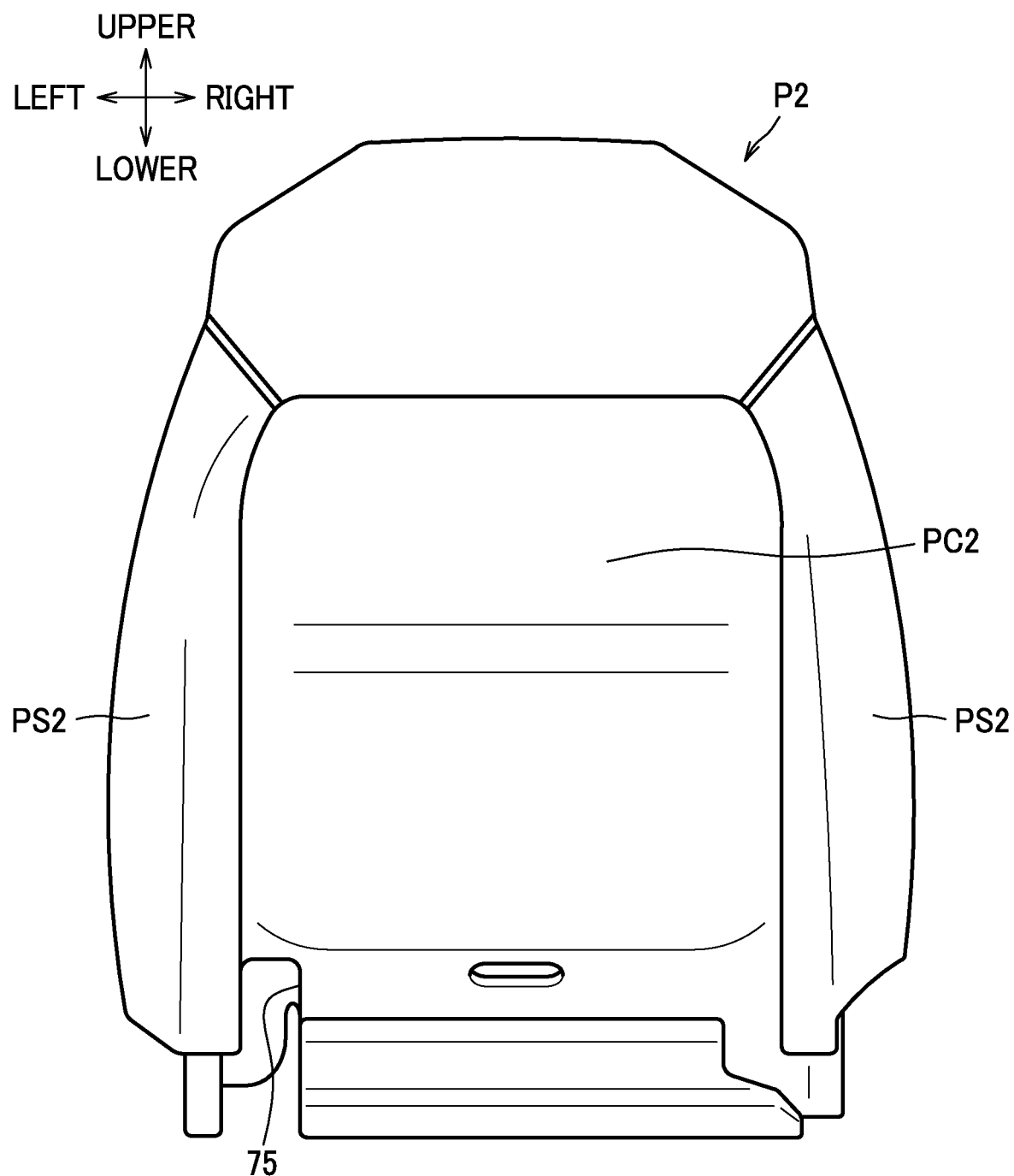
FIG. 29 is a view of a back pad as viewed from the rear.

As shown in FIG. 28 and FIG. 29, the cushion pad P1 and the back pad P2 as pad members have notches 65, 75, respectively, configured as a recessed portion in which the duct D is located.

To be more specific, as shown in FIG. 28, the cushion pad P1 includes a cushion pad center portion PC1, and left and right cushion pad side portions PS1 bulging upward farther than the cushion pad center portion PC1. The notch 65 is a hollow provided at a left side of a rear end portion of the cushion pad center portion PC1 and so shaped as to open on the rear, left, top and bottom. The notch 65 receives the duct D, mainly an upward-and-downward-extending portion thereof; that is, the first connected section C3 and an upper portion of the curved tubular portion 212 (see FIG. 27) of the duct D are located therein.

As shown in FIG. 29, the back pad P2 includes a back pad center portion PC2 and left and right back pad side portions PS2 bulging frontward farther than the back pad center portion PS2. The notch 75 is a hollow provided at a left side of a lower end portion of the back pad center portion PC2 and so shaped as to open on the bottom, front and rear. As shown in FIG. 27, the notch 75 receives the duct D, mainly an upward-and-downward-extending portion thereof; that is, an upper portion of the first bellows portion 222 and the second connected section C4 of the duct D are located therein.

As shown in FIG. 28, the cushion pad P1 has, in an upper side surface thereof, a tuck-in groove G1 for tucking in the outer covering U1 (see FIG. 27) of the seat cushion S1. The tuck-in groove G1 includes a pair of left and right first tuck-in grooves G11 extending in the front-rear direction, a second tuck-in groove G12 connecting rear ends of the pair of first tuck-in grooves G11, and a third tuck-in groove G13 located frontward of the second tuck-in groove G12 and connecting the pair of first tuck-in grooves G11 thereat. Each first tuck-in groove G11 is formed at a border between the cushion pad center portion PC1 and the left or right cushion pad side portion PS1. In the lateral direction, part of the duct D is located outward of the pair of first tuck-in grooves G11. To be more specific, the left side portion of the rear end portion of the lower tubular portion 211 of the duct D is located, in the lateral direction, outward of one of the first tuck-in grooves G11 (specifically, the first tuck-in groove G11 located on the left).

As shown in FIG. 23, the outer covering U2 as an outer covering member generally has a shape of a bag that opens on the bottom, and is put on the back frame F2 and the back pad P2 from above, so that the back frame F2 and the back pad P2 are covered therewith. The outer covering U2 is so arranged as to surround the upper frame 26B and the lower frame 26C of the pipe frame 26 as viewed from the left or right direction. As shown in FIG. 27, the outer covering U2 includes an outer covering main portion 510, a first end portion 520, and a second end portion 530, as viewed from the left or right direction.

The outer covering main portion 510 is a main body portion of the outer covering U2, from which the first end portion 520 and the second end portion 530 are excluded, and mainly covers the front, upper, left and right sides of the back frame F2 and the back pad P2.

The first end portion 520 is one end portion of the outer covering U2, as viewed from the left or right direction. The first end portion 520 as viewed from the left or right direction extends from a front side that is an occupant side of the seat back S2, across the underside of the back pad P2, toward a rear side that is a reverse side opposite to the occupant side of the seat back S2, and retained on a target engageable member 570 of the second end portion 530 at the rear side of the seat back S2.

The second end portion 530 is another end portion provided opposite to the first end portion 520, as viewed from the left or right direction. The second end portion 530 extends from its upper end down to its lower end at the rear side of the seat back S2, and covers the rear sides of the back frame F2 and the back pad P2.

Figure 30:
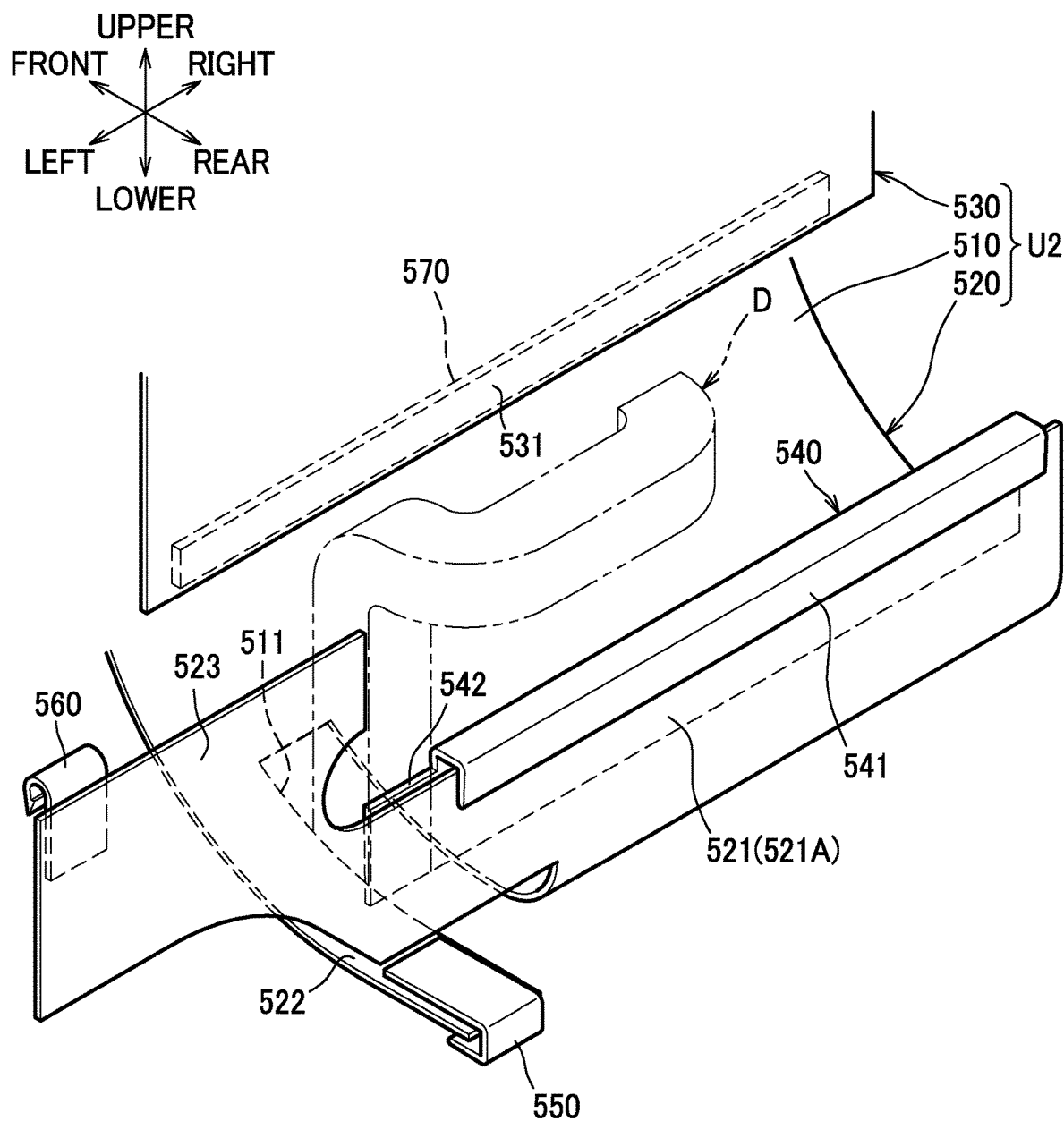
FIG. 30 is a perspective view illustrating a configuration of an end portion of an outer covering of a seat back.

As shown in FIG. 30, the first end portion 520 includes a first tongue portion 521, a second tongue portion 522, a third tongue portion 523, a first engageable member 540 as an engageable member, a second engageable member 550 as a second engageable portion, and a third engageable member 560.

The first tongue portion 521 is a portion laid from the lower end of the outer covering main portion 510 across the right side of the upward-and-downward-extending portion of the duct D and extending from the front side toward the rear side. The first tongue portion 521 has a free end portion 521A which protrudes across the second tongue portion 522 to such an extent as to have its left end portion reaching approximately the same position as that of a left edge of the second tongue portion 522 in the lateral direction. Accordingly, the first tongue portion 521 substantially has a shape of a letter L.

The second tongue portion 522 is a long narrow strip laid from the lower end of the outer covering main portion 510 across a left side of the upward-and-downward-extending portion of the duct D and extending from the front side toward the rear side. The outer covering U2 has an opening 511 formed therein for allowing the upward-and-downward-extending portion of the duct D to be routed therethrough, which opening 511 is defined by a lower edge of the outer covering main portion 510, a left edge of the first tongue portion 521, and a right edge of the second tongue portion 522.

The third tongue portion 523 is so provided as to extend from the left end of the free end portion 521A of the first tongue portion 521 laterally outward and obliquely upward as seen in the state shown in FIG. 30.

The first engageable member 540 is made of plastic, and provided at the first tongue portion 521. To be more specific, the first engageable member 540 is sewn, adhered or otherwise joined to a front surface (as seen in the state shown in FIG. 30) of the free end portion 521A of the first tongue portion 521, and thereby attached to the first tongue portion 521. The first engageable member 540 includes a first engageable portion 541 and a plate portion 542. The first engageable portion 541 is a portion engageable with a target engageable member 570 of the second end portion 530, and has a shape of a hook elongate in the lateral direction. The plate portion 542 is a portion configured as a flat plate, and extends from a left end of the first engageable portion 541 leftward.

The second engageable member 550 is made of plastic, and provided at the second tongue portion 522. To be more specific, the second engageable member 550 is sewn, adhered or otherwise joined to an upper surface (as seen in the state shown in FIG. 30) of the free end portion of the second tongue portion 522, and thereby attached to the second tongue portion 522. The second engageable member 550 is a portion engageable with the target engageable member 570 of the second end portion 530, and has a shape of a hook. The surface of the second tongue portion 522 to which the second engageable member 550 is attached and the surface of the first tongue portion 521 to which the first engageable member 540 is attached are surfaces at the same side of the first end portion 520 (outer covering U2).

The third engageable member 560 is made of plastic, and provided at the third tongue portion 523. To be more specific, the third engageable member 560 is sewn, adhered or otherwise joined to a front surface of the upper and left end portion (as seen in the state shown in FIG. 30) of the third tongue portion 523, and thereby attached to the third tongue portion 523. The third engageable member 560 has a shape of a hook. The surface of the third tongue portion 523 to which the third engageable member 560 is attached and the surface of the first tongue portion 521 to which the first engageable member 540 is attached are surfaces at the same side of the first end portion 520 (outer covering U2).

The second end portion 530 includes the target engageable member 570 as a target engageable portion. The target engageable member 570 is a member having a shape of a flat plate, made of plastic, and is provided at the second end portion 530. To be more specific, the target engageable member 570 is sewn, adhered or otherwise joined to a front surface (as seen in the state shown in FIG. 30) of the free end portion 531 of the second end portion 530, and thereby attached to the second end portion 530. The target engageable member 570 is a member harder than the outer covering U2.

The following is a description of a method for manufacturing a car seat S, more specifically, of a method for attachment of an outer covering U2. It is to be understood that attachment of the outer covering U2 is carried out in such a manner that before the outer covering U2 is attached, the duct D has been attached in advance.

When the outer covering U2 is to be attached, first, the outer covering U2 is put from above over the back pad P2 with which the back frame F2 is covered, as shown in FIG. 23. Next, the first end portion 520 is brought across the underside of the back pad P2 and arranged at the rear side of the back pad P2. More specifically, as shown in FIG. 30, the first tongue portion 521 and the third tongue portion 523 are brought across the right side of the upward-and-downward-extending portion of the duct D and arranged at the rear side of the back pad P2, and the second tongue portion 522 is brought across the left side of the upward-and-downward-extending portion of the duct D and arranged at the rear side of the back pad P2.

Figure 31:
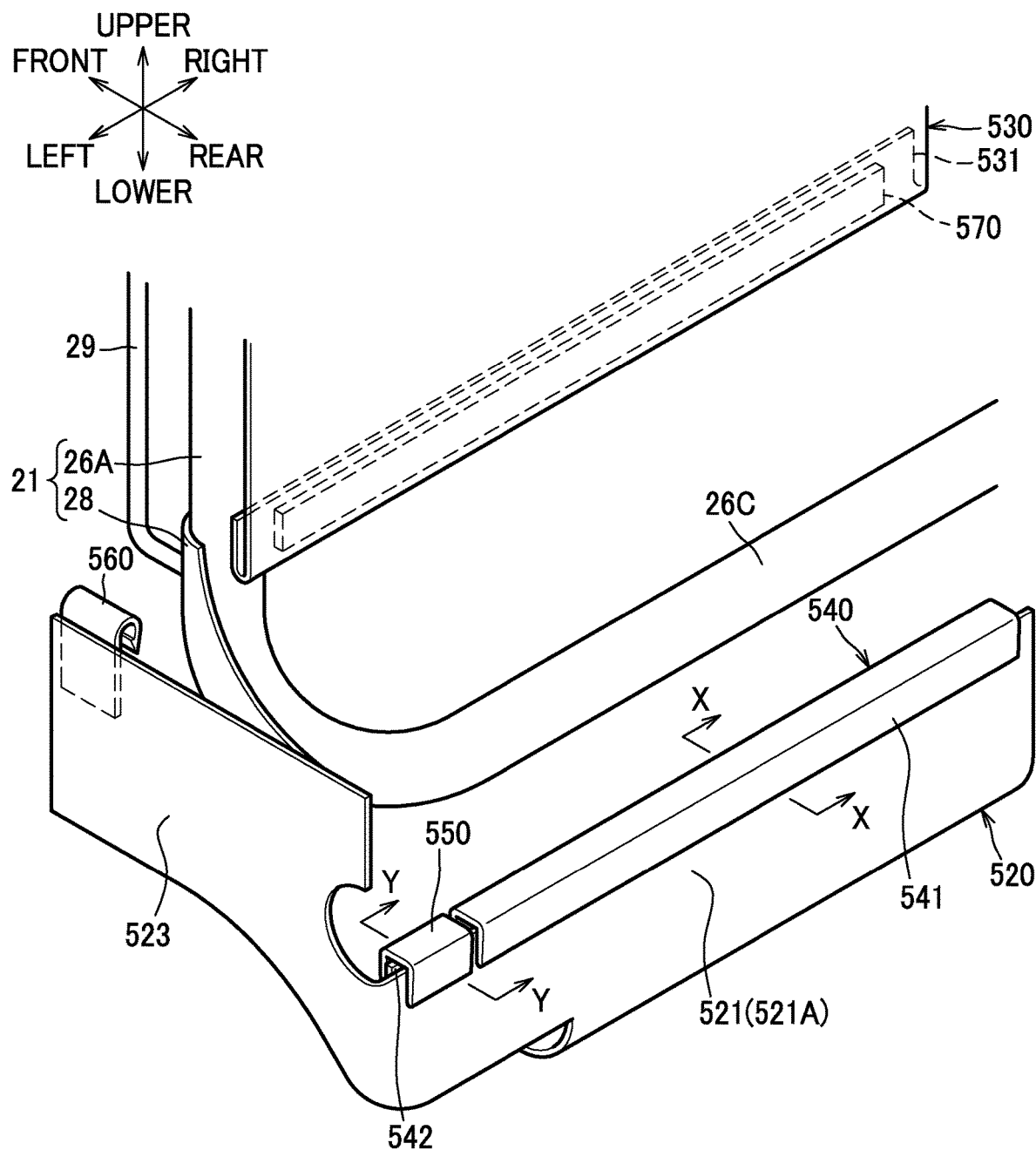
FIG. 31 is a perspective view showing a state in which a second engageable member provided at a second tongue portion of the outer covering engages with a first tongue portion of the outer covering.

Next, the second engageable member 550 provided at the second tongue portion 522 is caused to engage with the left end portion of the first tongue portion 521, as shown in FIG. 31. To elaborate, the second tongue portion 522 (see FIG. 30) is brought across a front side of the left end portion of the free end portion 521A of the first tongue portion 521, and the second engageable member 550 is caused to engage with the left end portion of the free end portion 521A. Accordingly, the hook-shaped second engageable member 550 holds the left end portion of the free end portion 521A and the plate portion 542 of the first engageable member 540 and thus engages with the both of the first tongue portion 521 and the plate portion 542.

Next, the first end portion 520 is retained on the second end portion 530. More specifically, as shown in FIG. 32(*a*), (*b*), the free end portion 531 of the second end portion 530 is folded back to the front side, and target engageable member 570 and the free end portion 531 are inserted into the hook-shaped first engageable portion 541 of the first engageable member 540 and inserted into the hook-shaped second engageable member 550.

Figure 32:
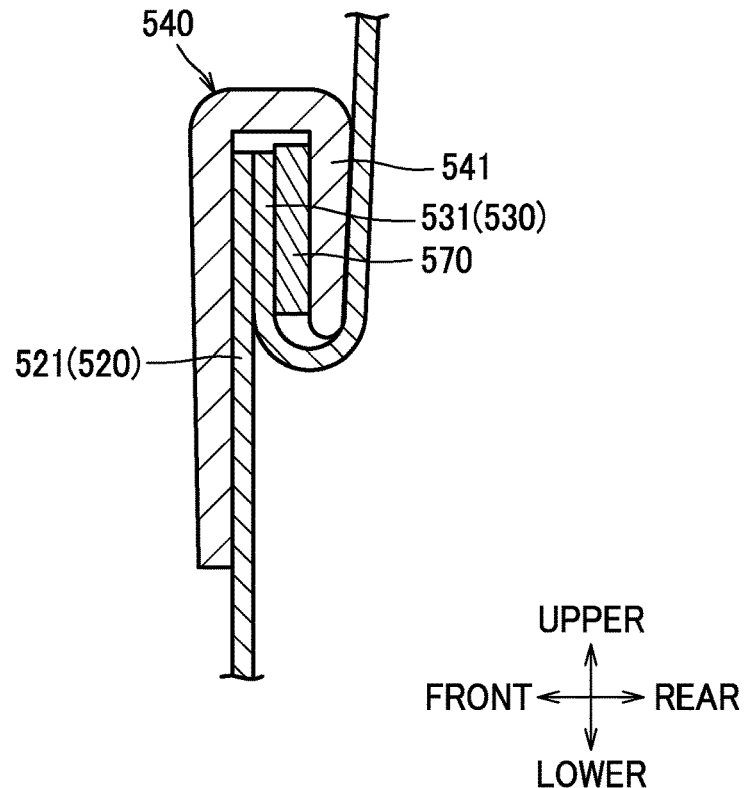
FIG. 32 includes a section view (a) corresponding to an X-X section of FIG. 31 and a section view (b) corresponding to a Y-Y section of FIG. 31 in a state where a first end portion and a second end portion of the outer covering are retained.
Figure 32:
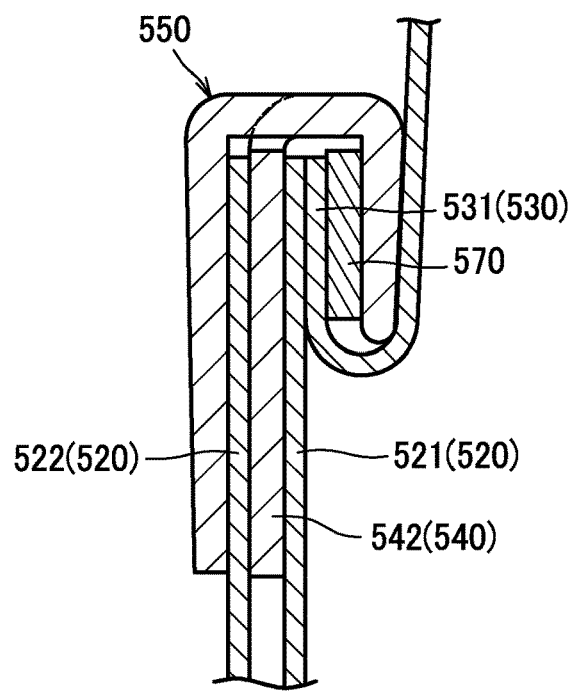

Accordingly, as shown in FIG. 32(*a*), the first tongue portion 521, the free end portion 531 of the second end portion 530, and the target engageable member 570 are held by the first engageable portion 541, so that the first tongue portion 521 of the first end portion 520 is retained on the second end portion 530. Moreover, as shown in FIG. 32(*b*), the second tongue portion 522, the plate portion 542 of the first engageable member 540, the first tongue portion 521, the free end portion 531 of the second end portion 530, and the target engageable member 570 are held by the second engageable member 550, so that the second tongue portion 522 of the first end portion 520 is retained on the second end portion 530.

Figure 33:
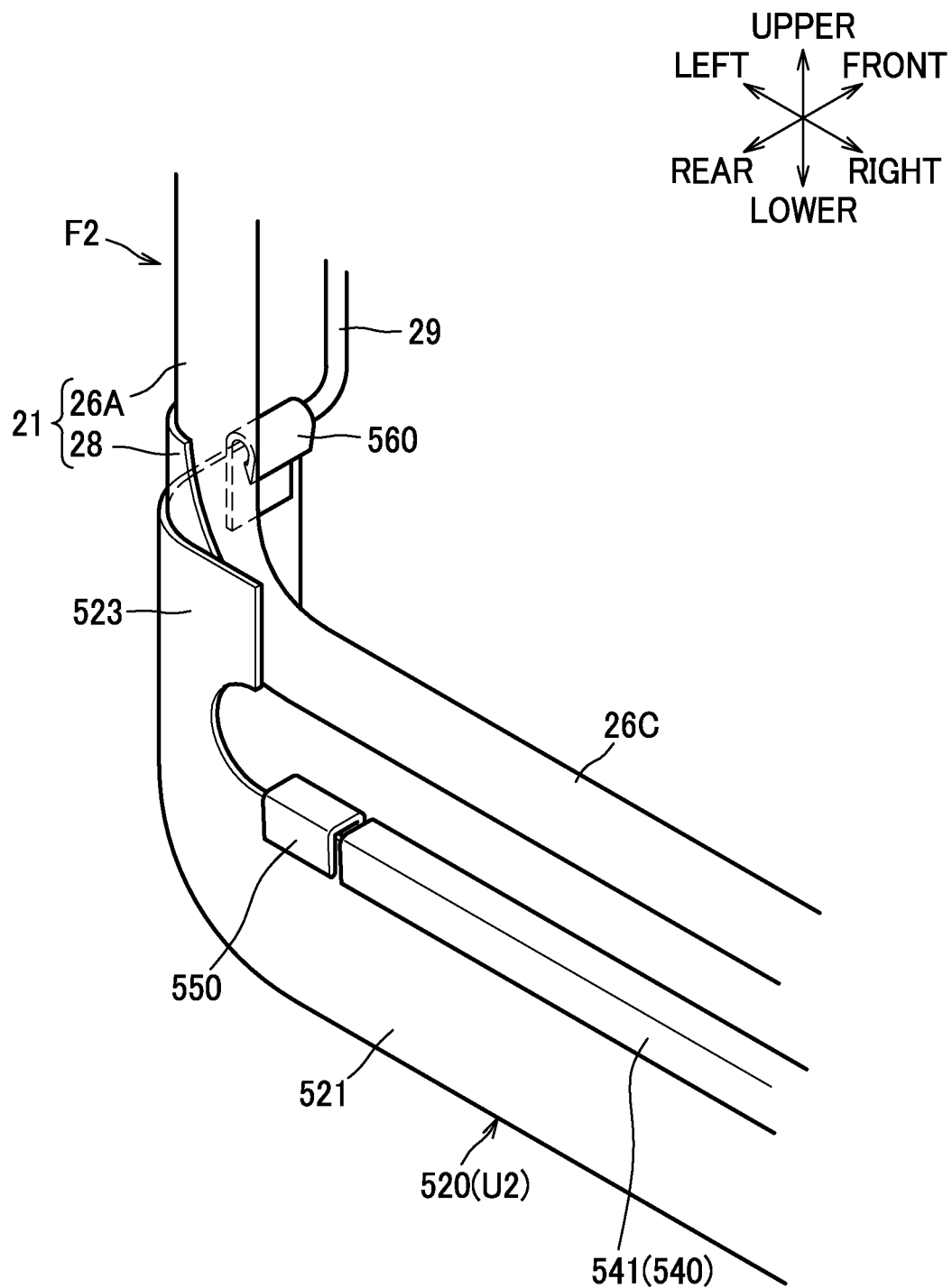
FIG. 33 is a perspective view showing a state in which a third tongue portion of the outer covering is retained on a wire frame.

Next, as shown in FIG. 33, the third tongue portion 523 is attached to the wire frame 29 of the back frame F2. To elaborate, the third tongue portion 523 is wrapped from the rear side around the underside to the laterally outer side of the left back side frame 21, and the third engageable member 560 is hooked on a lower portion of the wire frame 29 extending generally in the front-rear direction from the laterally outer side. Accordingly, the third tongue portion 523 is retained on the wire frame 29, and the outer covering U2 is thus retained on the back frame F2.

According to the present embodiment described above, the same advantageous effects as expected in the first embodiment can be achieved.

Furthermore, the cushion pad P1 and the back pad P2 have the notches 65, 75 in which the upward-and-downward-extending portion of the duct D is arranged, so that interference which could occur between the duct D and the cushion pad P1 or the back pad P2 can be prevented. Accordingly, any unnecessary pressure which could be exerted from the cushion pad P1 or the back pad P2 on the duct D can be restrained. Moreover, the duct D can be arranged in a compact way, so that the car seat S can be restrained from upsizing.

Since the upward-and-downward-extending portion of the duct D (the upper end portion of the curved tubular portion 212 and the first connected section C1) is disposed between the rear pipe 13 and the cushion pad P1 arranged before and behind, displacement of the duct D to the front or to the rear can be restrained owing to the rear pipe 13 and the cushion pad P1. Moreover, since the upward-and-downward-extending portion of the duct D (the upper end portion of the first bellows portion 222 and the second connected section C2) is disposed between the lower frame 26C and the back pad P2 arranged before and behind, displacement of the duct D to the front or to the rear can be restrained by the lower frame 26C and the back pad P2.

Since the seat back S2 is configured to be reclinable relative to the seat cushion S1 with the duct including an upward-and-downward-extending portion provided with the first bellows portion 222 such that part of the bellows portion 222 is located between the cushion pad P1 and the back pad P2, the duct D can be rendered capable of following a reclining operation of the seat back S2.

Since the first bellows portion 222 is so curved as to have an arcuate shape bulging rearward in a state of readiness to be seated, the duct D can be caused to follow the reclining operation of the seat back S2 in a desirable manner.

Since part of the duct D is located laterally outward of the pair of first tuck-in grooves G11, any unnecessary pressure which could be exerted on the duct D can be prevented even when the cushion pad P1 is weighed down with the load produced by an occupant sitting thereon.

Since part of the duct D is located laterally outward of the outermost wire member 31, any unnecessary pressure which could be exerted on the duct D can be prevented even when the wire member 31 (support member 30) is weighed down with the load produced by an occupant sitting thereon.

With consideration given to the first connected section C3 of the duct D being in contact with the rear pipe 13, the first connected section C3 is high in rigidity because the first connecting tubular portion 213 of the first duct member 210 and the second connecting tubular portion 221 of the second duct member 220 are overlaid on one another; therefore, the section of the duct D in contact with the rear pipe 13 can be enhanced in rigidity. Accordingly, an embodiment in which part of the duct D is located in contact with the rear pipe 13 (seat frame F) may be configured such that the duct D can be restrained from becoming deformed.

Since the car seat S, in which the seat back S2 is configured to be reclinable relative to the seat cushion S1, includes the cover member DC with which a portion of the duct D disposed astride the seat cushion S1 and the seat back S2 is covered, the duct D is covered with the cover member DC and thus kept out of direct view through between the seat cushion S1 and the seat back S2. Accordingly, the car seat S with the duct D can be made aesthetically pleasing to look at.

The first end portion 520 of the outer covering U2 is configured to include the first tongue portion 521, the second tongue portion 522, the first engageable member 540 and the second engageable member 550, and thus makes it possible to restrict interference between the duct D and the outer covering U2 when the first end portion 520 of the outer covering U2 is retained on the target engageable member 570.

The first engageable member 540 configured to include the plate portion 542 engageable with the second engageable member 550 makes the second engageable member 550 engageable with the both of the first tongue portion 521 and the plate portion 542. With this configuration, the first tongue portion 521 and the second tongue portion 522 can be firmly retained, so that the first end portion 520 can accordingly be retained firmly on the target engageable member 570.

The target engageable member 570 provided at the second end portion 530 makes it possible to retain the first end portion 520 and the second end portion 530 (i.e., the end portions of the outer covering U2) on each other. This can obviate the necessity to provide features for retaining the first end portion 520 thereon and for retaining the second end portion 530 thereon, respectively at the back frame F2, thus making the back frame F2 or other relevant components simple in structure.

The outer covering U2 configured to include the third tongue portion 523 to be retained on the wire frame 29 of the back frame F2 makes it possible to retain the outer covering U2 on the back frame F2. With this configuration, the outer covering U2 can be attached firmly.

Next, a description will be given of a fifth embodiment.

Figure 34:
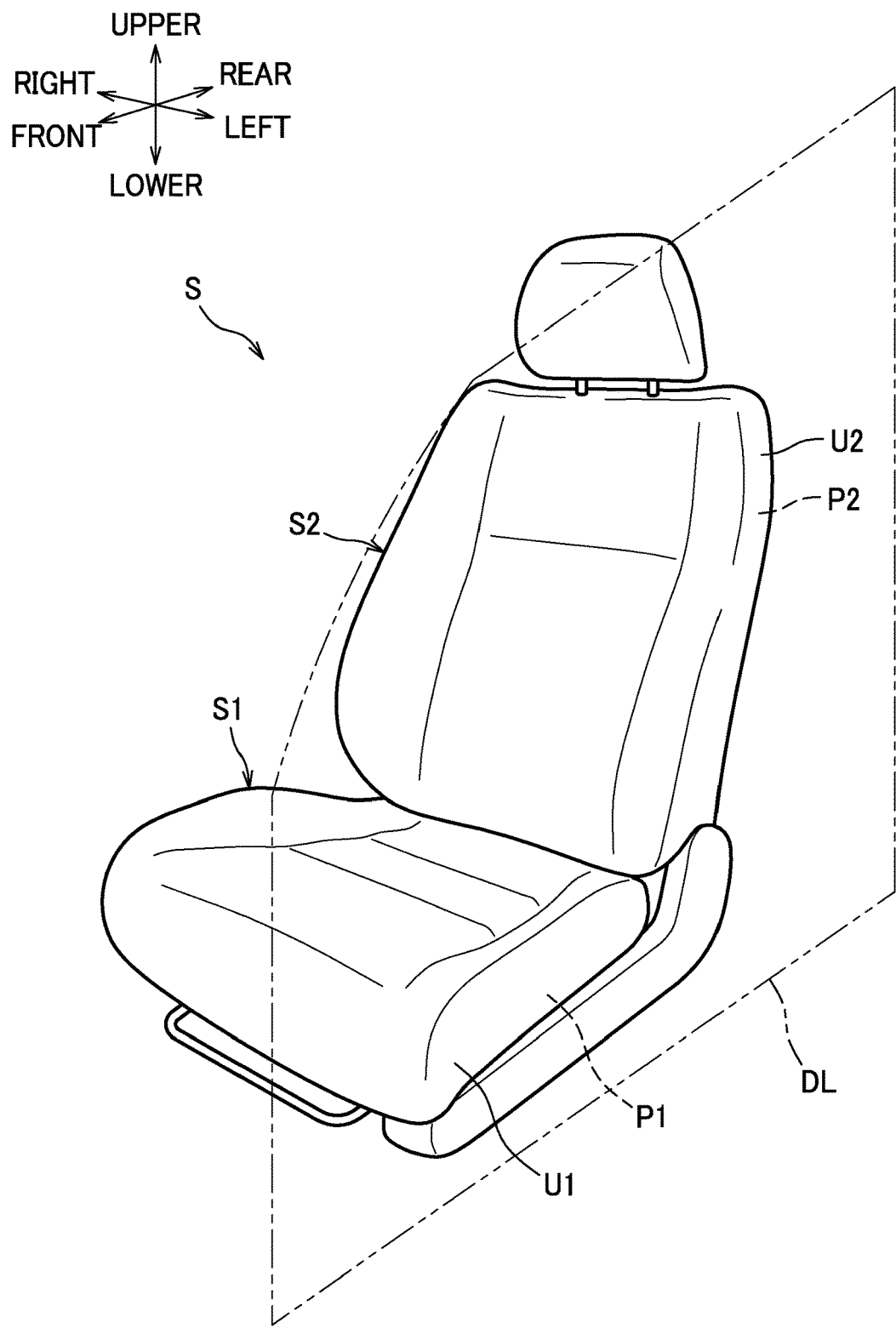
FIG. 34 is a view showing a car seat as a vehicle seat according to a fifth embodiment.

As shown in FIG. 34, a vehicle seat according to the present embodiment is configured as a car seat S to be installed in an automobile (car) as a vehicle. The car seat S is arranged in such a location that at a left side thereof, i.e., one side thereof in the lateral direction, a door DL of the car is located. The door DL is a door for openably closing a doorway for getting in and out of the car seat S.

Figure 35:
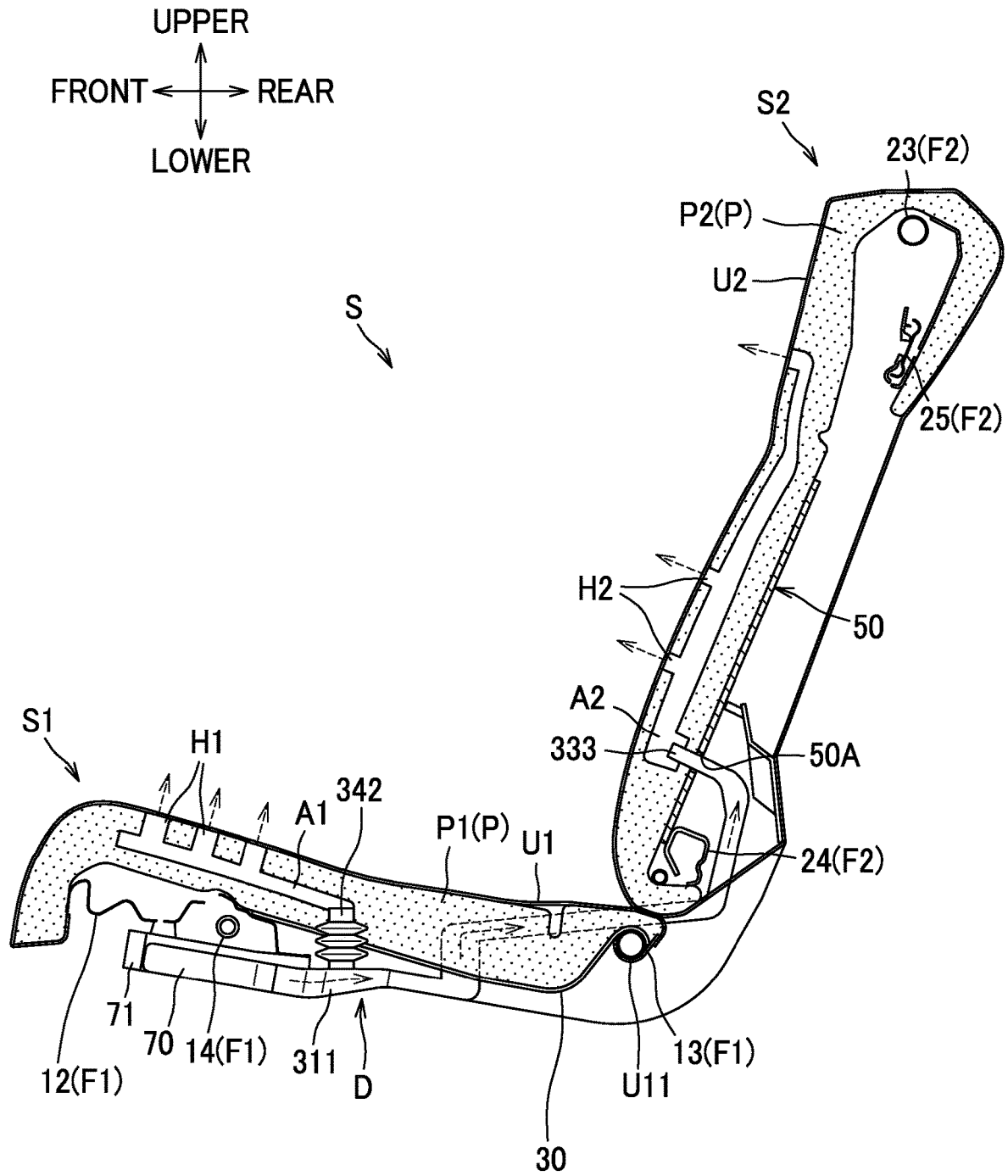
FIG. 35 is a section view of the car seat.

As shown in FIG. 35, the car seat S is constructed of a seat frame F (see FIG. 36) upholstered with a pad P and outer coverings U1, U2. The pad P and the seat frame F have constructions fairly similar to those of the car seat S of the first embodiment.

Figure 36:
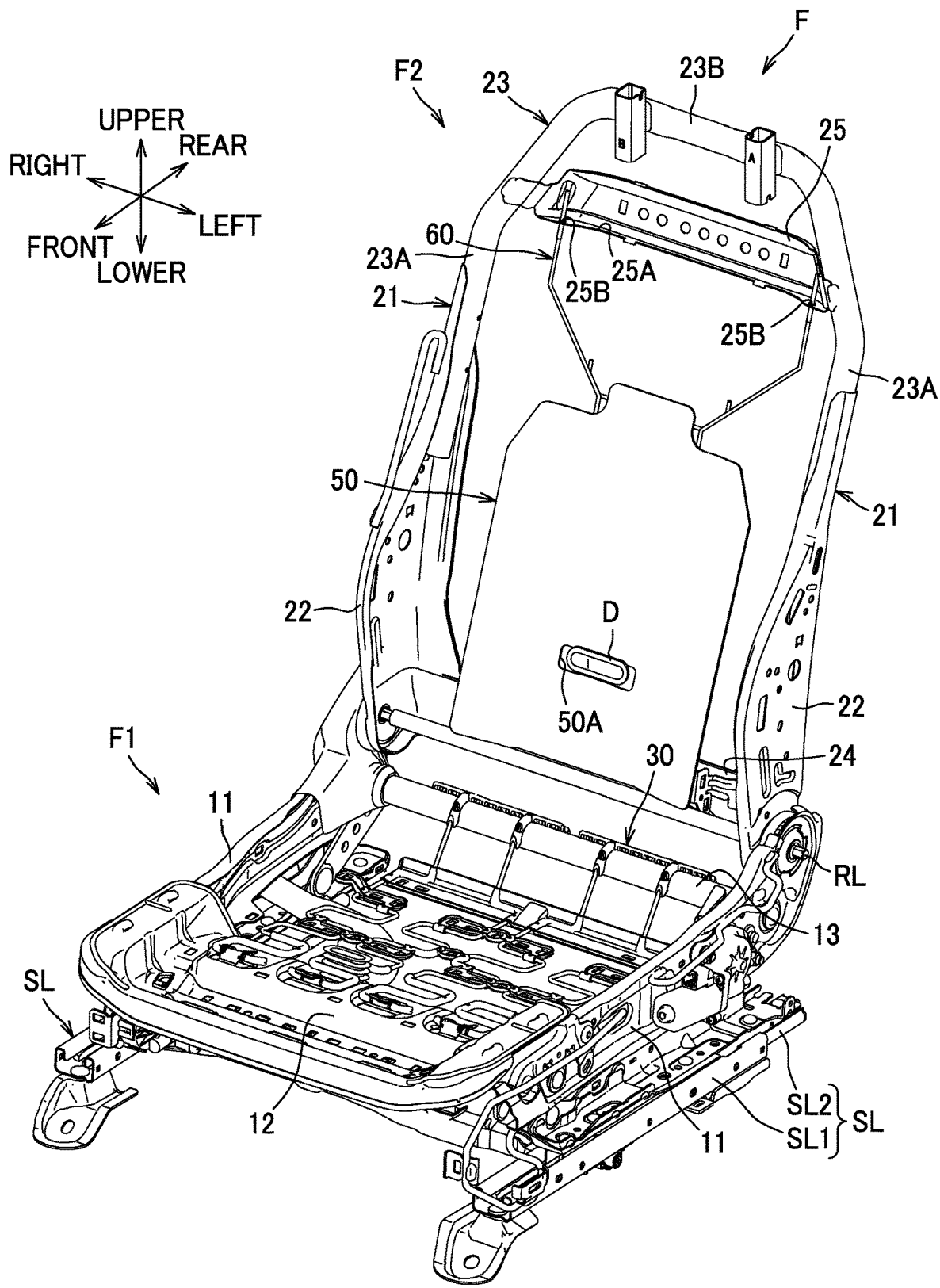
FIG. 36 is a perspective view of a seat frame.

As shown in FIG. 36, a rear portion of the cushion side frame 11 and a lower portion of the back side frame 21 are rotatably linked via a reclining mechanism RL.

The cushion frame F1 is supported by a pair of slide mechanisms SL disposed left and right apart from each other. The slide mechanisms SL each include a lower rail SL1 and an upper rail SL2. The lower rail SL1 has a shape elongate in the front-rear direction, and is fixed to a floor of the car. The upper rail SL2 engages with the lower rail SL1 slidably to the front and to the rear relative to the lower rail SL1. The cushion frame F1 is fixed to the upper rails SL2 via front links L1 and rear links L2 (see FIG. 39) which will be described later. With this configuration, the car seat S is rendered slidable in the front-rear direction relative to the floor of the car.

Figure 39:
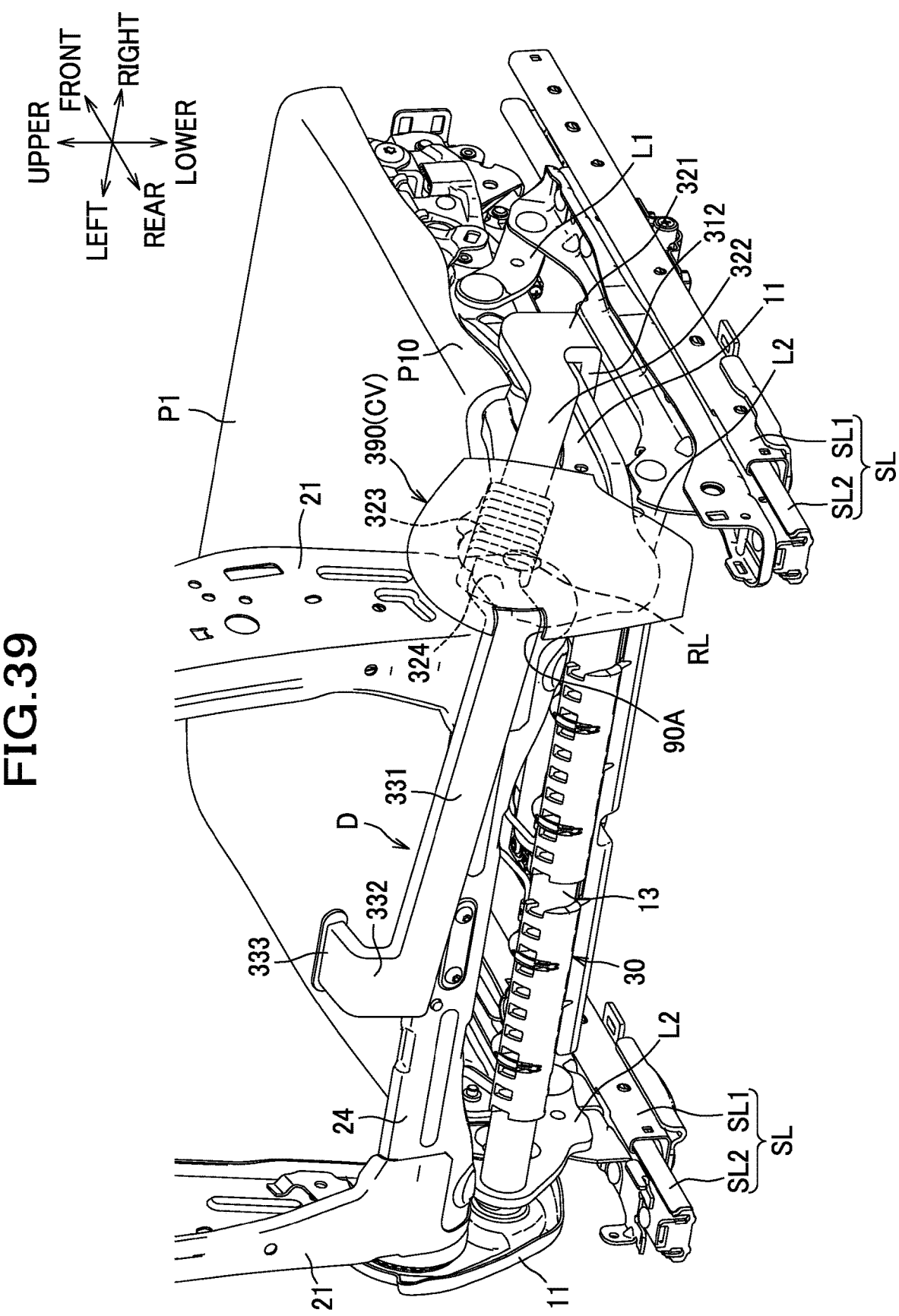
FIG. 39 is a perspective view of the duct and a side frame cover as viewed from a laterally outer side.

As shown in FIG. 39, the front link L1 and the rear link L2 are provided in pair at the left and at the right, respectively. The front link L1 has an upper portion rotatably joined to a front portion of the cushion side frame 11, and a lower portion rotatably joined to a front portion of the upper rail SL2. The rear link L2 has an upper portion rotatably joined to a rear portion of the cushion side frame 11, and a lower portion rotatably joined to a rear portion of the upper rail SL2. The front link L1 and the rear link L2 combined with the cushion side frame 11 and the upper rail SL2 as a link support member constitute a four-bar linkage. The car seat S is configured to be rendered height-adjustable by an electrically or manually operated actuator rotating the front link L1 or the rear link L2 relative to the cushion side frame 11.

Figure 37:
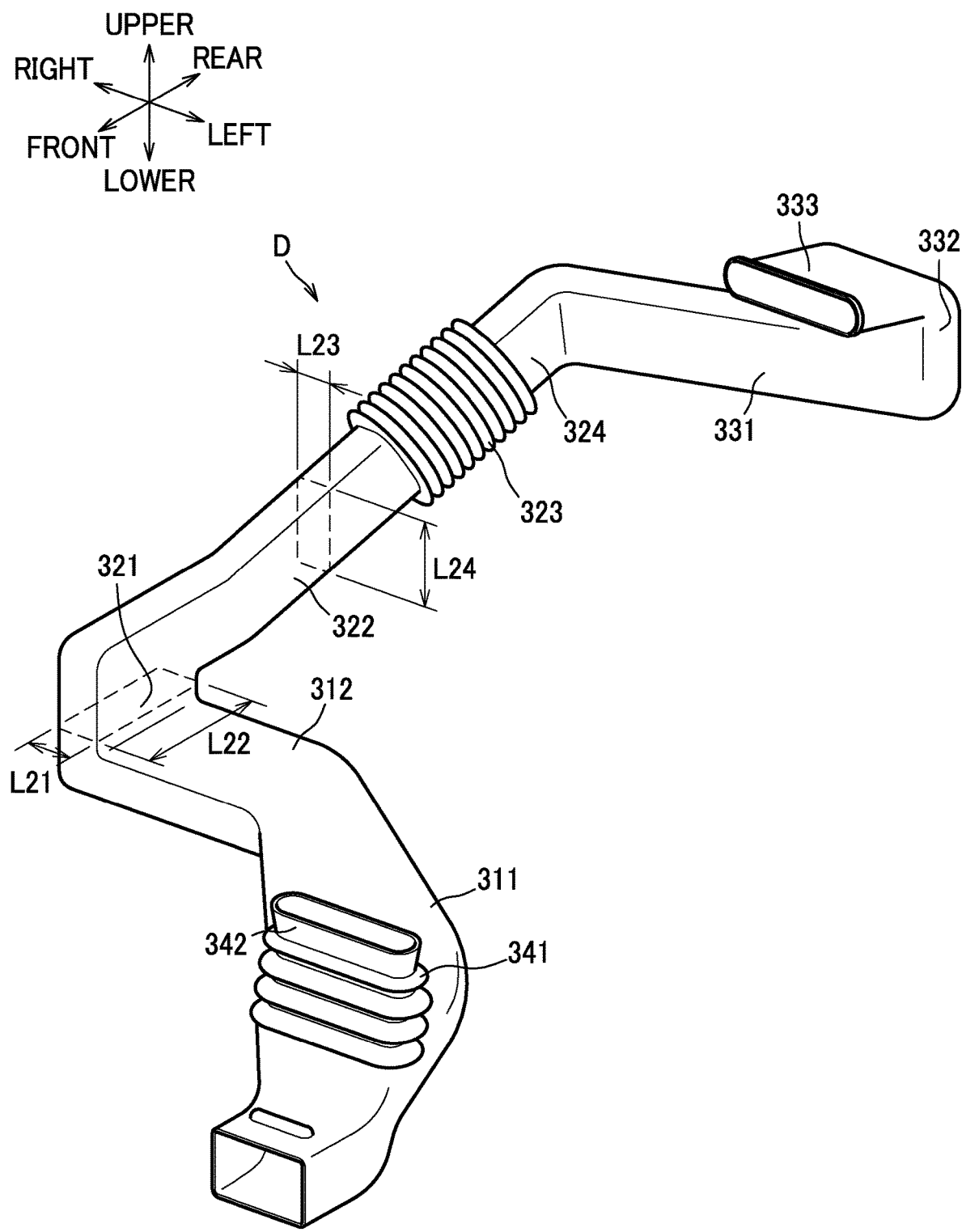
FIG. 37 is a perspective view of a duct.

As shown in FIG. 37, the duct D includes a first lower tubular portion 311, a second lower tubular portion 312, a first side tubular portion 321, a second side tubular portion 322, a first bellows portion 323 as a flexible portion, a third side tubular portion 324, a first rear tubular portion 331, a second rear tubular portion 332, a back connecting tubular portion 333, a second bellows portion 341, and a cushion connecting tubular portion 342.

The first lower tubular portion 311 is a portion extending generally in the front-rear direction, and has a front end portion connected to a blower 70 (see FIG. 35). The second lower tubular portion 312 is a portion extending from a rear end of the first lower tubular portion 311 laterally outward (rightward) of the seat cushion S1. The first side tubular portion 321 is a portion extending from a right end of the second lower tubular portion 312 in a generally upward direction, and the second side tubular portion 322 is a portion extending from an upper end of the first side tubular portion 321 obliquely in a rearward-and-upward direction. The first bellows portion 323 is a portion provided rearward of the second side tubular portion 322 and extending generally in the front-rear direction. The first bellows portion 323 has flexible and extensible-contractible capabilities. The third side tubular portion 324 is a portion extending from a rear end of the first bellows portion 323 in a generally rearward direction.

The first rear tubular portion 331 is a portion extending from a rear end of the third side tubular portion 324 laterally inward (leftward) of the seat cushion S1, and the second rear tubular portion 332 is a portion extending from a left end of the first rear tubular portion 331 in a generally upward direction. The back connecting tubular portion 333 is a portion extending from an upper end of the second rear tubular portion 332 generally frontward, and has a front end portion connected to an air passage A2 formed in the back pad P2 (see FIG. 35). The second bellows portion 341 is so provided as to extend from an upper surface of the first lower tubular portion 311 in a generally upward direction. The second bellows portion 341 has flexible and extensible-contractible capabilities. The cushion connecting tubular portion 342 is a portion provided on the top of the second bellows portion 341, extending generally in the upward-and-downward direction, and connected to an air passage A1 formed in the cushion pad P1 (see FIG. 35).

As shown in FIG. 35, the duct D is disposed astride the seat cushion S1 and the seat back S2. To be more specific, the duct D is so located as to extend from an underside of the seat cushion S1 across a laterally outer side of the cushion frame F1 (cushion side frame 11) toward the seat back S2.

Figure 38:
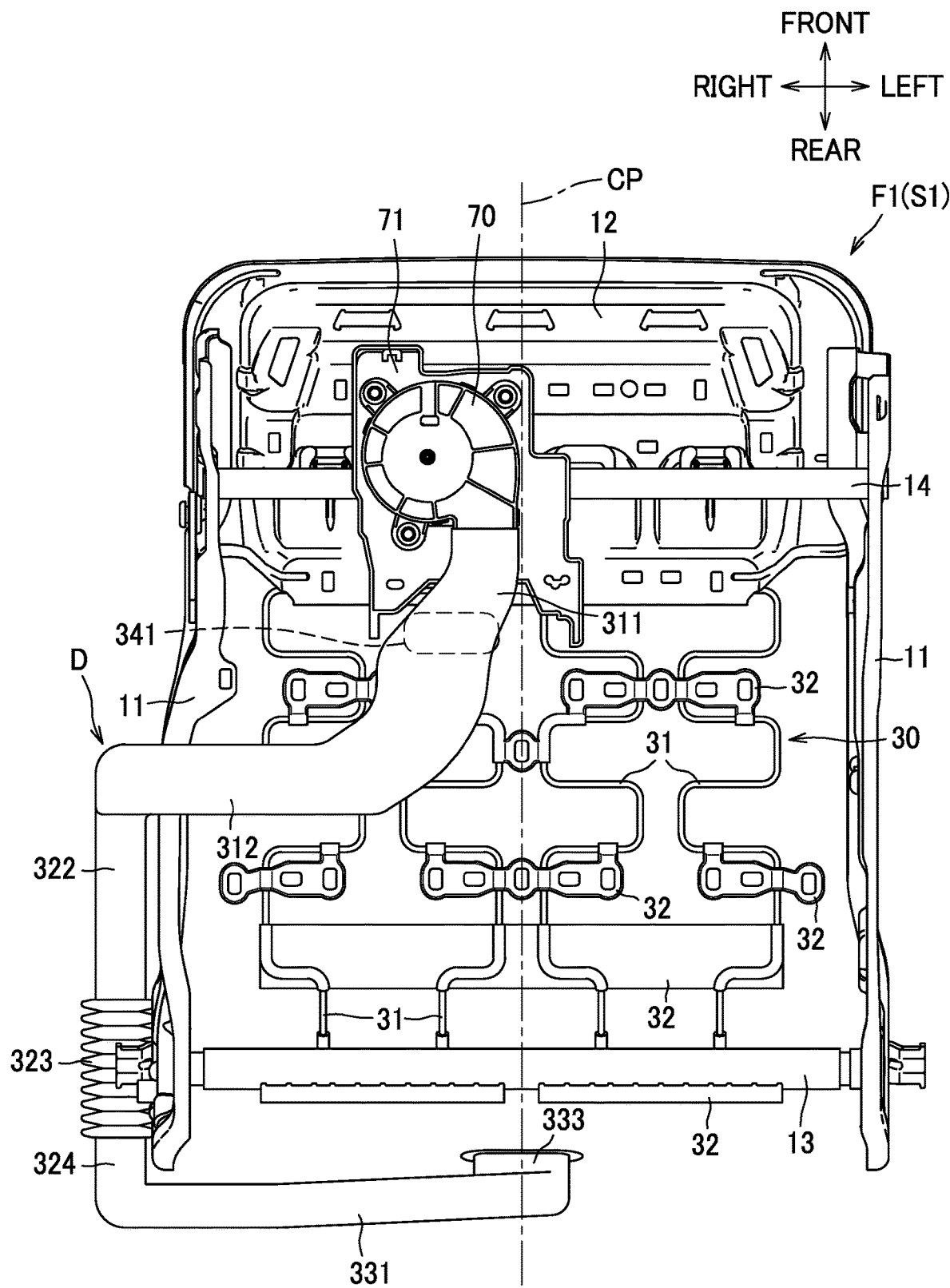
FIG. 38 is a view of a cushion frame, a blower, and the duct as viewed from below.

As shown in FIG. 38, the duct D is so arranged that the first lower tubular portion 311 and the second lower tubular portion 312 are disposed under the support member 30, on the right side of the center (center plane CP) of the seat cushion S1 in the lateral direction. The first lower tubular portion 311 has a front end portion connected to the blower 70 disposed under the pan frame 12, and extends in a generally rearward direction. The second lower tubular portion 312 extends from a rear end of the first lower tubular portion 311 in an angled direction, i.e., laterally outward of the seat cushion S1. As shown in FIG. 39, the second lower tubular portion 312 is laid across the underside of the cushion side frame 11 disposed at a right side, i.e., another side in the lateral direction, and extends from an inner side to an outer side, in the lateral direction, of the same cushion side frame 11. The second lower tubular portion 312 of the duct D is routed through between the cushion side frame 11 and the upper rail SL2 arranged one above the other, and between the front link L1 and the rear link L2 arranged before and behind.

The duct D is so arranged that the first side tubular portion 321 extends from a right end of the second lower tubular portion 312 in a generally upward direction, and the second side tubular portion 322 extends from an upper end of the first side tubular portion 321 along a laterally outer side surface of the cushion side frame 11 obliquely in a rearward-and-upward direction. The second side tubular portion 322 is so located as to overlap the cushion side frame 11 as viewed from the left or right direction. To elaborate further, the second side tubular portion 322 is routed under a portion of the cushion pad P1 laid over a laterally outer side of the cushion side frame 11, specifically, an end portion P10 with which an upper region of a laterally outer side surface of the cushion side frame 11 is covered.

The first bellows portion 323 extends from a rear end of the second side tubular portion 322 across a laterally outer side of a rear end portion of the cushion side frame 11, specifically, a linking portion via which a rear portion of the cushion side frame 11 and a lower portion of the back side frame 21 are linked, obliquely in a rearward-and-upward direction. The third side tubular portion 324 extends from a rear end of the first bellows portion 323 in a generally rearward direction, and has its rear end portion extending rearward farther beyond the cushion side frame 11.

The side tubular portions 321, 322, i.e., a portion of the duct D located at a laterally outer side of the cushion side frame 11, have a flow path so shaped as to have a cross section of which a dimension in the lateral direction is smaller than a dimension in a direction perpendicular to the lateral direction. To be more specific, the as shown in FIG. 37, the first side tubular portion 321 has a flow path so shaped as to have a cross section of which a dimension L21 in the lateral direction is smaller than a dimension L22 in the front-rear direction, and the second side tubular portion 322 has a flow path so shaped as to have a cross section of which a dimension L23 in the lateral direction is smaller than a dimension L24 in the upward-and-downward direction. In other words, the first side tubular portion 321 and the second side tubular portion 322 are each configured to have a flat cross-sectional shape compressed in the lateral direction.

Figure 40:
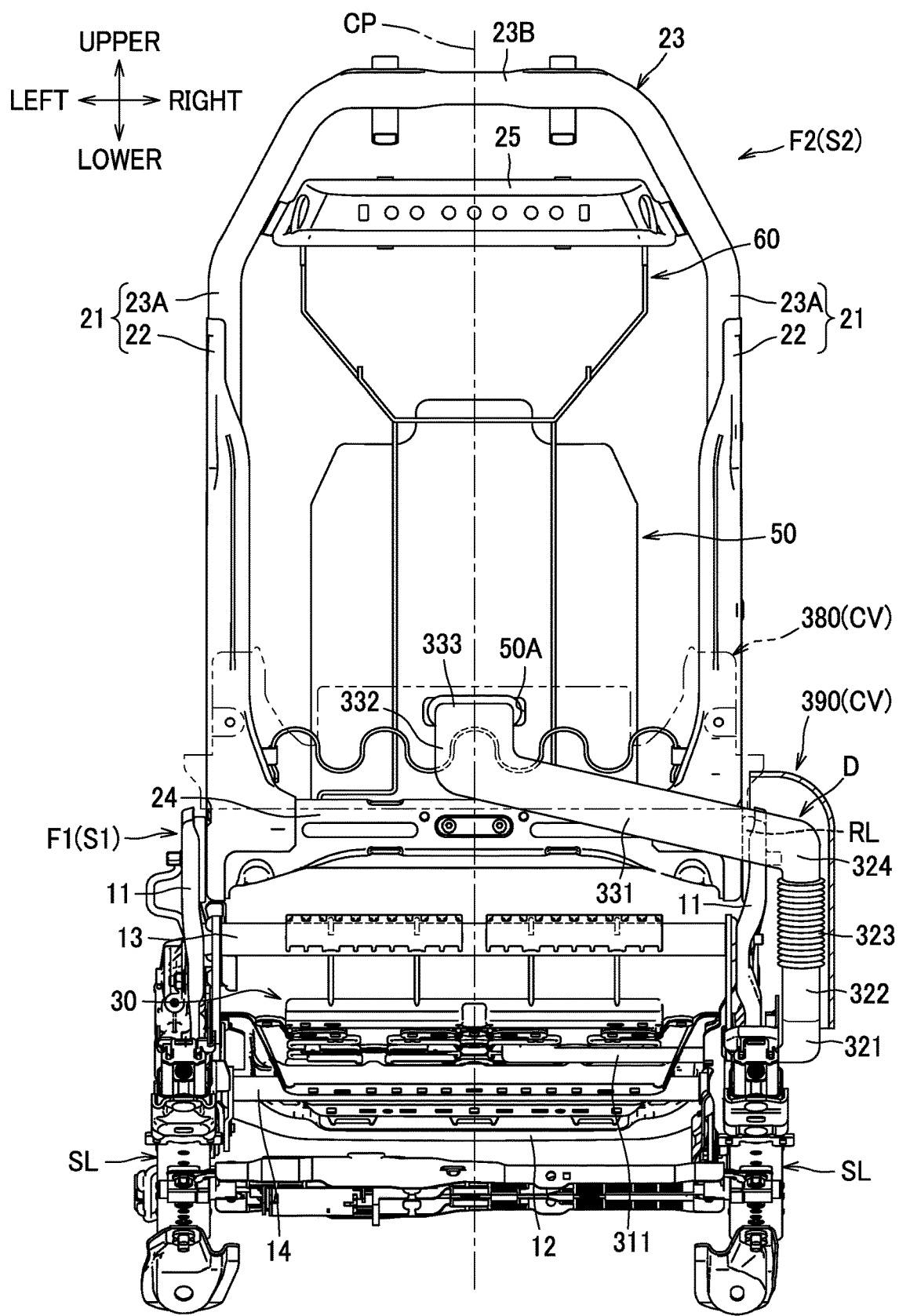
FIG. 40 is a view of a back frame, the duct, and a cover member as viewed from the rear.

As shown in FIG. 40, the duct D is so routed that the first rear tubular portion 331 extending from a rear end of the third side tubular portion 324 in a laterally inwardly angled direction with respect to the seat cushion S1 is laid rearward of the lower frame 24 and extends generally in an obliquely upward direction, and the second rear tubular portion 332 is laid in the center plane CP and extends in a generally upward direction. Further, the duct D is so routed that the back connecting tubular portion 333 extends in a generally frontward direction, is laid through an opening 50A of the pressure-receiving member 50 and is connected to an air passage A2 formed in the back pad P2 (see FIG. 35).

In the present embodiment, the duct D is so routed that the side tubular portions 321, 322 are laid across a laterally outer side of the cushion side frame 11 disposed at the right side that is a side opposite to the left side at which the door DL (see FIG. 34) is located, and extends from the seat cushion S1 toward the seat back S2.

The car seat S comprises a cover member CV. The cover member CV includes a rear cover 380 and a side frame cover 390.

The rear cover 380 is formed of plastic in a shape of a plate elongate in the lateral direction, and disposed rearward of the second rear tubular portion 332 and the back connecting tubular portion 333. The rear cover 380 includes left and right end portions fastened with bolts or otherwise fixed to left and right inwardly-extending portions at the rear ends of the left and right back side frames 21. In this way, the rear cover 380 is attached to and bridges the left and right back side frames 21. With this rear cover 380 being provided, a portion at which the duct D and the back pad P2 are connected can be protected by the rear cover 380.

As shown in FIG. 39 and FIG. 40, the side frame cover 390 is a cover configured to cover a rear end portion of the right cushion side frame 11, specifically, a linking portion by which the rear portion of the right cushion side frame 11 and a lower portion of the back side frame 21 are linked. To be more specific, the side frame cover 390 covers the linking portion by which the cushion side frame 11 and the back side frame 21 are linked, as well as the reclining mechanism RL provided in the linking portion. The side frame cover 390 is made of plastic, and is formed generally in a shape of a cup that opens on a laterally inner side and a front side thereof.

The side frame cover 390 covers a laterally outer side of the first bellows portion 323 laid across the laterally outer side of the linking portion by which the cushion side frame 11 and the back side frame 21 are linked. In other words, the first bellows portion 323 as a part of the duct D is located laterally between the right cushion side frame 11 and the side frame cover 390 arranged left and right. The side frame cover 390 has an opening 90A provided for the duct D to be routed therethrough.

As shown in FIG. 35, the outer covering U1 of the seat cushion S1 with which the cushion frame F1 and the cushion pad P1 are covered has a hook U1 provided at an end portion of the outer covering U1, and is fixed to the rear pipe 13 making up the cushion frame F1 with the hook U11 hooked on the rear pipe 13.

According to the present embodiment described above, the duct D is routed across the laterally outer side of the cushion side frame 11 and extends from the seat cushion S1 toward the seat back S2; therefore, the duct D can be rendered less likely to be hit by a foot of a rear-seat occupant, in comparison with an alternative configuration in which the duct is routed across a rear side of the rear pipe 13 and extends toward the seat back S2. Moreover, since the duct D is not routed at the rear side of the rear pipe 13, the duct D causes no obstruction when the hook U11 provided on the outer covering U1 of the seat cushion S1 is to be fastened; thus, the work of fastening the outer covering U1 to the rear pipe 13 can be performed with increased ease.

Since part of the duct D is disposed between the cushion side frame 11 and the side frame cover 390, the duct D can be protected using the side frame cover 390 with which the cushion side frame 11 is covered. To elaborate further, since the first bellows portion 323 as a part of the duct is disposed between the cushion side frame 11 and the side frame cover 390, the soft first bellows portion 323 of the duct D can be protected by the side frame cover 390.

Since the side frame cover 390 is a cover for covering the linking portion by which the cushion side frame 11 and the back side frame 21 are linked, the duct D not only can be furnished with adequate protection by the side frame cover 390 but also can be so disposed as to extend from the seat cushion S1, across the linking portion by which the cushion side frame 11 and the back side frame 21 are linked, toward the seat back S2. Accordingly, the duct D can be arranged in such a manner as to render the car seat S more compact in comparison with another configuration in which the duct D is routed at the laterally outer side of the cushion side frame 11 in such a manner as to take a detour around the linking portion, so that the car seat S can be restrained from upsizing.

Since the side tubular portions 321, 322, i.e., portions of the duct D located at a laterally outer side of the cushion side frame 11 each has a flow path so shaped as to have a cross section of which the dimension L21, 23 in the lateral direction is smaller than a dimension L22, L24 in the direction perpendicular to the lateral direction, the side tubular portions 321, 322 can be shaped in a thinner shape compressed in the lateral direction. With this configuration, the duct D can be arranged in such a space-saving manner at the laterally outer side of the cushion side frame 11 as to render the car seat S compact in the lateral direction, so that the car seat S can be restrained from upsizing in the lateral direction.

Since the side tubular portions 321, 322 of the duct D are arranged laterally opposite to the door DL, the duct D can be rendered less likely to be hit by a foot or other part of a passenger when the passenger gets in the car, whereby the duct D can be protected.

Since the second lower tubular portion 312 of the duct D extends through between the front link L1 and the rear link L2, interference of the duct D with the front and rear links L1, L2 which would be caused when the duct D is arranged from the laterally outer side of the cushion side frame 11 under the cushion side frame 11 toward the underside of the seat cushion S1 can be restrained.

Since the second side tubular portion 322 of the duct D is routed under the end portion P10 of the cushion pad P1, the duct D can be arranged closer to the cushion side frame 11 in such a space-saving manner as to render the seat more compact in the lateral direction as compared with an alternative configuration in which the duct D is routed at a laterally outer side of the cushion pad P1. Consequently, the car seat S can be restrained from upsizing in the lateral direction.

Although some exemplary embodiments have been described above, the present invention is not limited to the above-described embodiments. Specific configurations may be modified where appropriate without departing from the gist of the invention, as will be described below.

Figure 41:
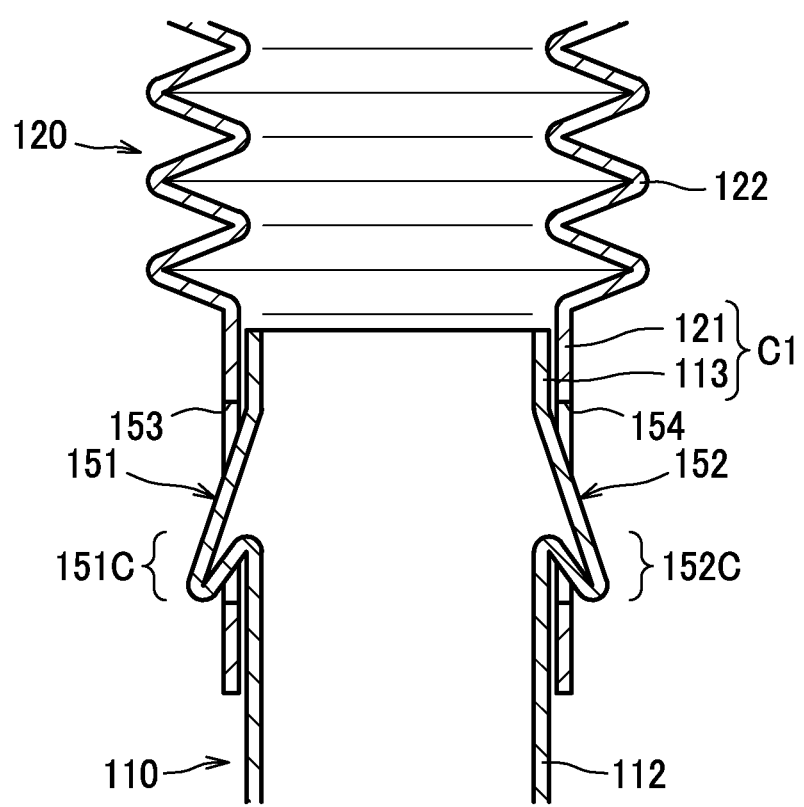
FIG. 41 is a section view of a first connected section and its vicinity of a duct according to a first modified example.

For example, referring to a modified example shown in FIG. 41, the engageable portions 151, 152 configured as projections include barb portions 151C, 152C that extend in a direction opposite to a direction (specifically, a direction from below upward) in which the first duct member 110 is connected to the second duct member 120. To elaborate, the barb portions 151C, 152C are each configured to so extend obliquely in a laterally-outward-and-downward direction as to deviate from a direction opposite to the direction in which the first duct member 110 is connected to the second duct member 120 (from above downward), away from the left or right side surface of the first connecting tubular portion 113. With this configuration, the barb portions 151C, 152C can be engaged with the edges of the engageable portions 153, 154, so that the first duct member 110 and the second duct member 120 can be made less likely to become disconnected. It is to be understood that similar configurations may be adopted into the engageable portions 161, 162, 171, 172.

Figure 42:
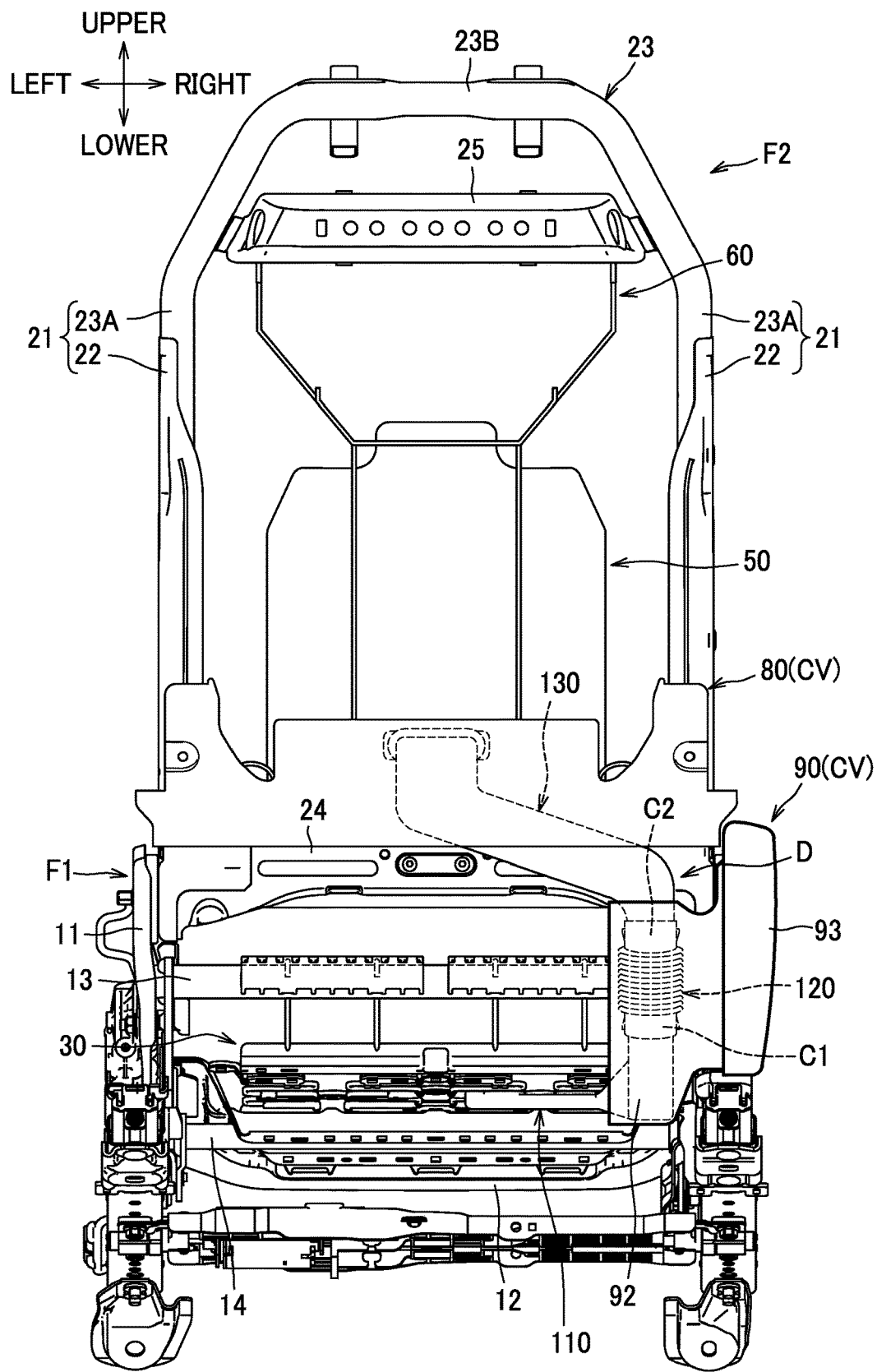
FIG. 42 is a view, as viewed from the rear, of a side frame cover according to a second modified example.

Referring to a modified example shown in FIG. 42, the duct cover portion 92 of the side frame cover 90 which makes up the cover member CV has a vertical length longer than that of the duct cover portion 92 included in the first embodiment, and covers the second connected section C2. To elaborate, the duct cover portion 92 shown in FIG. 42 covers the right side surface and the rear side surface of the second connected portion C2. With this configuration, not only the first connected section C1 but also the second connected section C2 can be protected by the cover member CV.

Although the duct cover portion 92 described above is configured to cover only part (right side surface and rear side surface) of the first connected section C1 and/or the second connected section C2, this is not essential. For example, the duct cover portion (cover member) may be configured to cover the first connected section C1 and/or the second connected section in their entireties. In other words, the cover member may be configured to cover all of the first engageable portion 151, the second engageable portion 152, the third engageable portion 153, and the fourth engageable portion 154.

Figure 43:
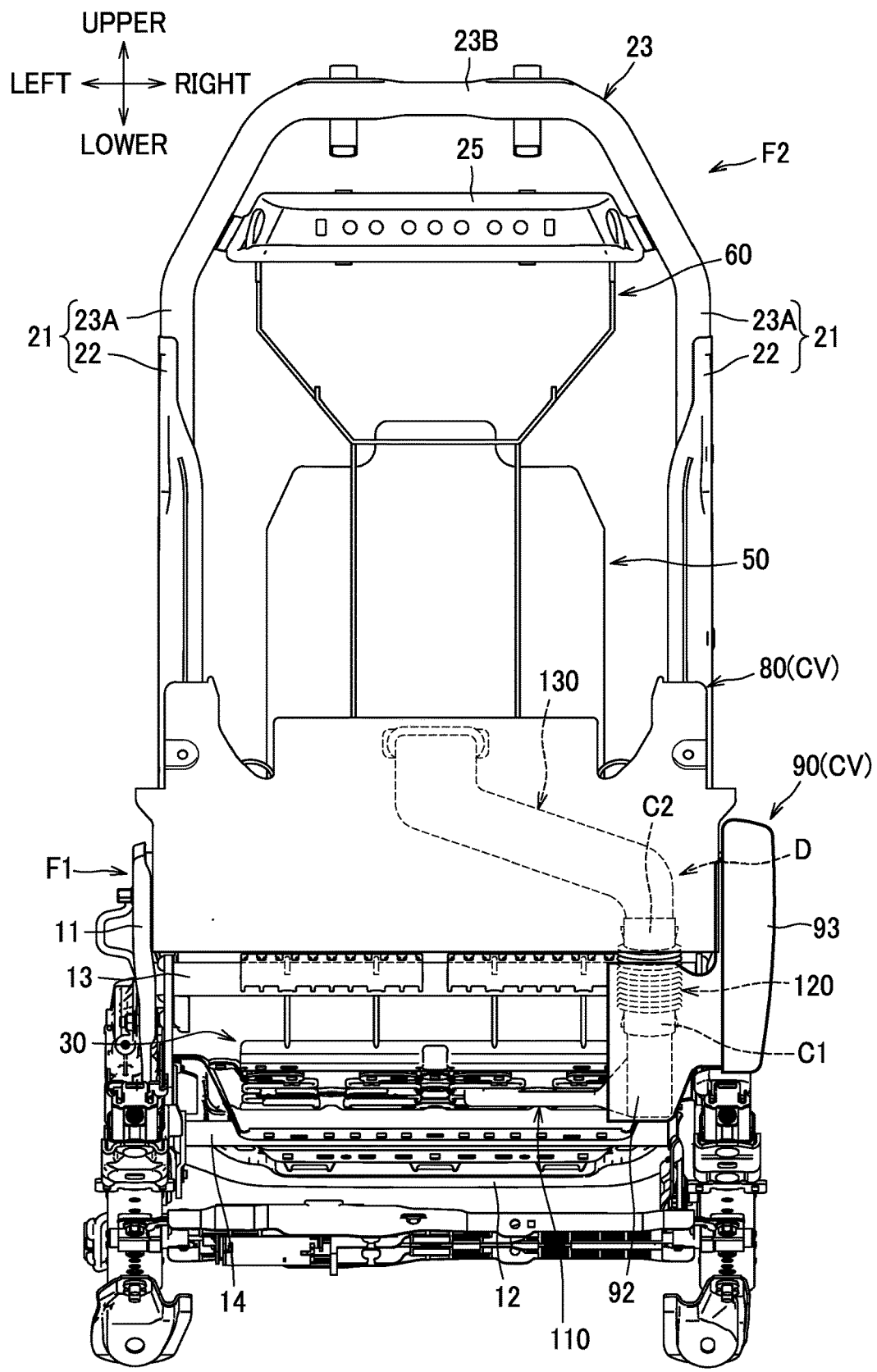
FIG. 43 is a view, as viewed from the rear, of a rear cover according to a third modified example.

Referring to a modified example shown in FIG. 43, the second connected section C2 is covered, not by the side frame cover 90, but by the rear cover 80. To elaborate, the rear cover 80 which makes up the cover member CV includes an extra lower portion, thus is elongated farther downward compared with the rear cover 80 included in the first embodiment, and covers the rear side of the second connected section C2. With this configuration, the second connected section C2 can be protected effectively by the plate-shaped rear cover 80. It is to be understood that, though not illustrated in the drawings, the rear cover may be provided such that not only the second connected section C2 but also the first connected section C1 are covered therewith.

Figure 44:
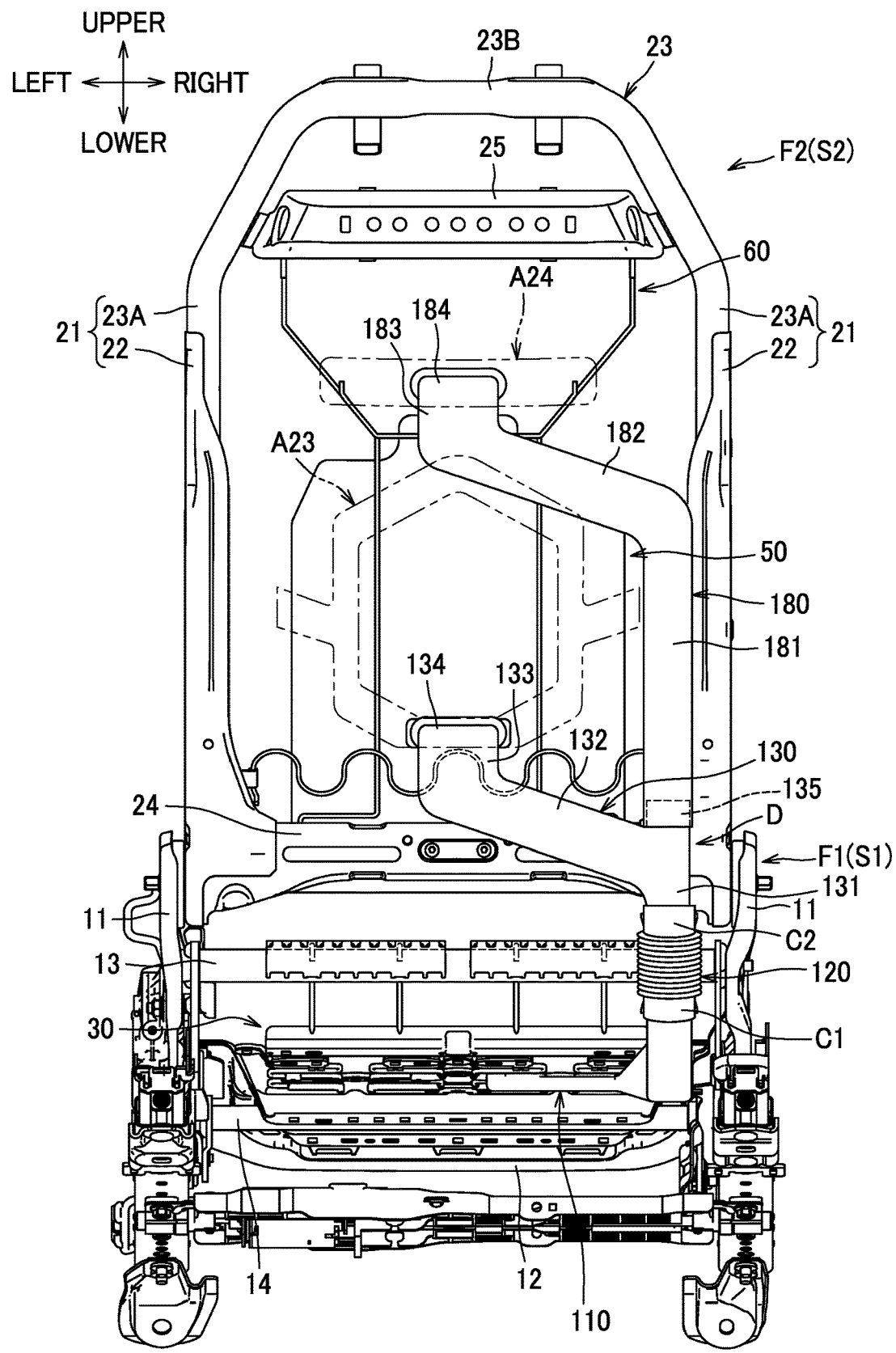
FIG. 44 is a view, as viewed from the rear, of a duct according to a fourth modified example.

Referring to a modified example shown in FIG. 44, the seat back S2 (back pad P2) includes a first air passage A23 formed in a lower part thereof, and a second air passage A24 formed above and independently of the first air passage A23 (i.e., not connecting to the first air passage A23). The duct D includes a third duct member 130 as a first duct portion connecting to the first air passage A23, and a fifth duct member 180 as a second duct portion branching off from the third duct member 130 and connecting to the second air passage A24.

The third duct member 130 further includes a branch tubular portion 135 extending from and the upper end of the fourth connecting tubular portion 131 in a generally upward direction. The first back connecting tubular portion 134 has a front end portion thereof connected to the air passage A23 formed in the upper part of the back pad P2.

The fifth duct member 180 includes a fifth tubular portion 181 extending generally in an upward-and-downward direction, a sixth tubular portion 182 extending from an upper end of the fifth tubular portion 181 obliquely in a leftward-and-upward direction, a seventh tubular portion 183 extending from an upper end of the sixth tubular portion 182 in a generally upward direction, and a second back connecting tubular portion 184 extending from the seventh tubular portion 183 in a generally frontward direction. The fifth tubular portion 181 is formed with an inside space thereof so sized as to permit the branch tubular portion 135 of the third duct member 130 to be fitted therein, and has its lower end connected to the branch tubular portion 135 of the third duct member 130. The second back connecting tubular portion 184 has its front end portion connected to the second air passage A24 formed above the first air passage A23 in the back pad P2.

With this configuration, the blower 70 and the plurality of air passages A23, A24 can be connected by the duct D, so that the feature of jetting-out of air over a wide area of a seat surface of the seat back S2 can be implemented.

The duct D may be configured as a mirror image of the configuration described in relation to the first embodiment. In this alternative, the first connected section C1 and the second connected section C2 may be located in positions shifted closer to the left cushion side frame 11 than to the center (center plane CP) of the seat cushion S1 in the lateral direction, and configured such that the engageable portions 151, 153, 161, 163, etc. are provided at the left side surface of the first connected section C1 and the engageable portions 152, 154, 162, 164, etc. are provided at the right side surface of the first connected section C1.

Figure 45:
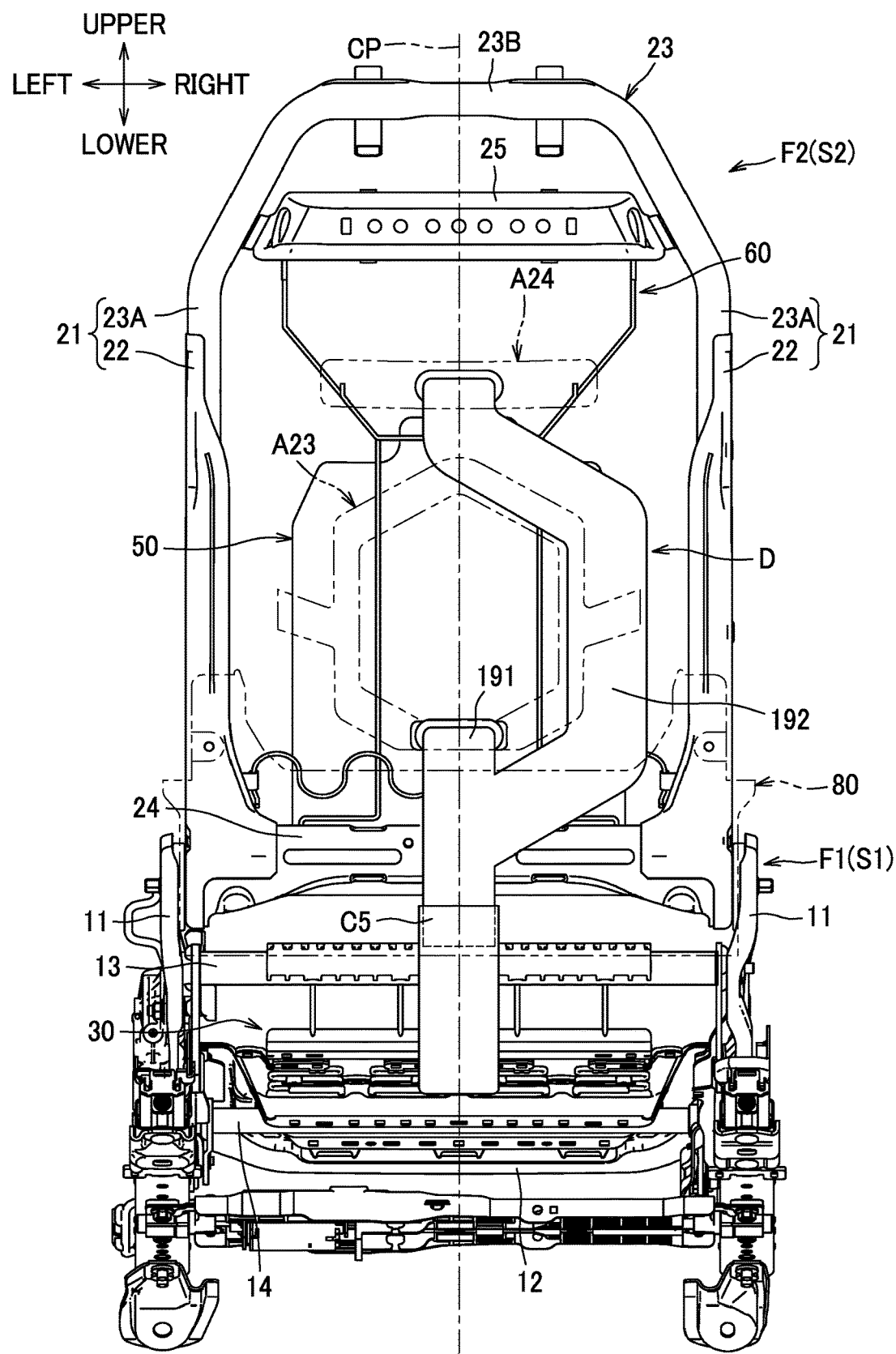
FIG. 45 is a view, as viewed from the rear, of a duct according to a fifth modified example.
Figure 46:
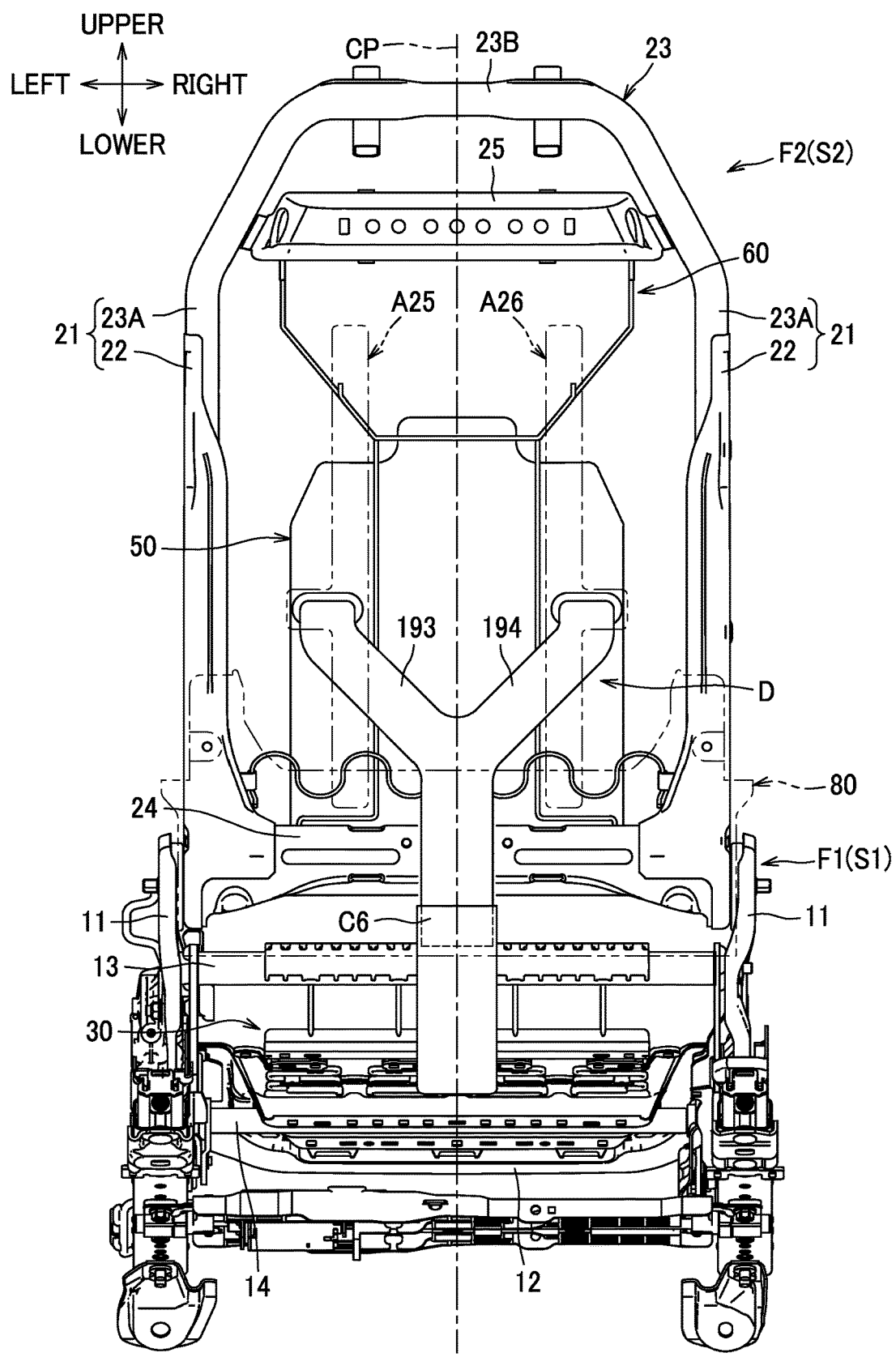
FIG. 46 is a view, as viewed from the rear, of a duct according to a sixth example.

Alternatively, though the first embodiment is illustrated to have the connected sections C1, C2 of the duct D located in positions shifted closer to the cushion side frame 11 in the lateral direction, this is not a prerequisite. For example, as shown in FIG. 45 and FIG. 46, connected sections C5, C6 of the duct D may be located in the center of the seat cushion S1 or in positions shifted closer to the center of the seat cushion S1 than to the cushion side frame 11 in the lateral direction (e.g., intersecting the center plane CP). In this alternative configuration with the connected sections C5, C6 being so located as to intersect the center plane CP, the connected sections C5, C6 may be covered, for example, with the rear cover 80. Moreover, as shown in FIG. 45, the duct D even with its connected section C5 being so located as to intersect the center plane CP may be configured to include a first duct portion 191 connected to the first air passage A23 and a second duct portion 192 branching off from the first duct portion 192 and connected to the second air passage A24.

Although the first embodiment is configured such that the first air passage A23 and the second air passage A24 formed therein are arranged one above the other, this is not an essential arrangement. For example, as shown in FIG. 46, a first air passage A25 and a second air passage A26 provided may be arranged left and right. In this alternative arrangement, the duct D of which a portion disposed at the rear of the back pad (not shown) may comprise a first duct portion 193 connected to the first air passage A25, and a second duct portion 194 branching off from the first duct portion 193 and connected to the second air passage A26, may be formed generally in a shape of a letter Y as viewed from the rear.

Although the first embodiment and the third embodiment comprise the first engageable portion 151 and the second engageable portion 152 configured as projections protruding outward, and the third engageable portion 153 and the fourth engageable portion 154 configured as holes in which the projections are engageable, these are not essential configurations. For example, the first engageable portion and the second engageable portion may be configured as projections protruding inward. The third engageable portion and the fourth engageable portion may be configured as projections while the first engageable portion and the second engageable portion may be configured as holes. The holes may not be through holes but blind holes with bottoms (recesses). The first engageable portion and the second engageable portion may be configured differently from each other, e.g., one of the two portions may be configured as a projection while the other may be configured as a hole. The same thing can be said for the third engageable portion and the fourth engageable portion. The same goes for the other engageable portions (161 to 164, 171 to 174). The duct may comprise a connected section in which no engageable portion is provided.

Figure 47:
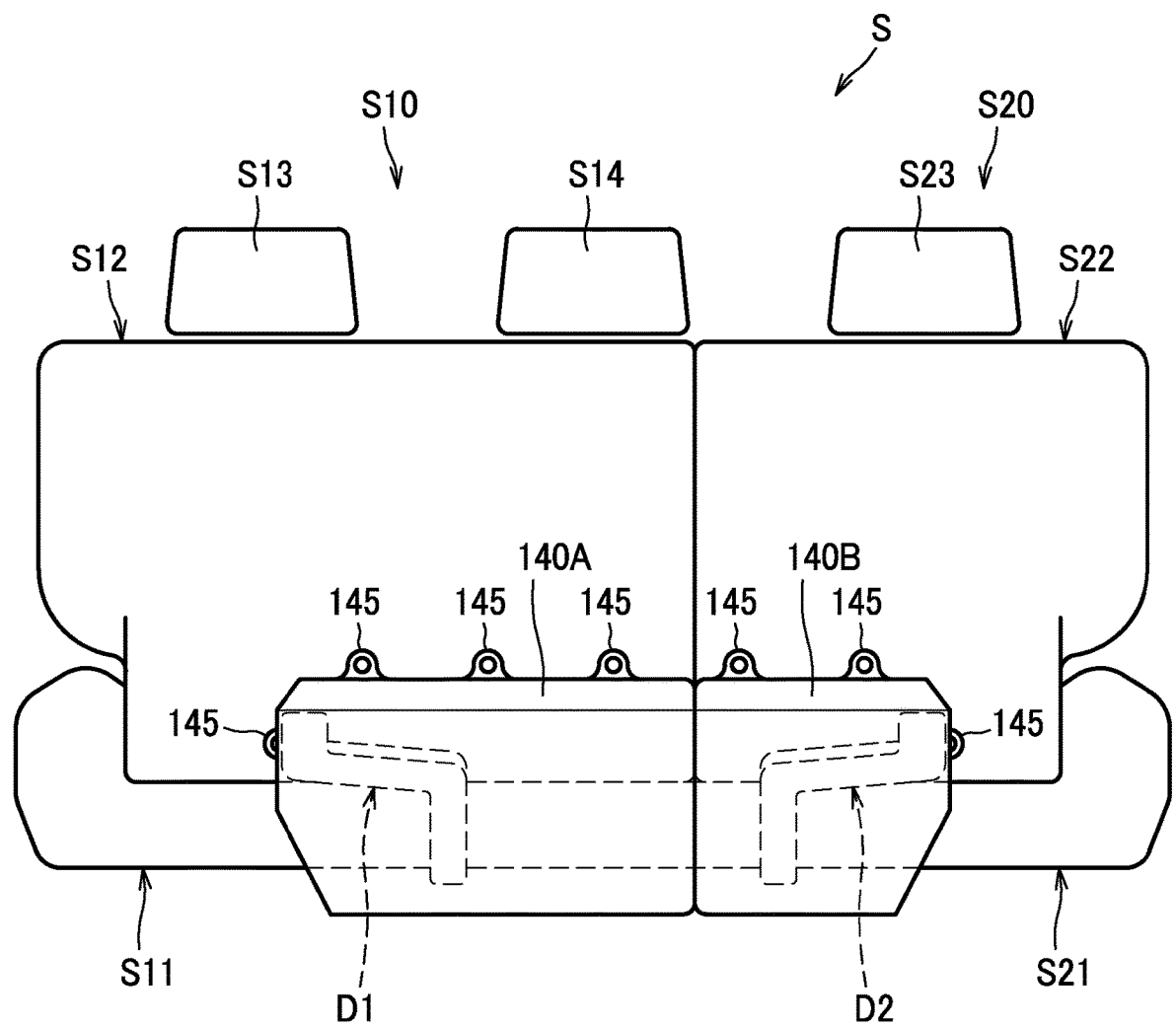
FIG. 47 is a rear view of a car seat according to a seventh modified example.

Although the first cover member 40A and the second cover member 40B in the second embodiment are configured integrally in one piece, an alternative configuration as shown in FIG. 47 may be feasible in which a first cover member 140A and a second cover member 140B are configured separately as independent members. In this alternative configuration, the first cover member 140A or the second cover member 140B may not be provided across the border between the first seat back S12 and the second seat back S22; rather, preferably, the first cover member 140A may be provided only at the rear side of the first seat portion S10 and the second cover member 140B may be provided only at the rear side of the second seat portion S20. In this configuration shown in FIG. 47, the border between the first cover member 140A and the second cover member 140B is aligned with the border between the first seat back S12 and the second seat back S22.

The cover member 40, which is fixed to the floor FL of the car body in the second embodiment, may alternatively be fixed to the car seat S. For example, a car seat S shown in FIG. 47 is configured such that a plurality of protruding attachment portions 145 each having a hole are provided protrusively at the edges of the first cover member 140A and the second cover member 140B, so that the first cover member 140A and the second cover member 140B can be fixed to the first seat back S12 and the second seat back S22 with bolts or clips inserted in the holes of the attachment portions 145.

In this configuration shown in FIG. 47, the first cover member 140A is located only at the rear side of the first seat portion S10, and the second cover member 140B is located only at the rear side of the second seat portion S20; therefore, even when the first seat back S12 or the second seat back S22 is tilted frontward, the first cover member 140A would not interfere with the second seat back S22, and the second cover member 140B would not interfere with the first seat back S12.

Figure 48:
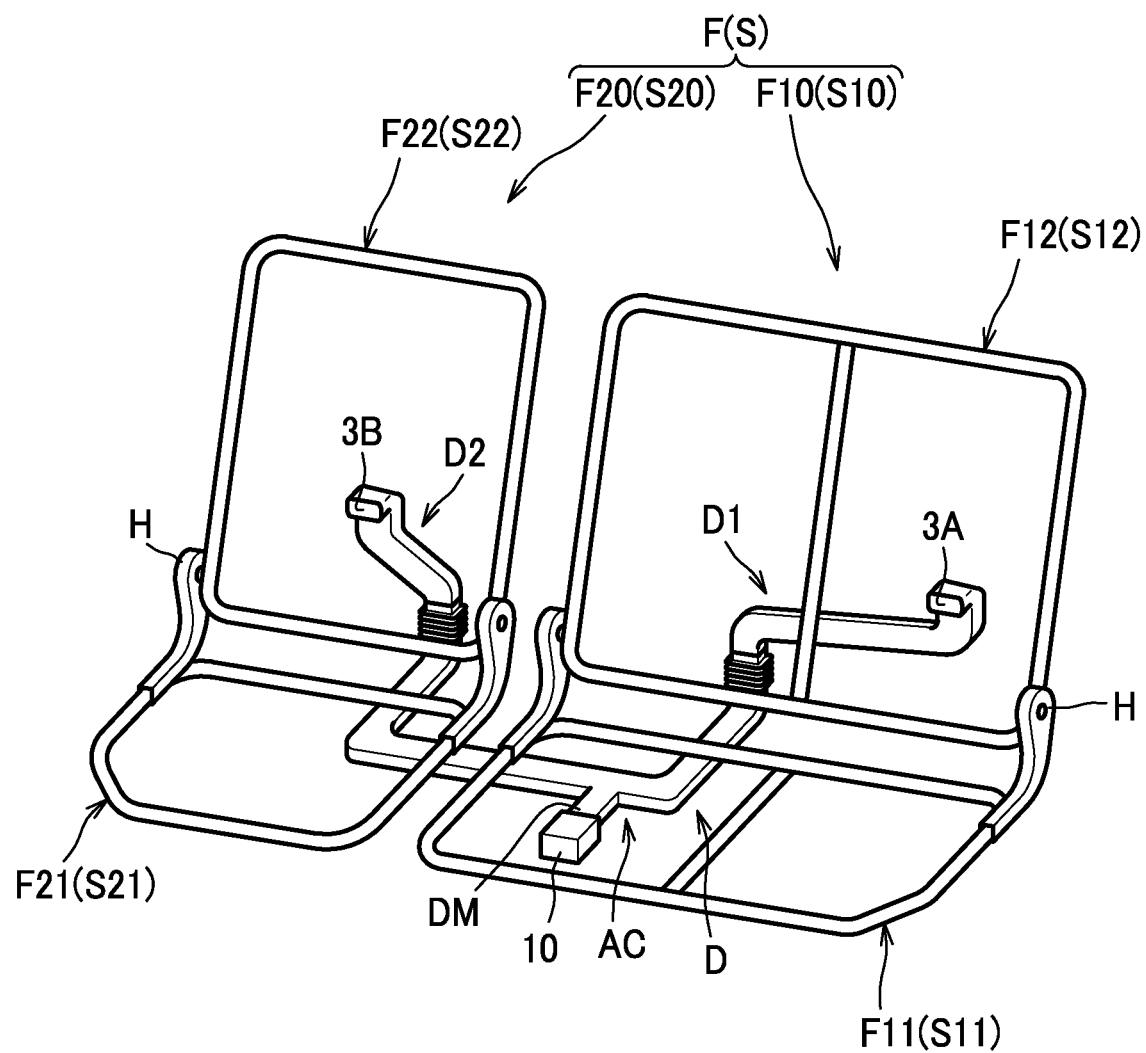
FIG. 48 is a perspective view of a seat frame and an air conditioner of a car seat according to an eighth modified example.
Figure 49:
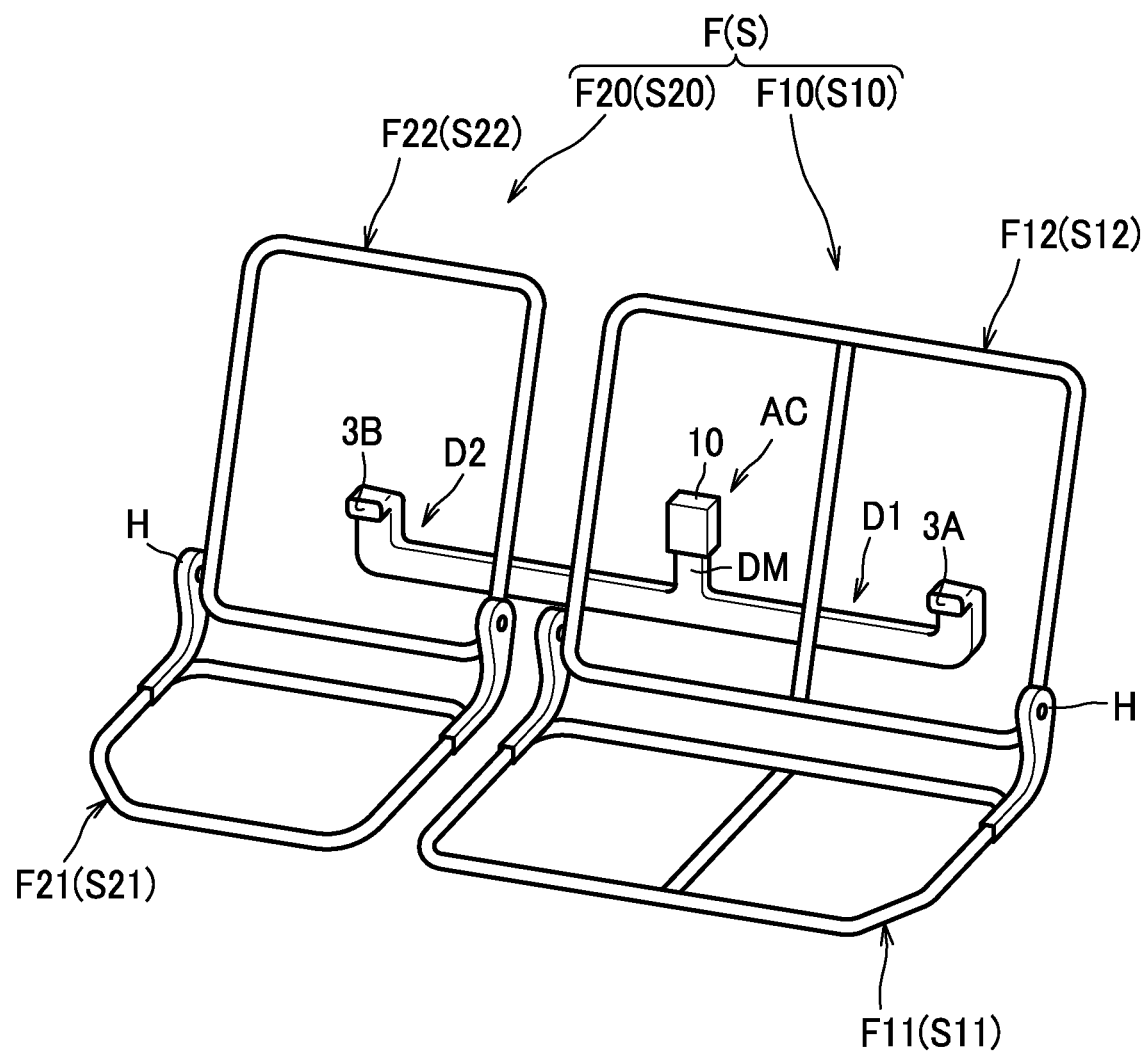
FIG. 49 is a perspective view of a seat frame and an air conditioner of a car seat according to a ninth modified example.
Figure 50:
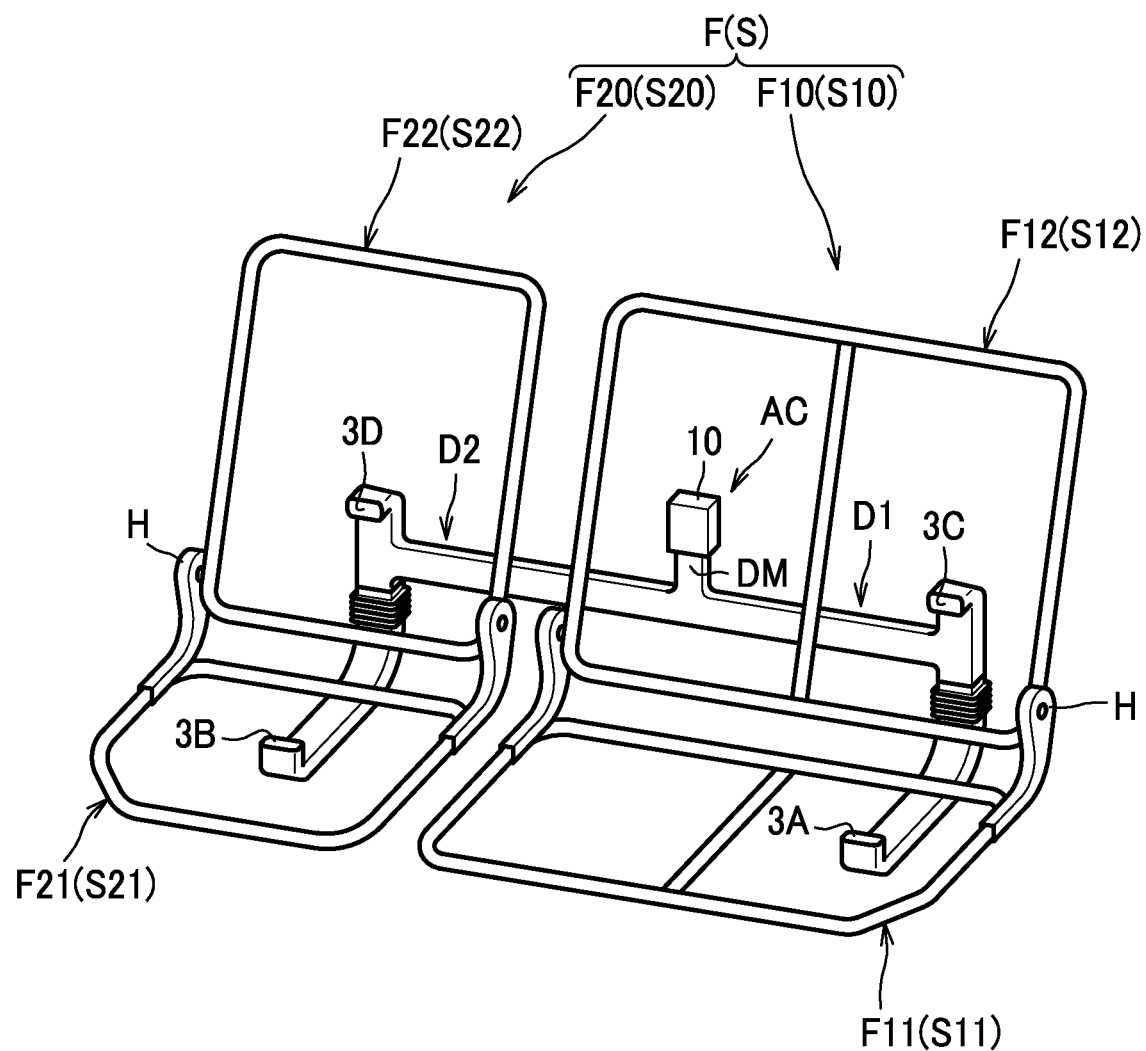
FIG. 50 is a perspective view of a seat frame and an air conditioner of a car seat according to a tenth modified example.

In the second embodiment, the duct D is configured to connect the single blower 10 to the respective air passages A11, A12, A21, A22 of the first seat cushion S11, the first seat back S12, the second seat cushion S21, and the second seat back S22; however, the duct D may be configured, as shown in FIG. 48, to connect the blower 10 to the air passages A12, A22 formed in the first seat back S12 and the second seat back S22 only (in FIG. 48 to FIG. 50, illustration of the air passages is omitted). In this example of FIG. 48, the blower 10 is provided at the first seat cushion S11, the first connecting port 3A is connected to the air passage A12 of the first seat back S12, and the second connecting portion 3B is connected to the air passage A22 of the second seat back S22.

Although the blower 10, in the second embodiment, is provided at the seat cushion, the blower 10 may be provided at the seat back as shown in FIG. 49. In this example of FIG. 49, the blower 10 is provided at the first seat back S12, the first connecting port 3A of the duct D is connected to the air passage A12 of the first seat back S12, and the second connecting port 3B of the duct D is connected to the air passage A22 of the second seat back S22.

Moreover, as in an alternative embodiment shown in FIG. 50, where the blower 10 is provided at the seat back, the duct D may be configured to connect the single blower 10 to the respective air passages A11, A12, A21, A22 of the first seat cushion S11, the first seat back S12, the second seat cushion S21, and the second seat back S22. In this example of FIG. 50, the duct D includes a first connecting port 3A connected to the air passage A11 of the first seat cushion S11, a third connecting port 3C connected to the air passage A12 of the first seat back S12, the second connecting port 3B connected to the air passage A21 of the second seat cushion S21, and a fourth connecting port 3D connected to the air passage A22 of the second seat back S22.

Figure 51:
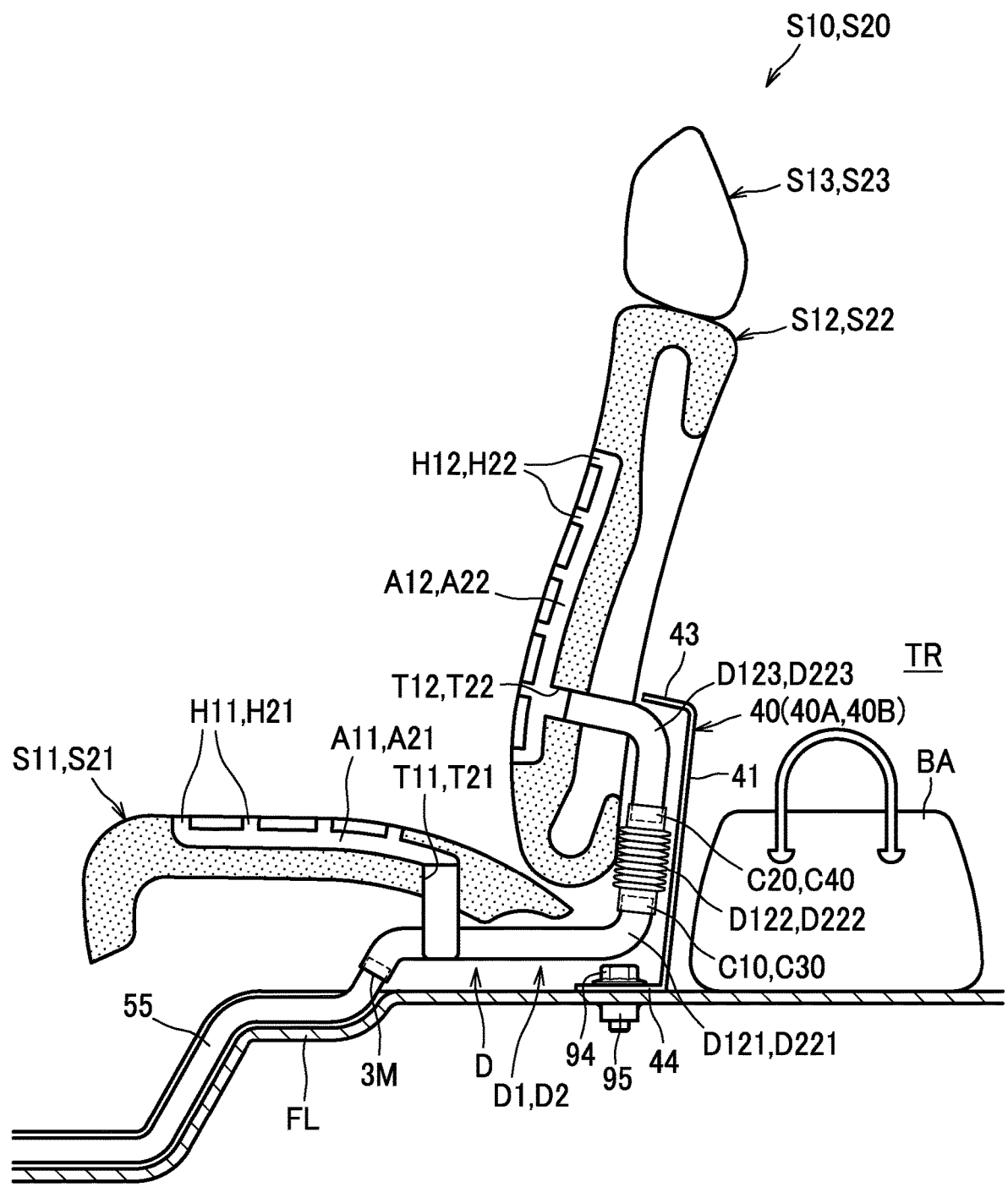
FIG. 51 is a section view illustrating a configuration related to an air conditioner of a car seat according to an eleventh modified example.

Although the blower 10 in the second embodiment is provided in the car seat S, the car seat S may not necessarily comprise the blower 10. For example, as shown in FIG. 51, a duct 55 connected to a blower (not shown) provided frontward of the car seat S is disposed on the floor FL of the car, and a blower-side connecting port 3M of the duct D is connected to this duct 55 provided in the car.

In the second embodiment, the first cover member 40A is configured to cover the rear side of the first duct portion D1 entirely, and the second cover member 40B is configured to cover the rear side of the second duct portion D2 entirely; however, the first cover member 40A may be configured to cover the rear side of at least an upper portion (portion above the first seat cushion S11) of the first duct portion D1, and depending on the structures of the car and/or the car seat S, may be configured not to cover the whole or part of the first duct portion D1 at the rear side of the first seat cushion S11. Similarly, the second cover member 40B may be configured to cover the rear side of at least an upper portion (portion above the second seat cushion S21) of the second duct portion D2, and depending on the structures of the car and/or the car seat S, may be configured not to cover the whole or part of the second duct portion D2 at the rear side of the second seat cushion S21.

Although the second embodiment is configured such that the blower-side connecting port 3M is connected to the air outlet of the blower 10, and that the air conditioner AC is configured to cause air to be jetted out of the respective ventilation holes H11, H12, H21, H22, the blower-side connecting port 3M may be connected to an air inlet of the blower 10, and the air conditioner AC may be configured to cause air to be drawn in through the respective ventilation holes H11, H12, H21, H22.

Figure 52:
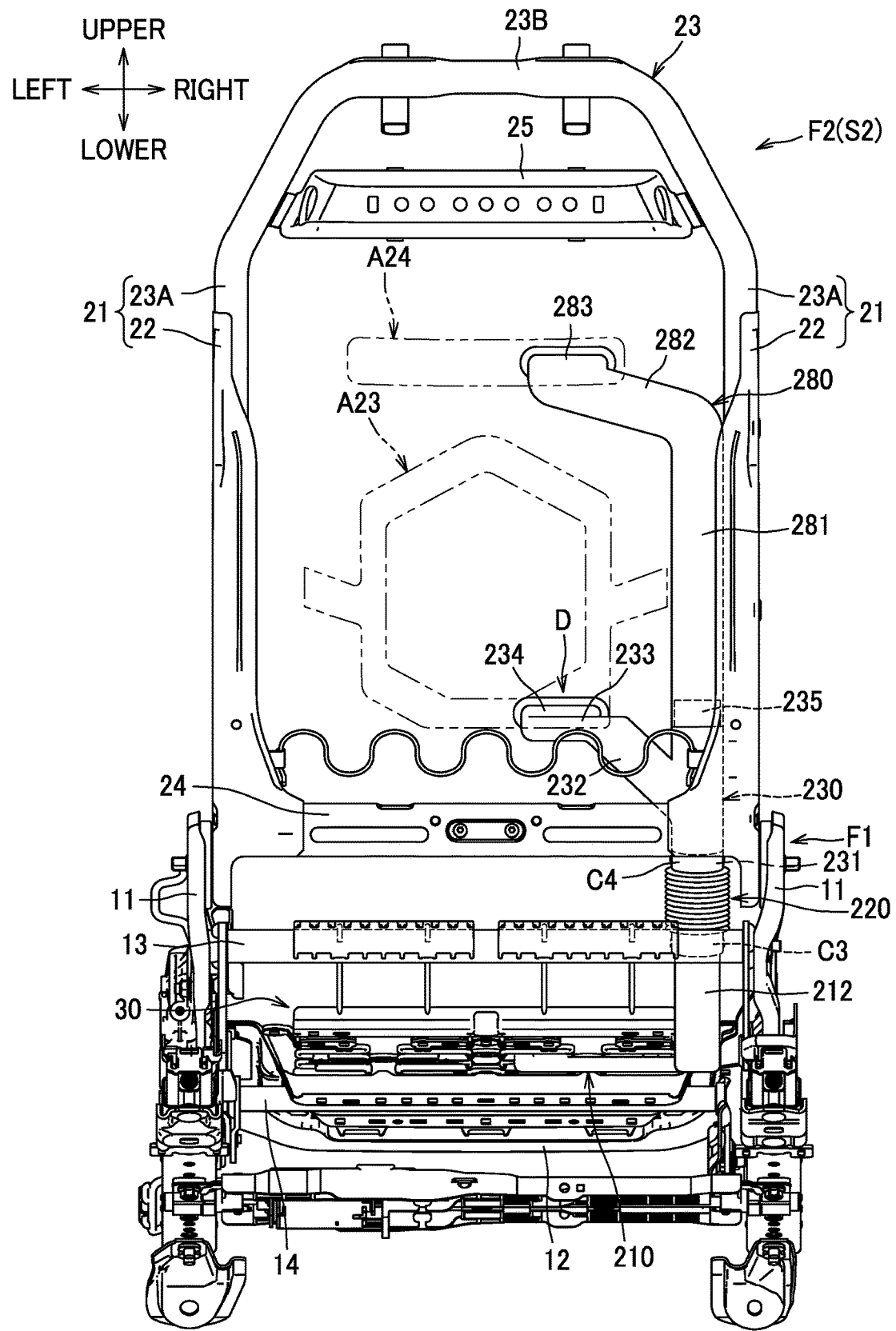
FIG. 52 is a view, as viewed from the rear, of a duct according to a twelfth modified example.

For example, in a modified example shown in FIG. 52, the duct D includes a third duct member 230 as a first duct portion connecting to the first air passage A23, and a fifth duct member 280 as a second duct portion branching off from the third duct member 230 and connecting to the second air passage A24.

The third duct member 230 further includes a branch tubular portion 235 extending from the upper end of the fourth connecting tubular portion 231 in a generally upward direction. The first back connecting tubular portion 234 has a front end portion thereof connected to the first air passage A23 formed in the lower part of the back pad P2.

The fifth duct member 280 includes a third upper tubular portion 281 extending generally in an upward-downward direction, a fourth upper tubular portion 282 extending from an upper end of the third upper tubular portion 281 obliquely in a leftward-and-upward direction, and a second back connecting tubular portion 283 extending from an upper end of the fourth upper tubular portion 282 in a generally frontward direction. The third upper tubular portion 281 is formed with an inside space thereof so sized as to permit the upper end of the branch tubular portion 235 of the third duct member 230 to be fitted therein, and has its lower end connected to the branch tubular portion 235 of the third duct member 230. The second back connecting tubular portion 283 has its front portion connected to the second air passage A24 formed above the first air passage A23 in the back pad P2.

With this configuration, the blower 70 and a plurality of air passages A23, A24 can be connected by the duct D, so that the feature of jetting-out of air over a wide area of a seat surface of the seat back S2 can be implemented.

The configuration as shown in FIG. 44 and FIG. 52 may be applied not only to the seat back S2 but also to the seat cushion S1, or may not be applied to the seat back S2 but to the seat cushion S1, instead. Specifically, the seat cushion S1 may include a first air passage and a second air passage, whereas the duct D is, for example, configured to branch off under the seat cushion S1 to provide individual connections to the first air passage and the second air passage. This makes it possible to implement the feature of jetting-out of air over a wide area of a seat surface of the seat cushion S1.

The duct D may be configured as a mirror image of either of the configurations described in relation to the third embodiment and the fourth embodiment. The duct D may be configured to include no curved portion (such as the curved tubular portion 212). Although the duct D described in the third embodiment and the fourth embodiment includes the first bellows portion 222 as a flexible portion, this is not a prerequisite; it is thus to be understood that the flexible portion may have any other configuration without limitation as long as it has flexibility. Although the duct D described in the third embodiment and the fourth embodiment comprises a plurality of parts connected to each other, this is not a prerequisite; it is to be understood that the duct D may be one which consists of a single part.

Although the rear pipe 13 made of piping material is described as an example of a rear frame in the above embodiments, this is not a prerequisite; as an alternative, the rear frame may be a plate-shaped frame made of sheet metal. Although the plate-shaped lower frame 24 made of sheet metal is described as an example of a lower frame, this is not a prerequisite; as an alternative, the lower frame may be a frame made of piping material.

Figure 53:
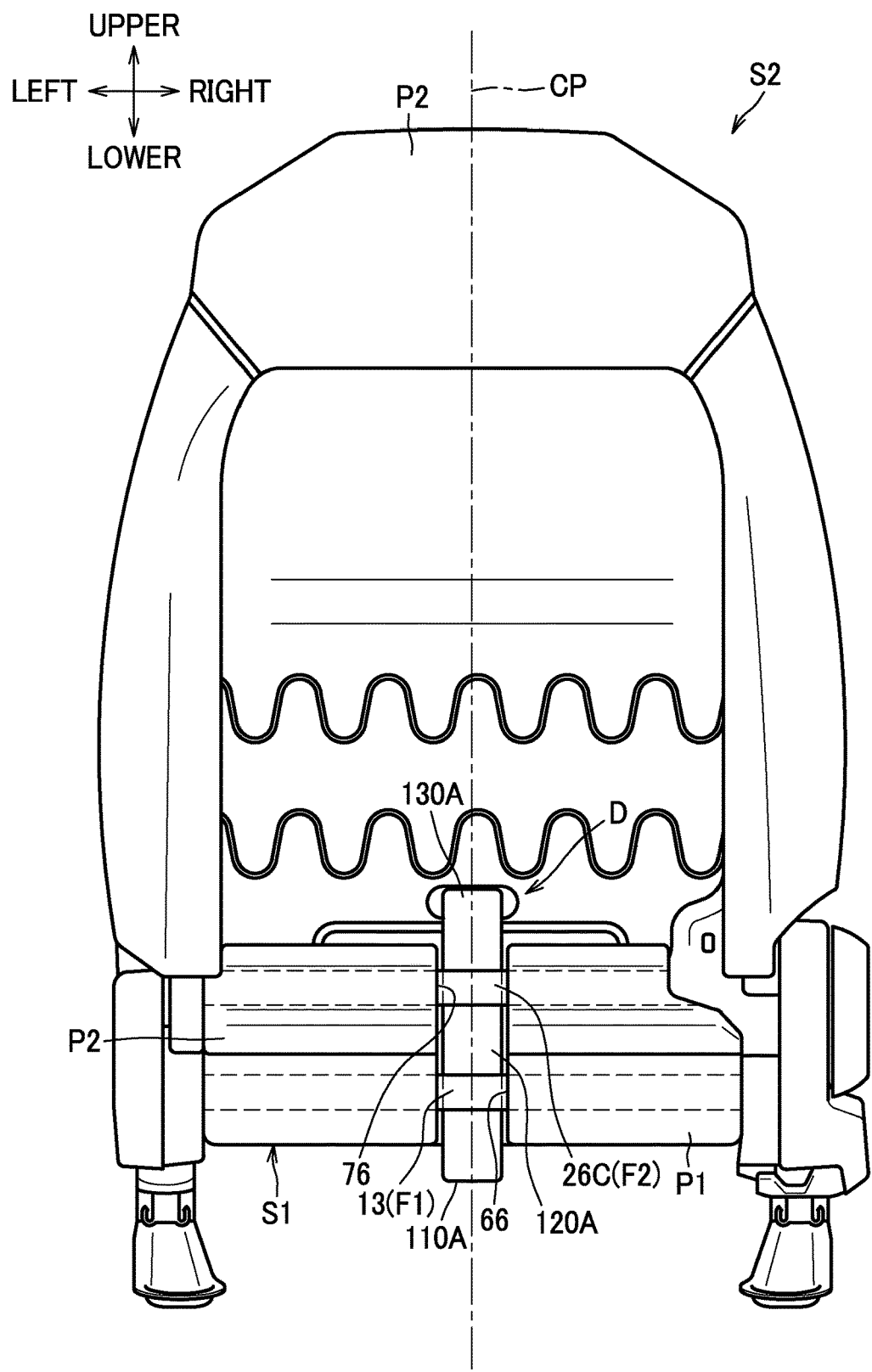
FIG. 53 is a view, as viewed from the rear, of a duct according to a thirteenth modified example.

Although the duct D described in the third embodiment and the fourth embodiment includes an upward-and-downward-extending portion located in a position shifted closer to the right or left end than to the center in the lateral direction of the seat back S2, this is not a prerequisite. For example, as shown in FIG. 53, the upward-and-downward-extending portion may be located in a position shifted to the center (center plane CP) than to the end in the lateral direction of the seat back S2. To elaborate, the duct D extends in the front-rear direction under the seat cushion S1, and its front end portion includes a lower tubular portion 110A connected to the blower (not shown), a rear tubular portion 120A extending from the rear end of the lower tubular portion 110A in a generally upward direction, and a back connecting tubular portion 130A extending from the upper end of the rear tubular portion 120A frontward and connected to the back pad P2. The lower tubular portion 110A, the rear tubular portion 120A as an upward-and-downward-extending portion, and the back connecting tubular portion 130A of duct D are located in a position shifted closer to the center plane CP than to the ends in the lateral direction of the seat back S2, more specifically, so located as to intersect the center plane CP. With this configuration, the duct can be rendered shorter in length.

In the modified example shown in FIG. 53, the rear tubular portion 120A is laid across the front sides of the rear pipe 13 of the cushion frame F1 and the lower frame 26C of the back frame F2, and extends from the seat cushion S1 toward the seat back S2. The cushion pad P1 has, at a laterally central portion of a rear end portion thereof, a notch 66 through which the rear tubular portion 120A is arranged. The back pad P2 has, at a laterally central portion of a lower end portion thereof, a notch 76 through which the rear tubular portion 120A is arranged. The notches 66, 76 are so shaped as to open on the top, bottom and rear.

Although the duct D in the third embodiment and the fourth embodiment is configured such that part of its lower tubular portion 211 is located outward of an outermost wire member 31 in the lateral direction, this is not a prerequisite; for example, the duct in its entirety may be arranged outward of the outermost wire member. Alternatively, the duct in its entirety may be located between two outermost wire members.

Although the duct D in the third embodiment and the fourth embodiment is configured such that part of its lower tubular portion 211 is located outward of a pair of first tuck-in grooves G11, this is not a prerequisite; for example, the duct in its entirety may be arranged outward of a pair of tuck-in grooves extending in the front-rear direction. Alternatively, the duct in its entirety may be located between a pair of tuck-in grooves extending in the front-rear direction.

Although the first bellows portion 222 in the third embodiment and the fourth embodiment is configured such that its lower end portion (part of the flexible portion) is located between the cushion pad P1 and the back pad P2, this is not a prerequisite; for example, the flexible portion in its entirety may be arranged between the cushion pad and the back pad. Alternatively, if the seat back is configured to be non-reclinable relative to the seat cushion, a portion other than the flexible portion may be located between the cushion pad and the back pad. Alternatively, the duct may be configured to include no flexible portion.

Although the duct D in the third embodiment and the fourth embodiment is arranged in such a state that its first connected section C3 (overlapped section) is in contact with the rear pipe 13 of the back frame F2, this is not a prerequisite. For example, the duct if configured to be hard and resistant to deformation in its entirety may be arranged in such a state that a portion thereof other than the overlapped section is in contact with the frame. Alternatively, the duct may be so arranged as not to be in contact with the frame, that is, as to be separate from the frame.

Although the fourth embodiment is configured such that the first engageable member 540 (engageable member) includes the first engageable portion 541 and the plate portion 542 whereas the second engageable portion 550 is engageable with the plate portion 542, this configuration is not essential; for example, the engageable member may not include a plate portion. In other words, the fourth embodiment is configured such that the second engageable member 550 (second engageable portion) is engageable with the both of the first tongue portion 521 and the plate portion 542, but the second engageable portion may be configured to be engageable only with the first tongue portion.

Although the fourth embodiment is configured such that the outer covering U2 (outer covering member) includes the third tongue portion 523 to be retained on the wire frame 29, and is retained on the back frame F2 (frame member), this configuration is not essential. For example, the outer covering member may be configured to include no third tongue portion. In other words, an alternative configuration in which the outer covering member is not retained on the frame member may be feasible. Moreover, if the wire frame is good for nothing except for retention of the outer covering member thereon, the frame member may be configured to include no wire frame.

The configuration of the first end portion of the outer covering member and the configuration for retention of the outer covering member on the wire frame of the frame member may be applied not to the seat back but to the seat cushion. In such alternative configurations, the cushion frame may be construed to correspond as an equivalent of "frame member", whereas the first end portion extends from an upper side (occupant side) of the seat cushion to an underside (reverse side opposite to the occupant side) of the seat cushion, for example, across the rear side of the cushion pad, and is retained on the target engageable portion at the underside of the seat cushion. To elaborate more, the first tongue portion extends across one of the left and right sides of the duct from the upper side toward the underside, and the second tongue portion extends across the other of the left and right sides of the duct form the upper side toward the underside.

In the fourth embodiment, the target engageable member 570 (target engageable portion) on which the first end portion 520 is retained is provided at the second end portion 530, but this is not a prerequisite; for example, the target engageable portion may be provided at a frame member or other part. In other words, the first end portion of the outer covering member may not be configured to be retained on the second end portion, but may instead be configured to be retained on the frame member or any other part.

In the fourth embodiment, the cover member DC is a soft member, similar to the outer covering U1, U2, made of fabric or leather; however, as an alternative, if the seat back is configured to be non-reclinable relative to the seat cushion, the cover member may be a member harder than the outer covering. Alternatively, the car seat may be configured to include no cover member.

Although the notches 65, 75 in the fourth embodiment are illustrated as examples of a recessed portion in which the upward-and-downward-extending portion of the duct is located, this is not a prerequisite. For example, although the recessed portion (notch 65) of the cushion pad P1 in the fourth embodiment is so shaped as to open on the rear, left, top and bottom as shown in FIG. 28, the recessed portion may be so shaped as to open only on the left, top and bottom.

In short, the recessed portion of the cushion pad P1 may alternatively be so shaped as to open on one side as viewed from above or below. Similarly, the recessed portion (notch 75) of the back pad P2 in the fourth embodiment is so shaped as to open on the bottom, front and rear as shown in FIG. 29, but may alternatively be so shaped as to open only on the bottom and rear. In short, the recessed portion of the back pad P2 may alternatively be so shaped as to be closed on the front side.

Figure 54:
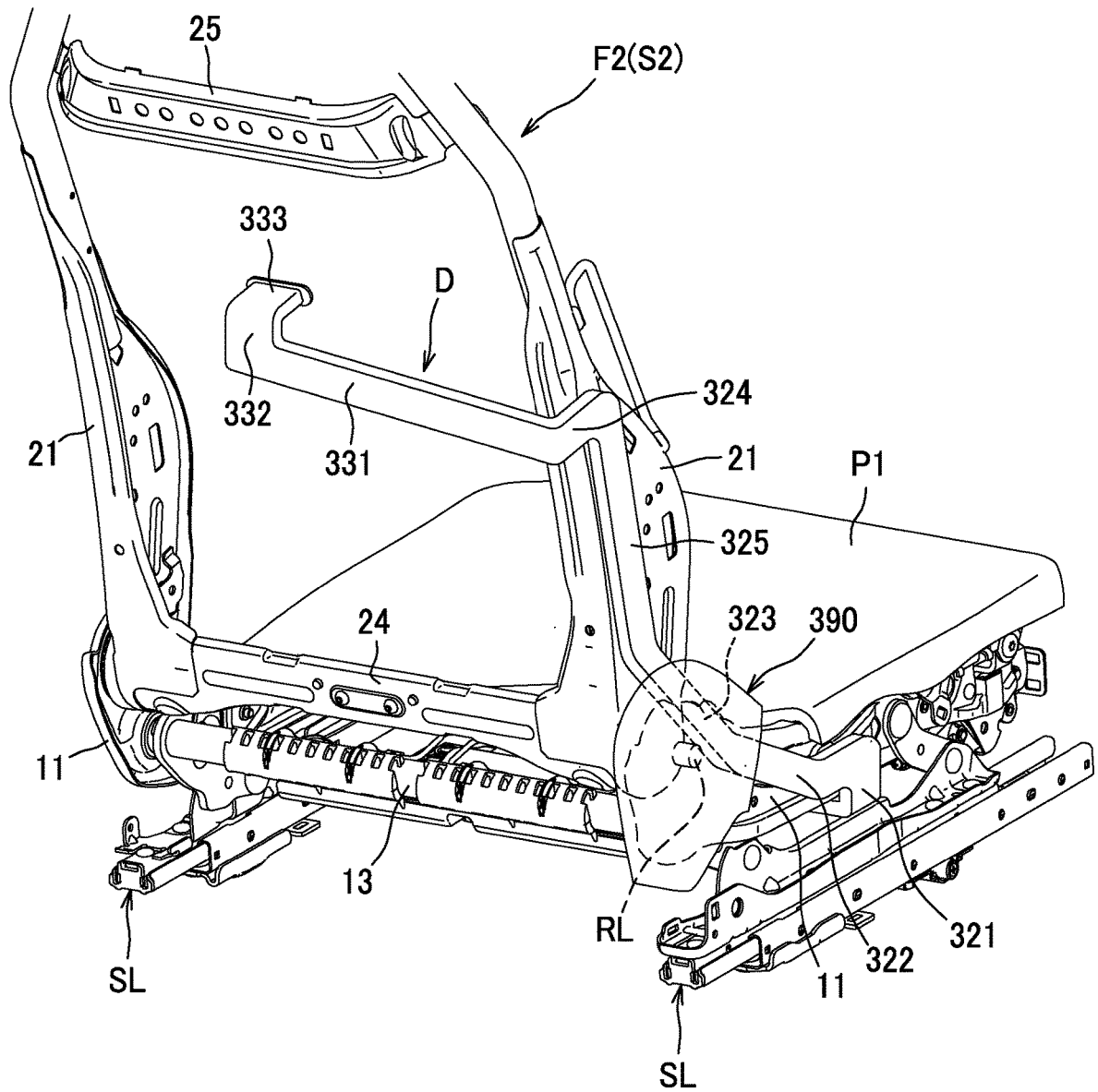
FIG. 54 is a perspective view, as viewed from the laterally outer side, of a duct according to a fourteenth modified example.

In a modified example shown in FIG. 54, the duct D includes a fourth side tubular portion 325 between the first bellows portion 323 and the third side tubular portion 324. The fourth side tubular portion 325 is a portion extending from the rear end of the first bellows portion 323 in a generally upward direction. The third side tubular portion 324 extends from the upper end of the fourth side tubular portion 325 in a generally rearward direction. The fourth side tubular portion 325 of the duct D in the modified example shown in FIG. 54 is routed at the laterally outer side of the back side frame 21, above the linking portion (reclining mechanism RL) by which the right cushion side frame 11 and the back side frame 21 are linked, and extends upward. The duct D has its upper end portion (specifically, the first rear tubular portion 331 extending from the rear end of the third side tubular portion 324) so routed as to extend laterally inward at a rear side of the back side frame 21, and its back connecting tubular portion 333 connected to the air passage formed in the back pad (not shown) of the seat back S2.

With this arrangement, the first rear tubular portion 331 and the second rear tubular portion 332, that are portions of the duct D routed at the rear side of the back side frame 21 can be located at higher positions, in comparison with an alternative arrangement in which the duct is routed at the rear side of the back side frame 21 from the vicinity of the linking portion by which the cushion side frame 11 and the back side frame 21 are linked, and connected to the seat back S2. Accordingly, the duct D can be restrained more reliably from being hit by a foot of a rear-seat occupant.

The duct D may be configured as a mirror image of the configuration described in relation to the fifth embodiment. In this alternative configuration, the duct D may be so routed at a laterally outer side of the left cushion side frame 11 as to extend from the seat cushion S1 toward the seat back S2. Although the duct D described in the fifth embodiment includes the first bellows portion 323 as a flexible portion, this is not a prerequisite; it is thus to be understood that the flexible portion may have any other configuration without limitation as long as it has flexibility. The duct D may be configured to comprise a plurality of parts connected to one another.

Although the fifth embodiment is configured such that the laterally outer side of the linking portion by which the cushion side frame and the back side frame are linked, in other words, the rear end portion of the cushion side frame 11 (i.e., part of the cushion side frame 11) is covered with the side frame cover 390 constituting the cover member CV, this is not a prerequisite configuration. For example, a feasible alternative configuration may be such that the laterally outer side of a portion frontward of the linking portion, rather than the linking portion, by which the cushion side frame and the back side frame are linked, is covered with the cover member. Alternatively, the cover member may be configured to entirely cover the laterally outer side of the cushion side frame. It is to be understood that in this alternative configuration in which the cover member entirely covers the cushion side frame, if the duct is located between the cushion side frame and the cover member, the entire portion of the duct located at the laterally outer side of the cushion side frame can be protected by the cover member; therefore, the duct may be routed at the laterally outer side of the cushion side frame closer to the door. Alternatively, even if the car seat is configured to comprise a cover member, the duct may be routed at an outside of the cover member in such a manner as to take a detour around the cover member, instead of being routed between the cushion side frame and the cover member (at an inside of the cover member).

Although the blower 70 in the above-described embodiment is illustrated as a sirocco fan by way of example, this is not a prerequisite; any type of blower may be selected without limitation. For example, a propeller fan or a turbofan may be adopted, instead. Although the car seat S in the above-described embodiments is configured such that air is jetted out through the ventilation holes H1, H2, etc., this is not a prerequisite; for example, an alternative configuration may be feasible in which air is drawn in through the ventilation holes. This configuration in which air is drawn in through the ventilation holes may be adopted into the embodiments shown in FIG. 44 and FIG. 52, so that the features of drawing-in of air over a wide area of a seat surface of the seat cushion or the seat back can be implemented.

The blower may be configured to be switchable between blow-out and draw-in modes, for example, by changing the direction of rotation of the impeller. Although the above-described embodiment is configured such that the car seat S includes the blower 70, the car seat itself may not include any blower. In other words, the blower may be provided in a car body of an automobile in which the car seat is installed. In this alternative configuration, the car seat may be configured such that the duct is connected, for example, to an outlet or inlet of air provided in the car body.

Although the above-described embodiments are configured such that air passages to be connected to the blower via the duct D are formed in both of the seat cushion and the seat back, this is not an essential configuration; an alternative configuration in which such air passage is formed only in one of the seat cushion or the seat back may be feasible.

In the above-described embodiment, the car seat S installed in an automobile is illustrated as a vehicle seat, but this is not a prerequisite; the vehicle seat may be a seat installed in a vehicle other than an automobile, for example, in a railcar, ship, aircraft, etc.

Any of the elements explained in relation to the above-described embodiments and modified examples may be implemented in combination as desired.

The invention claimed is:
1. A vehicle seat with a seat cushion and a seat back, the vehicle seat comprising:
   a duct disposed astride the seat cushion and the seat back, and configured to connect an air passage and a blower, the air passage being formed in at least one of the seat cushion and the seat back, the duct comprising:
      a first duct member, and
      a second duct member that is connected to the first duct member;
   a cover member configured to cover part of the duct;
   left and right cushion side frames which constitute left and right frames of the seat cushion; and
   a rear frame by which rear portions of the left and right cushion side frames are connected, wherein the cover member is configured to cover at least part of a first connected section that is a section at which the first duct member and the second duct member are connected, wherein the first duct member comprises:
   a first engageable portion, and
   a second engageable portion that are provided in the first connected section, wherein the second duct member comprises:
   a third engageable portion that is engageable with the first engageable portion, and
   a fourth engageable portion that is engageable with the second engageable portion,
   wherein the second engageable portion and the fourth engageable portion are provided at a right side surface or a left side surface of the first connected section, wherein the cover member is further configured to cover the first engageable portion and the third engageable portion, but not to cover the second engageable portion and the fourth engageable portion, and
   wherein the duct is laid across a rear side of the rear frame and extends from the seat cushion toward the seat back.

2. The vehicle seat according to claim 1, wherein the first connected section is located in a position shifted closer to the left or right cushion side frame than to a center of the seat cushion in a lateral direction, and
   wherein the first engageable portion and the third engageable portion are provided at a side surface of the first connected section that is more distant than the second engageable portion and the fourth engageable portion from the center of the seat cushion in the lateral direction.

3. The vehicle seat according to claim 2, wherein the first engageable portion and the third engageable portion are located, in the lateral direction, closer to a door for getting in and out of a rear side of the vehicle seat than the second engageable portion and the fourth engageable portion.

4. The vehicle seat according to claim 1, wherein the first engageable portion and the second engageable portion are projections having outwardly protruding shapes, and the third engageable portion and the fourth engageable portion are through holes with which the projections are engageable.

5. The vehicle seat according to claim 4, wherein the projections include barb portions that extend opposite to a direction in which the first duct member is connected to the second duct member.

6. The vehicle seat according to claim 1, wherein the second duct member is connected to a rear end of the first duct member and extends upward,
   wherein the duct includes a third duct member disposed at the seat back and connected to an upper end of the second duct member, and
   wherein the cover member is configured to cover at least part of a second connected section that is a section at which the second duct member and the third duct member are connected.

7. The vehicle seat according to claim 1, wherein one of the seat cushion and the seat back has a first air passage and a second air passage, and
   wherein the duct includes a first duct portion connecting to the first air passage, and a second duct portion branching off from the first duct portion and connecting to the second air passage.

8. A vehicle seat with a seat cushion and a seat back, the vehicle seat comprising:
(a) a duct, disposed astride the seat cushion and the seat back, and configured to connect an air passage and a blower, the air passage being formed in at least one of the seat cushion and the seat back, the duct comprising:
   a first duct member,
   a second duct member that is connected to a rear end of the first duct member and extends upward,
   a third duct member that is disposed at the seat back and is connected to an upper end of the second duct member;
(b) left and right back side frames which constitute left and right frames of the seat back;
(c) a cover member configured to cover: part of the duct including at least part of a first connected section that is a section at which the first duct member and the second duct member are connected, and at least part of a second connected section that is a section at which the second duct member and the third duct member are connected, the cover member comprising:
   a plate-shaped rear cover attached to the left and right back side frames and bridging the left and right back side frames, the rear cover being configured to cover a rear side of the second connected section.

* * * * *